(12) United States Patent
Jaen et al.

(10) Patent No.: US 12,433,836 B2
(45) Date of Patent: Oct. 7, 2025

(54) PARENTERALLY ADMINISTERED IMMUNE ENHANCING DRUGS

(71) Applicant: ARCUS BIOSCIENCES, INC., Hayward, CA (US)

(72) Inventors: Juan Carlos Jaen, Burlingame, CA (US); Jenna Leigh Jeffrey, Oakland, CA (US); Lixia Jin, San Mateo, CA (US); Jaroslaw Kalisiak, Mountain View, CA (US); Joyson J. Karakunnel, Potomac, MD (US); Kenneth V. Lawson, San Francisco, CA (US); Manmohan Reddy Leleti, Dublin, CA (US); Jay Patrick Powers, Pacifica, CA (US)

(73) Assignee: ARCUS BIOSCIENCES, INC., Hayward, CA (US)

( * ) Notice: Subject to any disclaimer, the term of this patent is extended or adjusted under 35 U.S.C. 154(b) by 1241 days.

(21) Appl. No.: 16/978,920

(22) PCT Filed: Mar. 8, 2019

(86) PCT No.: PCT/US2019/021300
§ 371 (c)(1),
(2) Date: Sep. 8, 2020

(87) PCT Pub. No.: WO2019/173682
PCT Pub. Date: Sep. 12, 2019

(65) Prior Publication Data
US 2020/0405629 A1 Dec. 31, 2020

Related U.S. Application Data

(60) Provisional application No. 62/700,548, filed on Jul. 19, 2018, provisional application No. 62/641,003, filed on Mar. 9, 2018.

(51) Int. Cl.
*A61K 9/00* (2006.01)
*A61K 31/7076* (2006.01)
*A61K 45/06* (2006.01)
*C07K 16/28* (2006.01)

(52) U.S. Cl.
CPC ........ *A61K 9/0019* (2013.01); *A61K 31/7076* (2013.01); *A61K 45/06* (2013.01); *C07K 16/2818* (2013.01); *C07K 16/2827* (2013.01)

(58) Field of Classification Search
CPC .............. A61K 31/706; A61K 31/7076; A61K 9/0019; A61P 35/00
See application file for complete search history.

(56) References Cited

U.S. PATENT DOCUMENTS

| | | | |
|---|---|---|---|
| 5,700,786 A * | 12/1997 | Watanabe | C07F 9/65586 536/26.24 |
| 10,239,912 B2 * | 3/2019 | Debien | A61P 25/16 |
| 10,981,944 B2 * | 4/2021 | Debien | C07H 19/23 |
| 11,001,603 B2 | 5/2021 | Debien et al. | |
| 11,058,704 B2 * | 7/2021 | Debien | A61P 9/10 |
| 11,267,845 B2 | 3/2022 | Kalisiak et al. | |
| 11,667,662 B2 * | 6/2023 | Debien | A61K 31/7076 514/47 |
| 11,819,512 B2 * | 11/2023 | Jeffrey | A61K 45/06 |
| 12,168,023 B2 | 12/2024 | Debien et al. | |
| 2017/0044203 A1 * | 2/2017 | Cacatian | C07F 9/65616 |
| 2017/0267710 A1 * | 9/2017 | Debien | A61P 9/00 |

FOREIGN PATENT DOCUMENTS

| | | |
|---|---|---|
| WO | WO 01/49287 A1 | 7/2001 |
| WO | WO-2015164573 A1 | 10/2015 |
| WO | 2017152085 A1 | 9/2017 |
| WO | WO-2018047139 A1 * | 3/2018 ........... C07D 271/06 |

OTHER PUBLICATIONS

Ge et al (European Journal of Medicinal Chemistry, 2024, vol. 264, pp. 1-15) (Year: 2024).*
Springboard (The rise of the bolus injector, https://www.springboard.pro/bolus-injectors/, Sep. 2017) (Year: 2017).*
Boothe (dvm360, Constant rate infusion vs IV bolus (Proceedings), Apr. 2008, https://www.dvm360.com/view/constant-rate-infusion-versus-iv-bolus-proceedings) (Year: 2008).*
NCI (Division of Cancer Treatment and Diagnosis, updated May 29, 2008, https://ctep.cancer.gov/protocolDevelopment/policies_nomenclature.htm).. (Year: 2008).*
U.S. Appl. No. 16/273,843, Arcus Biosciences, Inc., Unpublished application.
U.S. Appl. No. 17/009,590, Arcus Biosciences, Inc., Unpublished application.
Bhattarai et al., α,β-Methylene-ADP (AOPCP) Derivatives and Analogues: Development of Potent and Selective ecto-5'-Nucleotidase (CD73) Inhibitors, Journal of Medicinal Chemistry, 2015, vol. 58, pp. 6248-6238.
Furtmann et al., Evaluation of molecular model-based discovery of ecto-5'-nucleotidase inhibitors on the basis of X-ray structures, 2013, vol. 21, pp. 6616-6622.
Maruoka et al., Pyrimidine Ribonucleotides with Enhanced SElectivity as P2Y6 Receptor Agonists: Novel 4-Alkyloxyimino, (S)-Methanocarba, and 5'-Triphosphate γ-Ester Modifications, Journal of Medicinal Chemistry, 2010, vol. 53, No. 11, pp. 4488-4501.

(Continued)

*Primary Examiner* — Mark V Stevens
(74) *Attorney, Agent, or Firm* — Sheppard Mullin Richter & Hampton LLP

(57) ABSTRACT

Methods of identifying compounds that modulate the conversion of AMP to adenosine by 5'-nucleotidase, ecto, and that possess particular pharmacokinetic characteristics are described herein. Methods of such compounds, and compositions comprising same, for the treatment and/or prevention of a diverse array of diseases, disorders and conditions, including cancer- and immune-related disorders, are also provided.

27 Claims, 1 Drawing Sheet

(56) References Cited

OTHER PUBLICATIONS

Stagg et al., Anti-CD73 antibody therapy inhibits breast tumor growth and metastasis, Jan. 26, 2017, vol. 107, No. 4, pp. 1547-1552.
Zenchuk et al., Mechanisms of anti-cancer action and pharmacology of clofarabine, Biochemical Pharmacology, 2009, vol. 78, pp. 1351-1359.
International Search Report for PCT/US2019/021300, mailed Jul. 5, 2019, 4 pages.
Written Opinion of the Inlemational Searching Authority for PCT/US2019/021300, mailed Jul. 5, 2019, 7 pages.
U.S. Appl. No. 18/298,174, filed Apr. 10, 2023, Debien et al.
U.S. Appl. No. 18/364,141, filed Aug. 2, 2023, Debien et al.
U.S. Appl. No. 18/516,459, filed Nov. 21, 2023, Debien et al.
Extended European Search Report and Opinion dated Feb. 9, 2022 for EP Application No. 19764884.3 11 pages.
Junker, et al. Structure-Activity Relationship of Purine and Pyrimidine Nucleotides as Ecto-5'-Nucleotidase (CD73) Inhibitors. J Med Chem. Apr. 11, 2019;62(7):3677-3695.
Lawson, et al. Discovery of AB680: A Potent and Selective Inhibitor of CD73. J Med Chem. Oct. 22, 2020;63(20):11448-11468.
Schindler, et al. AB680, a potent and selective CD73 small molecule inhibitor, reverses the AMP/adenosine-mediated impairment of immune effector cell activation by immune checkpoint inhibitors. Abstract| vol. 92, Supplement 1, S14, Mar. 2018. 1 page.
Ashok et al., "Phase 1 Safety Study in Healthy Volunteers of AB680, a Small-Molecule Inhibitor of CD73 and Rationale for Combination Therapy in Patients with Gastrointestinal Malignancies," SITC 2019.

\* cited by examiner

Predicted Concentration-Time Profiles After Intravenous Administration (constant infusion for 1 hour) of Compound 1 and Compound 2
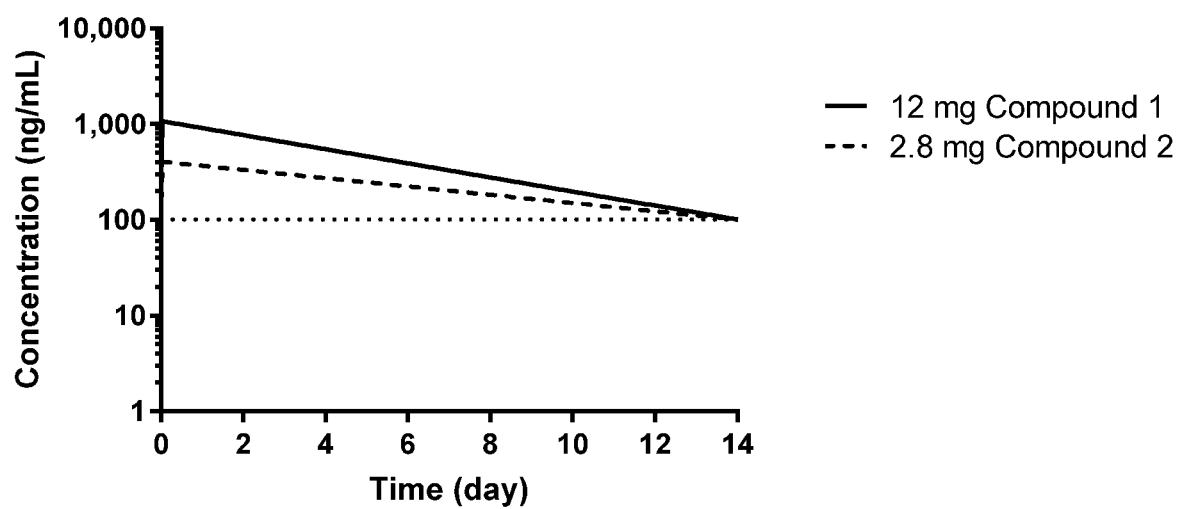

PARENTERALLY ADMINISTERED IMMUNE ENHANCING DRUGS

CROSS-REFERENCES TO RELATED APPLICATIONS

This application is the U.S. National Stage Entry under § 371 of International Application No. PCT/US2019/021300, filed Mar. 8, 2019, which claims the benefit priority to U.S. Provisional Application No. 62/641,003 filed Mar. 9, 2018 and U.S. Provisional Application No. 62/700,548 filed Jul. 19, 2018, each of which is herein incorporated by reference in their entirety for all purposes.

STATEMENT AS TO RIGHTS TO INVENTIONS MADE UNDER FEDERALLY SPONSORED RESEARCH AND DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

FIELD

Provided herein are, for example, methods of identifying compounds that inhibit adenosine by 5'-nucleotidase, ecto, also known as CD73 and are suitable for parenteral administration. Also provided herein are, for example, methods of treating or preventing a disease, disorder or condition, or a symptom thereof, mediated by inhibition of adenosine by 5'-nucleotidase, ecto, with compounds, and pharmaceutical compositions comprising same, having desired pharmacokinetic properties.

BACKGROUND OF THE INVENTION

Purinergic signaling, a type of extracellular signaling mediated by purine nucleotides and nucleosides such as ATP and adenosine, involves the activation of purinergic receptors in the cell and/or in nearby cells, resulting in the regulation of cellular functions. Most cells have the ability to release nucleotides, which generally occurs via regulated exocytosis (see Praetorius, H. A.; Leipziger, J. (1 Mar. 2010) Ann Rev Physiology 72(1): 377-393). The released nucleotides can then be hydrolyzed extracellularly by a variety of cellular membrane-bound enzymes referred to as ectonucleotidases.

Ectonucleotides catalyze the conversion of ATP to adenosine, an endogenous modulator influencing multiple systems, including the immune system, the cardiovascular system, the central nervous system, and the respiratory system. Adenosine also promotes fibrosis in a variety of tissues. In the first step of the production of adenosine, ectonucleoside triphosphate diphosphohydrolase 1 (EN-TPD1), also known as CD39 (Cluster of Differentiation 39), hydrolyzes ATP to ADP, and then ADP to AMP. In the next step, AMP is converted to adenosine by 5'-nucleotidase, ecto (NT5E or 5NT), also known as CD73 (Cluster of Differentiation 73).

The enzymatic activities of CD39 and CD73 play strategic roles in calibrating the duration, magnitude, and chemical nature of purinergic signals delivered to various cells (e.g., immune cells). Alteration of these enzymatic activities can change the course or dictate the outcome of several pathophysiological events, including cancer, autoimmune diseases, infections, atherosclerosis, and ischemia-reperfusion injury, suggesting that these ecto-enzymes represent novel therapeutic targets for managing a variety of disorders.

CD73 inhibition with monoclonal antibodies, siRNA, or small molecules delays tumor growth and metastasis (Stagg, J. (2010) PNAS U.S.A. 107:1547-52). For example, anti-CD73 antibody therapy was shown to inhibit breast tumor growth and metastasis in animal models (Stagg, J. (26 Jan. 2010) PNAS U.S.A, 107(4):1547-52). In addition, the use of antibodies that specifically bind CD73 has been evaluated for the treatment of bleeding disorders (e.g., hemophilia) (U.S. Pat. No. 9,090,697). Recently, there have been several efforts to develop therapeutically useful CD73 small molecule inhibitors. For example, Bhattarai et al. ((2015) J Med Chem 58:6248-63) have studied derivatives and analogs of α,β-Methylene-ADP (AOPCP), one of the most metabolically stable, potent and selective CD73 inhibitors known, and purine CD73 derivatives have been reported in the patent literature (WO 2015/164573). However, the development of small molecules has been hampered due to, for example, less than ideal metabolic stability.

Most small molecules require at least daily administration, with some necessitating two, three or more daily doses, to achieve desired efficacy. Such frequent dosing may be associated with issues relating to, for example, lack of patient compliance, sometimes linked to severe adverse effects associated with repeated administration. In addition, treatment of many cancer-related disorders requires concomitant administration of two or more therapeutic agents (e.g., oncology agents). In such situations, a treatment regimen that simplifies or otherwise optimizes the overall treatment protocol is desirable. For example, when one of the therapeutic agents requires parenteral (e.g., IV) administration at a defined dosing frequency, the treatment regimen may benefit from administration of the CD73 inhibitor on the same dosing frequency.

In view of the role played by CD73 in cancer, as well as a diverse array of other diseases, disorders and conditions, and the current lack of CD73 inhibitors available to medical practitioners, new CD73 inhibitors, and compositions and methods associated therewith, are needed. Moreover, optimization of dosing regimens for such CD73 inhibitors in certain therapeutic settings, both as monotherapy and polytherapy, may require parenteral administration. Still further, the identification of CD73 inhibitors having long half-lives that are suitable for dosing at intervals up to 4 weeks are needed. The present disclosure addresses these and other needs.

BRIEF SUMMARY OF THE INVENTION

The present invention relates to compounds that modulate the conversion of AMP to adenosine by 5'-nucleotidase, ecto (NT5E or 5NT; also known as CD73), and compositions (e.g., pharmaceutical compositions) comprising the compounds. Such compounds and compositions, along with methods of identifying compounds suitable for parenteral administration, and methods of parenteral administration of a therapeutically effective amount of such compounds, alone or in combination with other agents, are described in detail below.

The present invention also relates to the use of such compounds and compositions for the treatment and/or prevention of a diverse array of diseases, disorders and conditions mediated, in whole or in part, by CD73. CD73 inhibitors have been linked to the treatment of a diverse array of disorders, including cancer, fibrosis, neurological and neurodegenerative disorders (e.g., depression and Parkinson's disease), cerebral and cardiac ischemic diseases, immune-related disorders, and disorders with an inflammatory component. See, e.g., Sorrentino et al (2013) OncoImmunol, 2:e22448, doi: 10.4161/onci.22448; and Regateiro et al. (2012) Clin. Exp. Immunol, 171:1-7. In particular embodiments, the compounds described herein act to inhibit the immunosuppressive activity and/or the anti-inflammatory activity of CD73, and are useful as therapeutic or prophylactic therapy when such inhibition is desired. Unless otherwise indicated, when uses of the compounds of the present invention are described herein, it is to be understood that such compounds may be in the form of a composition (e.g., a pharmaceutical composition).

Also provided herein are methods for treating a CD73-mediated disease or condition, the method comprising administering to a subject in need thereof, a long acting CD73 inhibitor at dosing intervals of from four days to four weeks, wherein said CD73 inhibitor is a compound of formula (I'), (II') or (III'), described below, and wherein the CD73 inhibitor has at least three features selected from the group consisting of:
  (i) permeability in Caco-2 cells of $<6 \times 10^{-6}$ cm/sec;
  (ii) human plasma protein binding of >98%;
  (iii) high stability in the presence of human hepatocytes, expressed as $CL_{INT}$<10 uL/min/million cells;
  (iv) a topological polar surface area of >160 $Å^2$;
  (v) c Log D<−3;
  (vi) c Log P<1;
  (vii) from 10 to 24 H-bond donors/acceptors;
  (viii) solubility in water or saline of greater than 10 mg/mL; and
  (ix) a potency of CD73 inhibition of less than 10 nM.

Assays and methods for identifying the CD73 inhibitors used in the methods above, as well as compositions, compounds, and kits suitable for dosing of long half-life inhibitors of CD73, are also provided herein.

As used herein, the terms "CD73 inhibitor", "CD73 blocker", "adenosine by 5'-nucleotidase, ecto inhibitor", "NT5E inhibitor", "5NT inhibitor" and all other related art-accepted terms refer to a compound capable of modulating, either directly or indirectly, the CD73 receptor in an in vitro assay, an in vivo model, and/or other means indicative of therapeutic efficacy. The terms also refer to compounds that exhibit at least some therapeutic benefit in a human subject.

Although the compounds provided herein are believed to effect their activity by inhibition of CD73, a precise understanding of the compounds' underlying mechanism of action is not required to practice the invention. For example, the compounds can also effect their activity, at least in part, through modulation (e.g., inhibition) of other components of the purinergic signaling pathway (e.g., CD39). The purinergic signaling system consists of transporters, enzymes and receptors responsible for the synthesis, release, action, and extracellular inactivation of (primarily) ATP and its extracellular breakdown product adenosine (Sperlagh, B. et al. (December 2012) Neuropsychopharmacologia Hungarica 14(4):231-38). Because inhibition of CD73 results in decreased adenosine, CD73 inhibitors can be used for the treatment of diseases or disorders mediated by adenosine and its actions on adenosine receptors, including A1, $A_{2A}$, $A_{2B}$ and A3. See Yegutkin, G G (May 2008) Biochimica Biophysica Acta 1783(5):673-94.

For purposes of the present disclosure, the purinergic signaling process can be described as comprising the following components. The purinergic receptors (P1, P2X and P2Y), a first component, are membrane receptors that mediate various physiological functions (e.g., relaxation of gut smooth muscle) as a response to the release of ATP or adenosine; in general, all cells have the ability to release nucleotides into the extracellular environment, frequently through regulated exocytosis. The nucleoside transporters (NTs), a second component, are membrane transport proteins which transport nucleoside substrates (e.g., adenosine) across cell membranes; the extracellular concentration of adenosine can be regulated by NTs, possibly in the form of a feedback loop connecting receptor signaling with transporter function. As previously described, the ectonucleotidases (CD73 and CD39) hydrolyze nucleotides released into the extracellular environment and comprise a further component. Another component of the purinergic signaling process comprises the pannexins; in particular, the pannexin-1 channel (PANX1) is an integral component of the P2X/P2Y purinergic signaling pathway and the key contributor to pathophysiological ATP release.

Before a biopharmaceutical agent (e.g., a CD73 inhibitor) is administered to a human subject, its characteristics are generally assessed in a model (e.g., a rodent model) that provides information regarding how the agent will behave in a human subject. The activity or fate of a drug in the body over a period of time can be considered using the processes of absorption, distribution (localization in tissues), metabolism (biotransformation) and excretion ("ADME"). In addition to ADME-related information, data obtained from the use of such models (or other means of assessment) include the agent's bioavailability (F) and clearance (CL). Pharmacokinetic parameters are discussed in detail hereafter.

In contrast to pharmacokinetics (PK), which is the study of how a subject affects a biopharmaceutical agent, pharmacodynamics (PD) is the study of how a biopharmaceutical agent affects the subject. It includes the study of the biochemical and physiological effects of a biopharmaceutical agent and its mechanism of action, along with the correlation of the agent's chemical structure with its level of, for example, activity.

In some embodiments of the present invention, a CD73 inhibitor specifically disclosed herein, or encompassed by one or more of the various genera of compounds set forth herein, that is suitable for parenteral administration of at least every week (e.g., that maintains therapeutic efficacy over the at least every week) may be identified by conducting several assessments. In certain embodiments, the following assessments (often in the sequence set forth) or a subset thereof is performed: assessment of activity in vitro; PK determination in animals; allometric scaling; acceptable formulation characteristics (e.g., solubility); and suitable dosing frequency for concomitant combination therapy. The methodologies, some of which are discussed hereafter, used in the various assessments will be apparent to the skilled artisan.

It will be apparent to the skilled artisan that each of the foregoing assessments may not be required, the individual assessments may not need to be performed in the order presented, and/or that other assessments may be utilized to identify candidate compounds. The methodologies, some of which are discussed hereafter, used in the various assessments will be apparent to the skilled artisan. In addition, one of ordinary skill in the art recognizes that while the assessments are generally based on objective parameters, the assessment process is not static and often involves some practitioner-specific input based on the practitioner's knowledge, experience and the like.

In one particular aspect, the present invention provides compounds that may be evaluated according to the methods described herein and/or that may be suitable for parenteral administration as described herein having Formula (I):

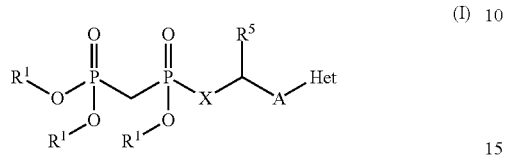
(I)

or a pharmaceutically acceptable salt, hydrate, or solvate thereof, wherein each $R^1$ is independently selected from the group consisting of hydrogen, optionally substituted $C_1$-$C_6$ alkyl, optionally substituted aryl, and —$C(R^2R^2)$—O—$C(O)$—$OR^3$, or two $R^1$ groups are optionally combined to form a 5- to 7-membered ring; each $R^2$ is independently selected from the group consisting of H and optionally substituted $C_1$-$C_6$ alkyl; each $R^3$ is independently selected from the group consisting of H, $C_1$-$C_6$ alkyl, and optionally substituted aryl; $R^5$ is selected from the group consisting of H and optionally substituted $C_1$-$C_6$ alkyl; X is selected from the group consisting of O, $CH_2$, and S; A is selected from the group consisting of:

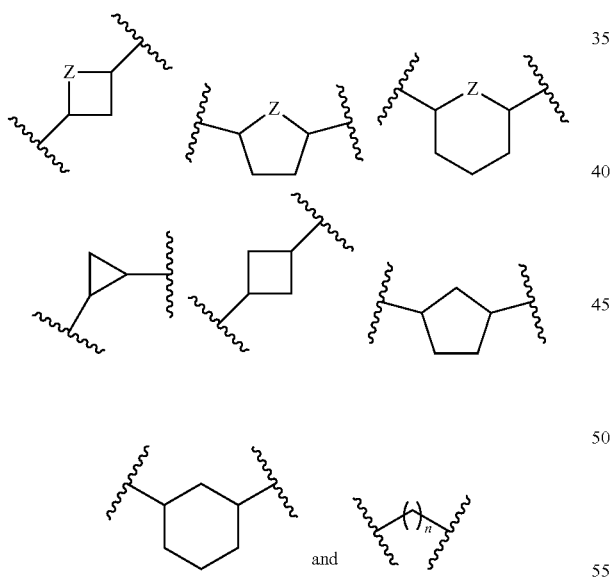

each of which is optionally substituted with from 1 to 5 $R^6$ substituents, and wherein the subscript n is an integer from 0 to 3; Z is selected from the group consisting of $CH_2$, $CHR^6$, $NR^6$, and O; each $R^6$ is independently selected from the group consisting of H, $CH_3$, OH, CN, F, optionally substituted $C_1$-$C_6$ alkyl, and $OC(O)$—$C_1$-$C_6$ alkyl; and optionally two $R^6$ groups on adjacent ring vertices are joined together to form a 5- to 6-membered ring having at least one heteroatom as a ring vertex; and Het is selected from the group consisting of:

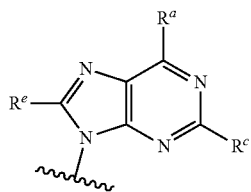
a1

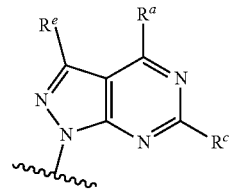
a2

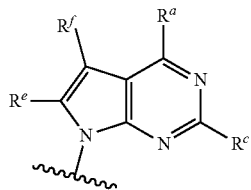
a3

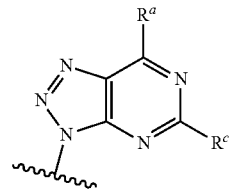
a4

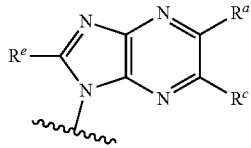
a5

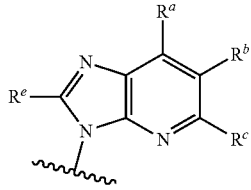
a6

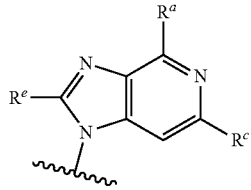
a7

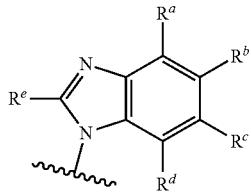
a8

-continued a9
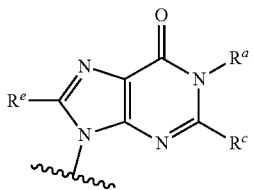

a10
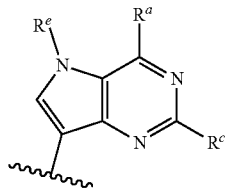

a11
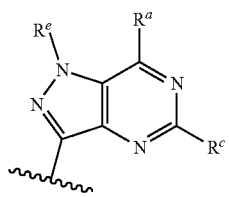

a12
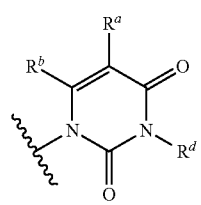

a13
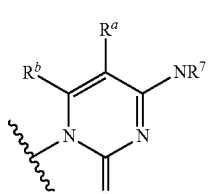

a14
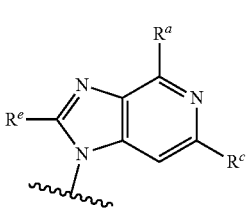

a15
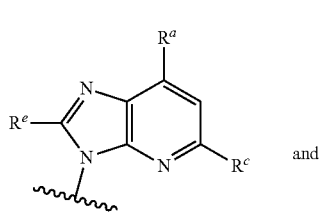

and a16
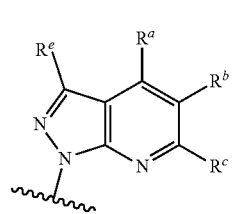

wherein the wavy line indicates the point of attachment to the remainder of the compound, and wherein $R^a$ is selected from the group consisting of H, $NH_2$, $NHR^7$, $NHC(O)R^7$, $NR^7R^7$, $R^7$, OH, $SR^7$ and $OR^7$; $R^b$ is selected from the group consisting of H, halogen, $NH_2$, $NHR^7$, $NR^7R^7$, $R^7$, OH, and $OR^7$; each $R^c$ and $R^d$ is independently selected from the group consisting of H, halogen, haloalkyl, $NH_2$, $NHR^7$, $NR^7R^7$, $R^7$, OH, and $OR^7$; each $R^e$ and $R^f$ is independently selected from the group consisting of H, halogen, and optionally substituted $C_1$-$C_6$ alkyl; and each $R^7$ is independently selected from the group consisting of optionally substituted $C_1$-$C_{10}$ alkyl, optionally substituted $C_3$-$C_7$ cycloalkyl, optionally substituted 4-7 membered cycloheteroalkyl, optionally substituted aryl, optionally substituted arylalkyl, optionally substituted heteroaryl, and optionally substituted heteroarylalkyl, and optionally, two $R^7$ groups attached to a nitrogen atom are joined together to form a 4-7 membered heterocyclic ring.

Excluded from the above are compounds wherein the combination of X, A, and Het results in

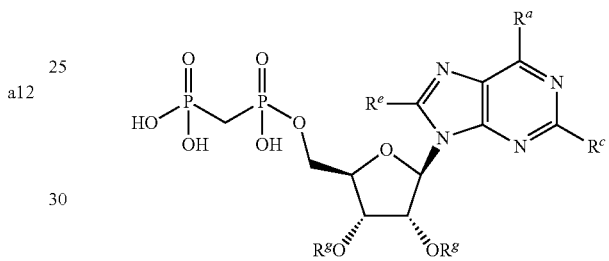

wherein $R^g$ is H or the two $R^g$ groups are combined to form an acetonide; and either (i) $R^c$ and $R^e$ are hydrogen and $R^a$ is —OEt, —OCH$_2$Ph, —SCH$_2$Ph, —NH$_2$, methylamino, ethylamino, dimethylamino, diethylamino, N-methyl-N-ethylamino, phenylamino, benzylamino, 2-phenylethylamino, N-benzyl-N-ethylamino, dibenzylamino, 4-aminobenzylamino, 4-chlorobenzylamino, 4-nitrobenzylamino, or 4-sulfamoylbenzylamino; or (ii) $R^c$ is hydrogen, $R^a$ is —NH$_2$, and $R^e$ is bromo, chloro, aminomethyl, or thioethyl; or (iii) $R^c$ is hydrogen, $R^a$ is benzylamino, and $R^e$ is bromo.

In one particular aspect, the present invention provides and uses compounds having Formula (I'), (II') and/or (III'):

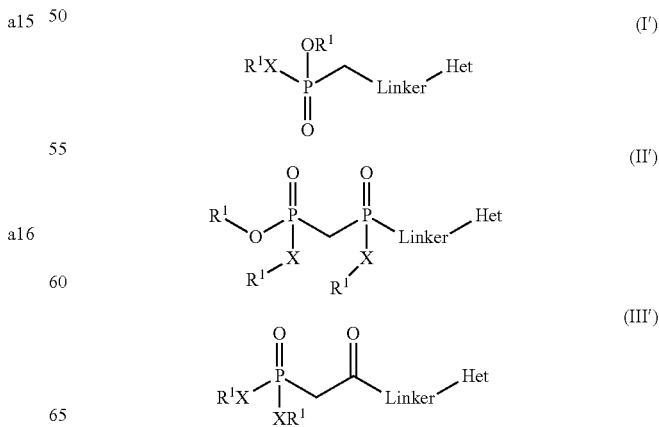

or a pharmaceutically acceptable salt, hydrate, or solvate thereof, wherein, each $R^1$ is independently selected from the group consisting of hydrogen, optionally substituted $C_1$-$C_6$ alkyl, optionally substituted aryl, —C($R^2R^2$)—O—C(O)—$OR^3$, —C($R^2R^2$)—O—C(O)$R^3$, and —C($R^2R^2$)C(O)$OR^3$, or two $R^1$ groups can be combined to form a 5- to 6-membered ring;

each $R^2$ is independently selected from the group consisting of H and optionally substituted $C_1$-$C_6$ alkyl;

each $R^3$ is independently selected from the group consisting of H, $C_1$-$C_6$ alkyl, $C_1$-$C_6$ alkoxy$C_1$-$C_6$ alkyl, and optionally substituted aryl;

each X is independently selected from the group consisting of O, NH, and S;

Het is a 6,5- or 6,6-fused heteroaryl ring system and is substituted or unsubstituted; and each Linker is independently an acyclic, cyclic, or combination of acyclic and cyclic groups that join Het to indicated atoms in each of formulae (I'), (II') or (III'), and provides a spacing of from two to ten atoms between the joined groups;

and wherein said compound has at least three features selected from the group consisting of:
(i) permeability in Caco-2 cells of $<6 \times 10^{-6}$ cm/sec;
(ii) human plasma protein binding of >98%;
(iii) high stability in the presence of human hepatocytes, expressed as $CL_{INT}$<10 uL/min/million cells;
(iv) a topological polar surface area of >160 Å$^2$;
(v) c Log D<−3;
(vi) c Log P<1;
(vii) from 10 to 24 H-bond donors/acceptors;
(viii) solubility in water or saline of greater than 10 mg/mL; and
(ix) potency of CD73 inhibition of less than 10 nM.

In some embodiments, the present invention contemplates methods for treating or preventing cancer in a subject (e.g., a human) comprising administering to the subject a therapeutically effective amount of at least one CD73 inhibitor, wherein the CD73 inhibitor is identified according to the methods described herein and/or the CD73 inhibitor is suitable for parenteral administration as described herein. The present invention includes methods of treating or preventing a cancer in a subject by administering to the subject such a CD73 inhibitor in an amount effective to reverse or stop the progression of CD73-mediated immunosuppression. In some embodiments, the CD73-mediated immunosuppression is mediated by an antigen-presenting cell (APC).

In some embodiments, the CD73 inhibitor has the following chemical structure ("Compound 1"):

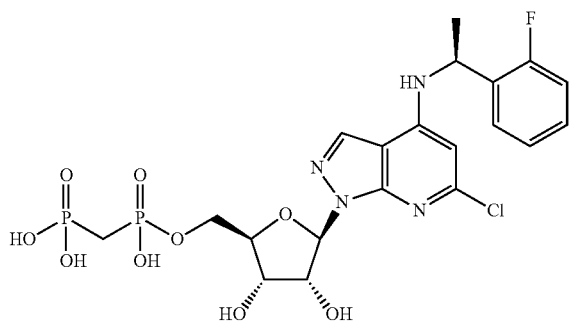 [SMILES: C[C@H](Nc1cc(Cl)nc2c1cnn2[C@@H]1O[C@H](COP(=O)(O)CP(=O)(O)O)[C@@H](O)[C@H]1O)c1ccccc1F]

or a pharmaceutically acceptable salt, hydrate or solvate thereof.

In other embodiments, the CD73 inhibitor has the following chemical structure ("Compound 2"):

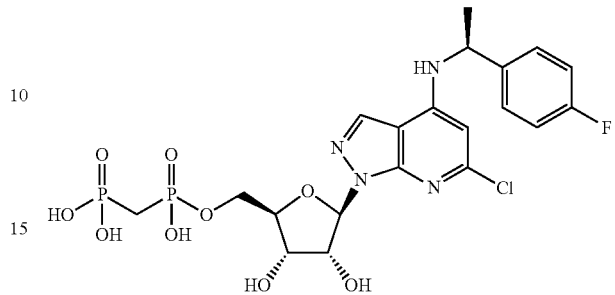

or a pharmaceutically acceptable salt, hydrate or solvate thereof.

Examples of the cancers that can be treated using the compounds and compositions described herein include, but are not limited to: cancers of the prostate, colorectum, pancreas, cervix, stomach, endometrium, brain, liver, bladder, ovary, testis, head, neck, skin (including melanoma and basal carcinoma), mesothelial lining, white blood cell (including lymphoma and leukemia) esophagus, breast, muscle, connective tissue, lung (including small-cell lung carcinoma and non-small-cell lung carcinoma), adrenal gland, thyroid, kidney, or bone; glioblastoma, mesothelioma, renal cell carcinoma, gastric carcinoma, sarcoma, choriocarcinoma, cutaneous basocellular carcinoma, and testicular seminoma. In some embodiments of the present invention, the cancer is melanoma, colon cancer, pancreatic cancer, breast cancer, prostate cancer, lung cancer, leukemia, a brain tumor, lymphoma, sarcoma, ovarian cancer, or Kaposi's sarcoma. Cancers that are candidates for treatment with the compounds and compositions of the present invention are discussed further hereafter.

The present invention contemplates methods of treating a subject receiving a bone marrow transplant or peripheral blood stem cell transplant by administering a therapeutically effective amount of an CD73 inhibitor sufficient to increase the delayed-type hypersensitivity reaction to tumor antigen, delay the time-to-relapse of post-transplant malignancy, increase relapse-free survival time post-transplant, and/or increase long-term post-transplant survival, wherein the CD73 inhibitor is identified according to the methods described herein and/or the CD73 inhibitor is suitable for parenteral administration as described herein.

In certain embodiments, the present invention contemplates methods for treating or preventing an infective disorder (e.g., a viral infection) in a subject (e.g., a human) comprising administering to the subject a therapeutically effective amount of at least one CD73 inhibitor, wherein the CD73 inhibitor is identified according to the methods described herein and/or the CD73 inhibitor is suitable for parenteral administration as described herein. In some embodiments, the infective disorder is a viral infection (e.g., a chronic viral infection), a bacterial infection, a fungal infection, or a parasitic infection. In certain embodiments, the viral infection is human immunodeficiency virus or cytomegalovirus.

In still other embodiments, the present invention contemplates methods for treating and/or preventing immune-related diseases, disorders and conditions; diseases having an inflammatory component; as well as disorders associated with the foregoing; with at least one CD73 inhibitor that is identified according to the methods described herein and/or that is suitable for parenteral administration as described herein. Examples of immune-related diseases, disorders and conditions are described hereafter.

Other diseases, disorders and conditions that can be treated or prevented, in whole or in part, by modulation of CD73 activity are candidate indications for the CD73 inhibitor compounds of the present invention.

The present invention further contemplates the use of the CD73 inhibitors that are identified according to the methods described herein and/or that are suitable for parenteral administration as described herein, in combination with one or more additional agents. The one or more additional agents may have some CD73-modulating activity and/or they may function through distinct mechanisms of action. In some embodiments, such agents comprise radiation (e.g., localized radiation therapy or total body radiation therapy) and/or other treatment modalities of a non-pharmacological nature. When combination therapy is utilized, the CD73 inhibitor(s) and the one additional agent(s) may be in the form of a single composition or multiple compositions, and the treatment modalities can be administered concurrently, sequentially, or through some other regimen. By way of example, the present invention contemplates a treatment regimen wherein a radiation phase is followed by a chemotherapeutic phase. The combination therapy can have an additive or synergistic effect. Other benefits of combination therapy are described hereafter.

In some embodiments, the present invention further comprises the use of the CD73 inhibitors that are identified according to the methods described herein and/or that are suitable for parenteral administration as described herein, in combination with bone marrow transplantation, peripheral blood stem cell transplantation, or other types of transplantation therapy.

In particular embodiments, the present invention contemplates the use of the inhibitors of CD73 function described herein in combination with immune checkpoint inhibitors. The blockade of immune checkpoints, which results in the amplification of antigen-specific T cell responses, has been shown to be a promising approach in human cancer therapeutics. Examples of immune checkpoints (ligands and receptors), some of which are selectively upregulated in various types of tumor cells, that are candidates for blockade include PD1 (programmed cell death protein 1); PDL1 (PD1 ligand); BTLA (B and T lymphocyte attenuator); CTLA4 (cytotoxic T-lymphocyte associated antigen 4); TIM3 (T-cell membrane protein 3); LAG3 (lymphocyte activation gene 3); A2aR (adenosine A2a receptor A2aR); TIGIT (T cell immunoreceptor with Ig and ITIM domains) and Killer Inhibitory Receptors. Immune checkpoint inhibitors, and combination therapy therewith, are discussed in detail elsewhere herein.

In other embodiments, the present invention provides methods for treating cancer in a subject, comprising administering to the subject a therapeutically effective amount of at least one CD73 inhibitor that is identified according to the methods described herein and/or that is suitable for parenteral administration as described herein, and at least one chemotherapeutic agent, such agents including, but not limited to alkylating agents (e.g., nitrogen mustards such as chlorambucil, cyclophosphamide, isofamide, mechlorethamine, melphalan, and uracil mustard; aziridines such as thiotepa; methanesulphonate esters such as busulfan; nucleoside analogs (e.g., gemcitabine); nitroso ureas such as carmustine, lomustine, and streptozocin; topoisomerase 1 inhibitors (e.g., irinotecan); platinum complexes such as cisplatin, carboplatin and oxaliplatin; bioreductive alkylators such as mitomycin, procarbazine, dacarbazine and altretamine); anthracycline-based therapies (e.g., doxorubicin, daunorubicin, epirubicin and idarubicin); DNA strand-breakage agents (e.g., bleomycin); topoisomerase II inhibitors (e.g., amsacrine, dactinomycin, daunorubicin, idarubicin, mitoxantrone, doxorubicin, etoposide, and teniposide); DNA minor groove binding agents (e.g., plicamydin); antimetabolites (e.g., folate antagonists such as methotrexate and trimetrexate; pyrimidine antagonists such as fluorouracil, fluorodeoxyuridine, CB3717, azacitidine, cytarabine, and floxuridine; purine antagonists such as mercaptopurine, 6-thioguanine, fludarabine, pentostatin; asparginase; and ribonucleotide reductase inhibitors such as hydroxyurea); tubulin interactive agents (e.g., vincristine, estramustine, vinblastine, docetaxol, epothilone derivatives, and paclitaxel); hormonal agents (e.g., estrogens; conjugated estrogens; ethinyl estradiol; diethylstilbesterol; chlortrianisen; idenestrol; progestins such as hydroxyprogesterone caproate, medroxyprogesterone, and megestrol; and androgens such as testosterone, testosterone propionate, fluoxymesterone, and methyltestosterone); adrenal corticosteroids (e.g., prednisone, dexamethasone, methylprednisolone, and prednisolone); leutinizing hormone releasing agents or gonadotropin-releasing hormone antagonists (e.g., leuprolide acetate and goserelin acetate); and antihormonal antigens (e.g., tamoxifen, antiandrogen agents such as flutamide; and antiadrenal agents such as mitotane and aminoglutethimide). The present invention also contemplates the use of the CD73 inhibitors in combination with other agents known in the art (e.g., arsenic trioxide) and other chemotherapeutic agents that may be developed in the future.

In some embodiments, the present invention is drawn to methods of treating cancer, the administration of a therapeutically effective amount of an CD73 inhibitor that is identified according to the methods described herein and/or that is suitable for parenteral administration as described herein, in combination with at least one chemotherapeutic agent results in a cancer survival rate greater than the cancer survival rate observed by administering either agent alone.

In further embodiments drawn to methods of treating cancer, the administration of a therapeutically effective amount of an CD73 inhibitor that is identified according to the methods described herein and/or that is suitable for parenteral administration as described herein, in combination with at least one chemotherapeutic agent results in a reduction of tumor size or a slowing of tumor growth greater than reduction of the tumor size or tumor growth observed by administration of either agent alone.

In further embodiments, the present invention contemplates methods for treating or preventing cancer in a subject, comprising administering to the subject a therapeutically effective amount of at least one CD73 inhibitor that is identified according to the methods described herein and/or that is suitable for parenteral administration as described herein, and at least one signal transduction inhibitor (STI). In a particular embodiment, the at least one STI is selected from the group consisting of bcr/abl kinase inhibitors, epidermal growth factor (EGF) receptor inhibitors, her-2/neu receptor inhibitors, and farnesyl transferase inhibitors (FTIs). Other candidate STI agents are set forth elsewhere herein.

The present invention also contemplates methods of augmenting the rejection of tumor cells in a subject comprising administering a CD73 inhibitor that is identified according to the methods described herein and/or that is suitable for parenteral administration as described herein, in conjunction with at least one chemotherapeutic agent and/or radiation therapy, wherein the resulting rejection of tumor cells is greater than that obtained by administering either the CD73 inhibitor, the chemotherapeutic agent or the radiation therapy alone.

In further embodiments, the present invention provides methods for treating cancer in a subject, comprising administering to the subject a therapeutically effective amount of at least one CD73 inhibitor that is identified according to the methods described herein and/or that is suitable for parenteral administration as described herein, and at least one immunomodulator other than an CD73 inhibitor. In particular embodiments, the at least one immunomodulator is selected from the group consisting of A2aR (adenosine A2a receptor A2aR), CD40L, B7, B7RP1, ant-CD40, anti-CD38, anti-ICOS, 4-IBB ligand, dendritic cell cancer vaccine, IL2, IL12, ELC/CCL19, SLC/CCL21, MCP-1, IL-4, IL-18, TNF, IL-15, MDC, IFN-α/-13, M-CSF, IL-3, GM-CSF, IL-13, anti-IL-10 and indoleamine 2,3-dioxygenase 1 (IDO1) inhibitors.

The present invention contemplates embodiments comprising methods for treating or preventing an infective disorder (e.g., a viral infection) in a subject (e.g., a human) comprising administering to the subject a therapeutically effective amount of at least one CD73 inhibitor that is identified according to the methods described herein and/or that is suitable for parenteral administration as described herein, and a therapeutically effective amount of an anti-infective agent(s), such as one or more antimicrobial agents.

In additional embodiments, treatment of an infective disorder is effected through the co-administration of a vaccine in combination with administration of a therapeutically effective amount of an CD73 inhibitor of the present invention. In some embodiments, the vaccine is an anti-viral vaccine, including, for example, an anti-HIV vaccine. In other embodiments, the vaccine is effective against tuberculosis or malaria. In still other embodiments, the vaccine is a tumor vaccine (e.g., a vaccine effective against melanoma); the tumor vaccine can comprise genetically modified tumor cells or a genetically modified cell line, including genetically modified tumor cells or a genetically modified cell line that has been transfected to express granulocyte-macrophage stimulating factor (GM-CSF). In particular embodiments, the vaccine includes one or more immunogenic peptides and/or dendritic cells.

In certain embodiments drawn to treatment of an infection by administering an CD73 inhibitor that is identified according to the methods described herein and/or that is suitable for parenteral administration as described herein, and at least one additional therapeutic agent, a symptom of infection observed after administering both the CD73 inhibitor and the additional therapeutic agent is improved over the same symptom of infection observed after administering either alone. In some embodiments, the symptom of infection observed can be reduction in viral load, increase in $CD4^+$ T cell count, decrease in opportunistic infections, increased survival time, eradication of chronic infection, or a combination thereof.

The present invention encompasses methods of treating a disease, disorder, or condition, mediated at least in part by CD73, in a subject in need thereof, by parenterally administering, at least every 3 days, a therapeutically effective amount of Compound 1 or Compound 2, or a pharmaceutically acceptable salt, hydrate or solvate thereof. In other embodiments, Compound 1 or Compound 2 are administered parenterally at least every 5 days, at least every 7 days, at least every 10 days, at least every 14 days, at least every 21 days, or at least every 28 days.

In some aspects of the present invention, Compound 1 or Compound 2 is administered in an amount sufficient to maintain a plasma concentration (Css) of at least 90, at least 92, at least 95, at least 97, at least 98 at least 99, at least 100, at least 101, or at least 102 ng/mL for a period of 7 days or more. In particular aspects of the present invention, Compound 1 or Compound 2 is administered in an amount sufficient to maintain a plasma concentration (Css) of at least 90, at least 92, at least 95, at least 97, at least 98 at least 99, at least 100, at least 101, or at least 102 ng/mL for a period of 10 days or more. In other aspects of the present invention, Compound 1 or Compound 2 is administered in an amount sufficient to maintain a plasma concentration (Css) of at least 90, at least 92, at least 95, at least 97, at least 98 at least 99, at least 100, at least 101, or at least 102 ng/mL for a period of 14 days or more. In still further aspects of the present invention, Compound 1 or Compound 2 is administered in an amount sufficient to maintain a plasma concentration (Css) of at least 90, at least 92, at least 95, at least 97, at least 98 at least 99, at least 100, at least 101, or at least 102 ng/mL for a period of 21 days or more. In additional aspects of the present invention, Compound 1 or Compound 2 is administered in an amount sufficient to maintain a plasma concentration (Css) of at least 90, at least 92, at least 95, at least 97, at least 98 at least 99, at least 100, at least 101, or at least 102 ng/mL for a period of 28 days or more. The present invention contemplates other concentrations (e.g., 93 ng/mL) and durations (e.g., at least 18 days), which are to be deemed further aspects.

BRIEF DESCRIPTION OF THE DRAWINGS

FIG. 1 depicts predicted concentration-time profiles following intravenous administration (constant infusion for 1 hour) of 12 mg of Compound 1 and 2.8 mg of Compound 2.

DETAILED DESCRIPTION OF THE INVENTION

Before the present invention is further described, it is to be understood that the invention is not limited to the particular embodiments set forth herein, and it is also to be understood that the terminology used herein is for the purpose of describing particular embodiments only, and is not intended to be limiting.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention. Unless defined otherwise, all technical and scientific terms used herein have the same meaning as commonly understood by one of ordinary skill in the art to which this invention belongs.

It must be noted that as used herein and in the appended claims, the singular forms "a," "an," and "the" include plural referents unless the context clearly dictates otherwise. It is further noted that the claims may be drafted to exclude any optional element. As such, this statement is intended to serve as antecedent basis for use of such exclusive terminology such as "solely," "only" and the like in connection with the recitation of claim elements, or use of a "negative" limitation.

Publications discussed herein are provided solely for their disclosure prior to the filing date of the present application. Further, the dates of publication provided may be different from the actual publication dates, which may need to be independently confirmed.

General

The number of subjects diagnosed with cancer and the number of deaths attributable to cancer continue to rise. Traditional treatment approaches comprising chemotherapy and radiotherapy are generally difficult for the patient to tolerate and become less effective as cancers (e.g., tumors) evolve to circumvent such treatments. Recent experimental evidence indicates that CD73 inhibitors may represent an important new treatment modality for cancer (e.g., breast cancer) treatment.

Promising data also support the role of inhibitors of CD73 function to inhibit the anti-inflammatory activity of CD73 and/or the immunosuppressive activity of CD73, and thus CD73 inhibitors may be useful to treat, for example, immunosuppressive diseases (e.g., HIV and AIDs). Inhibition of CD73 may also be an important treatment strategy for patients with neurological or neuropsychiatric diseases or disorders such as depression.

The present invention is drawn to, inter alia, the identification of small molecule compounds having CD73 inhibitory activity and dosing schemes and selection criteria for those schemes directed to long half-life compositions for administration from 4 days to 4 weeks. Compositions that are suitable for parenteral administration, and methods of administering the compounds and compositions for the treatment and prevention of the diseases, disorders and conditions described herein.

Definitions

Unless otherwise indicated, the following terms are intended to have the meaning set forth below. Other terms are defined elsewhere throughout the specification.

The term "alkyl", by itself or as part of another substituent, means, unless otherwise stated, a straight or branched chain hydrocarbon radical, having the number of carbon atoms designated (i.e. $C_{1-8}$ means one to eight carbons). Examples of alkyl groups include methyl, ethyl, n-propyl, isopropyl, n-butyl, t-butyl, isobutyl, sec-butyl, n-pentyl, n-hexyl, n-heptyl, n-octyl, and the like.

The term "cycloalkyl" refers to hydrocarbon rings having the indicated number of ring atoms (e.g., $C_{3-6}$ cycloalkyl) and being fully saturated or having no more than one double bond between ring vertices. "Cycloalkyl" is also meant to refer to bicyclic and polycyclic hydrocarbon rings such as, for example, bicyclo[2.2.1]heptane, bicyclo[2.2.2]octane, etc.

The term "cycloheteroalkyl" refers to a cycloalkyl ring having the indicated number of ring vertices (or members) and having from one to five heteroatoms selected from N, O, and S, which replace one to five of the carbon vertices, and wherein the nitrogen and sulfur atoms are optionally oxidized, and the nitrogen atom(s) are optionally quaternized. The cycloheteroalkyl may be a monocyclic, a bicyclic or a polycyclic ring system. Non limiting examples of cycloheteroalkyl groups include pyrrolidine, imidazolidine, pyrazolidine, butyrolactam, valerolactam, imidazolidinone, hydantoin, dioxolane, phthalimide, piperidine, 1,4-dioxane, morpholine, thiomorpholine, thiomorpholine-S-oxide, thiomorpholine-S,S-oxide, piperazine, pyran, pyridone, 3-pyrroline, thiopyran, pyrone, tetrahydrofuran, tetrhydrothiophene, quinuclidine, and the like. A cycloheteroalkyl group can be attached to the remainder of the molecule through a ring carbon or a heteroatom. When 'optionally substituted' is used to describe either of the terms "cycloheteroalkyl" or "cycloheteroalkyl-alkyl", it is meant to refer to those groups wherein the cycloheteroalkyl or alkyl portion is optionally substituted as in the definitions below that refer to the alkyl portion. For example, an optionally substituted cycloheteroalkyl-alkyl group can be optionally substituted on either or both of the cycloheteroalkyl and alkyl portions as in the definitions for alkyl substituents below.

As used herein, a wavy line, "〜" that intersects a single, double or triple bond in any chemical structure depicted herein, represent the point attachment of the single, double, or triple bond to the remainder of the molecule. Additionally, a bond extending to the center of a ring (e.g., a phenyl ring) is meant to indicate attachment at any of the available ring vertices. One of skill in the art will understand that multiple substituents shown as being attached to a ring will occupy ring vertices that provide stable compounds and are otherwise sterically compatible. For a divalent component, a representation is meant to include either orientation (forward or reverse).

For example, the group "—C(O)NH—" is meant to include a linkage in either orientation: —C(O)NH— or —NHC(O)—, and similarly, "—O—CH$_2$CH$_2$—" is meant to include both —O—CH$_2$CH$_2$— and —CH$_2$CH$_2$—O—.

The terms "alkoxy," "alkylamino" and "alkylthio" (or thioalkoxy) are used in their conventional sense, and refer to those alkyl groups attached to the remainder of the molecule via an oxygen atom, an amino group, or a sulfur atom, respectively. Additionally, for dialkylamino groups, the alkyl portions can be the same or different and can also be combined to form a 3-7 membered ring with the nitrogen atom to which each is attached. Accordingly, a group represented as dialkylamino or —NR$^a$R$^b$ is meant to include piperidinyl, pyrrolidinyl, morpholinyl, azetidinyl and the like.

The terms "arylalkyl" and "heteroarylalkyl" are used in their conventional sense, and refer to those groups wherein an aryl group or a heteroaryl group is attached remainder of the molecule via C$_1$-C$_4$ alkylene linker. An exemplary embodiment of "arylalkyl" is phenylmethyl (or benzyl). Similarly, an exemplary embodiment of "heteroarylalkyl" is, for example, 3-pyridylpropyl. When 'optionally substituted' is used to describe either of the terms "arylalkyl" or "heteroarylalkyl", it is meant to refer to those groups wherein the aryl or heteroaryl portion is optionally substituted as in the definitions below, and the alkyl portion is optionally substituted as in the definitions below.

The terms "halo" or "halogen," by themselves or as part of another substituent, mean, unless otherwise stated, a fluorine, chlorine, bromine, or iodine atom. Additionally, terms such as "haloalkyl," are meant to include monohaloalkyl and polyhaloalkyl. For example, the term "C$_{1-4}$ haloalkyl" is mean to include trifluoromethyl, 2,2,2-trifluoroethyl, 4-chlorobutyl, 3-bromopropyl, and the like.

The term "aryl" means, unless otherwise stated, a polyunsaturated, typically aromatic, hydrocarbon group which can be a single ring or multiple rings (up to three rings)

which are fused together or linked covalently. Non-limiting examples of aryl groups include phenyl, naphthyl and biphenyl.

The term "heteroaryl" refers to aryl groups (or rings) that contain from one to five heteroatoms selected from N, O, and S, wherein the nitrogen and sulfur atoms are optionally oxidized, and the nitrogen atom(s) are optionally quaternized. A heteroaryl group can be attached to the remainder of the molecule through a heteroatom. Non-limiting examples of heteroaryl groups include pyridyl, pyridazinyl, pyrazinyl, pyrimindinyl, triazinyl, quinolinyl, quinoxalinyl, quinazolinyl, cinnolinyl, phthalazinyl, benzotriazinyl, purinyl, benzimidazolyl, benzopyrazolyl, benzotriazolyl, benzisoxazolyl, isobenzofuryl, isoindolyl, indolizinyl, benzotriazinyl, thienopyridinyl, thienopyrimidinyl, pyrazolopyrimidinyl, imidazopyridines, benzothiaxolyl, benzofuranyl, benzothienyl, indolyl, quinolyl, isoquinolyl, isothiazolyl, pyrazolyl, indazolyl, pteridinyl, imidazolyl, triazolyl, tetrazolyl, oxazolyl, isoxazolyl, thiadiazolyl, pyrrolyl, thiazolyl, furyl, thienyl and the like. Substituents for a heteroaryl ring can be selected from the group of acceptable substituents described below.

The above terms (e.g., "alkyl," "aryl" and "heteroaryl"), in some embodiments, will be optionally substituted. Selected substituents for each type of radical are provided below.

Optional substituents for the alkyl radicals (including those groups often referred to as alkylene, alkenyl, alkynyl and cycloalkyl) can be a variety of groups selected from: halogen, —OR', —NR'R", —SR', —SiR'R"R'", —OC(O)R', —C(O)R', —CO$_2$R', —CONR'R", —OC(O)NR'R", —NR"C(O)R', —NR'—C(O)NR"R'", —NR"C(O)$_2$R', —NH—C(NH$_2$)=NH, —NR'C(NH$_2$)=NH, —NH—C(NH$_2$)=NR', —S(O)R', —S(O)$_2$R', —S(O)$_2$NR'R", —NR'S(O)$_2$R", —CN and —NO$_2$ in a number ranging from zero to (2m'+1), where m' is the total number of carbon atoms in such radical. R', R" and R'" each independently refer to hydrogen, unsubstituted $C_{1-8}$ alkyl, unsubstituted aryl, aryl substituted with 1-3 halogens, unsubstituted $C_{1-8}$ alkyl, $C_{1-8}$ alkoxy or $C_{1-8}$ thioalkoxy groups, or unsubstituted aryl-$C_{1-4}$ alkyl groups. When R' and R" are attached to the same nitrogen atom, they can be combined with the nitrogen atom to form a 3-, 4-, 5-, 6-, or 7-membered ring. For example, —NR'R" is meant to include 1-pyrrolidinyl and 4-morpholinyl.

Similarly, optional substituents for the aryl and heteroaryl groups are varied and are generally selected from: -halogen, —OR', —OC(O)R', —NR'R", —SR', —R', —CN, —NO$_2$, —CO$_2$R', —CONR'R", —C(O)R', —OC(O)NR'R", —NR"C(O)R', —NR"C(O)$_2$R', —NR'—C(O)NR"R'", —NH—C(NH$_2$)=NH, —NR'C(NH$_2$)=NH, —NH—C(NH$_2$)=NR', —S(O)R', —S(O)$_2$R', —S(O)$_2$NR'R", —NR'S(O)$_2$R", —N$_3$, perfluoro($C_1$-$C_4$)alkoxy, and perfluoro($C_1$-$C_4$)alkyl, in a number ranging from zero to the total number of open valences on the aromatic ring system; and where R', R" and R'" are independently selected from hydrogen, $C_{1-8}$ alkyl, $C_{1-8}$ haloalkyl, $C_{3-6}$ cycloalkyl, $C_{2-8}$ alkenyl and $C_{2-8}$ alkynyl. Other suitable substituents include each of the above aryl substituents attached to a ring atom by an alkylene tether of from 1-4 carbon atoms.

Two of the substituents on adjacent atoms of the aryl or heteroaryl ring may optionally be replaced with a substituent of the formula -T-C(O)—(CH$_2$)$_q$-U-, wherein T and U are independently —NH—, —O—, —CH$_2$— or a single bond, and q is an integer of from 0 to 2. Alternatively, two of the substituents on adjacent atoms of the aryl or heteroaryl ring may optionally be replaced with a substituent of the formula -A-(CH$_2$)$_r$—B—, wherein A and B are independently —CH$_2$—, —O—, —NH—, —S—, —S(O)—, —S(O)$_2$—, —S(O)$_2$NR'— or a single bond, and r is an integer of from 1 to 3. One of the single bonds of the new ring so formed may optionally be replaced with a double bond. Alternatively, two of the substituents on adjacent atoms of the aryl or heteroaryl ring may optionally be replaced with a substituent of the formula —(CH$_2$)—X—(CH$_2$)$_t$—, where s and t are independently integers of from 0 to 3, and X is —O—, —NR'—, —S—, —S(O)—, —S(O)$_2$—, or —S(O)$_2$NR'—. The substituent R' in —NR'— and —S(O)$_2$NR'— is selected from hydrogen or unsubstituted $C_{1-6}$ alkyl.

As used herein, the term "heteroatom" is meant to include oxygen (O), nitrogen (N), sulfur (S) and silicon (Si).

The term "pharmaceutically acceptable salts" is meant to include salts of the active compounds which are prepared with relatively nontoxic acids or bases, depending on the particular substituents found on the compounds described herein. When compounds of the present invention contain relatively acidic functionalities, base addition salts can be obtained by contacting the neutral form of such compounds with a sufficient amount of the desired base, either neat or in a suitable inert solvent. Examples of salts derived from pharmaceutically-acceptable inorganic bases include aluminum, ammonium, calcium, copper, ferric, ferrous, lithium, magnesium, manganic, manganous, potassium, sodium, zinc and the like. Salts derived from pharmaceutically-acceptable organic bases include salts of primary, secondary and tertiary amines, including substituted amines, cyclic amines, naturally-occurring amines and the like, such as arginine, betaine, caffeine, choline, N,N'-dibenzylethylenediamine, diethylamine, 2-diethylaminoethanol, 2-dimethylaminoethanol, ethanolamine, ethylenediamine, N-ethylmorpholine, N-ethylpiperidine, glucamine, glucosamine, histidine, hydrabamine, isopropylamine, lysine, methylglucamine, morpholine, piperazine, piperidine, polyamine resins, procaine, purines, theobromine, triethylamine, trimethylamine, tripropylamine, tromethamine and the like. When compounds of the present invention contain relatively basic functionalities, acid addition salts can be obtained by contacting the neutral form of such compounds with a sufficient amount of the desired acid, either neat or in a suitable inert solvent. Examples of pharmaceutically acceptable acid addition salts include those derived from inorganic acids like hydrochloric, hydrobromic, nitric, carbonic, monohydrogencarbonic, phosphoric, monohydrogenphosphoric, dihydrogenphosphoric, sulfuric, monohydrogensulfuric, hydriodic, or phosphorous acids and the like, as well as the salts derived from relatively nontoxic organic acids like acetic, propionic, isobutyric, malonic, benzoic, succinic, suberic, fumaric, mandelic, phthalic, benzenesulfonic, p-tolylsulfonic, citric, tartaric, methanesulfonic, and the like. Also included are salts of amino acids such as arginate and the like, and salts of organic acids like glucuronic or galactunoric acids and the like (see, for example, Berge, S. M., et al, "Pharmaceutical Salts", *Journal of Pharmaceutical Science*, 1977, 66, 1-19). Certain specific compounds of the present invention contain both basic and acidic functionalities that allow the compounds to be converted into either base or acid addition salts.

The neutral forms of the compounds may be regenerated by contacting the salt with a base or acid and isolating the parent compound in the conventional manner. The parent form of the compound differs from the various salt forms in certain physical properties, such as solubility in polar solvents, but otherwise the salts are equivalent to the parent form of the compound for the purposes of the present invention.

In addition to salt forms, the present invention provides compounds which are in a prodrug form. Prodrugs of the compounds described herein are those compounds that readily undergo chemical changes under physiological conditions to provide the compounds of the present invention. Additionally, prodrugs can be converted to the compounds of the present invention by chemical or biochemical methods in an ex vivo environment. For example, prodrugs can be slowly converted to the compounds of the present invention when placed in a transdermal patch reservoir with a suitable enzyme or chemical reagent.

Certain compounds of the present invention can exist in unsolvated forms as well as solvated forms, including hydrated forms. In general, the solvated forms are equivalent to unsolvated forms and are intended to be encompassed within the scope of the present invention. Certain compounds of the present invention may exist in multiple crystalline or amorphous forms. In general, all physical forms are equivalent for the uses contemplated by the present invention and are intended to be within the scope of the present invention.

Certain compounds of the present invention possess asymmetric carbon atoms (optical centers) or double bonds; the racemates, diastereomers, geometric isomers, regioisomers and individual isomers (e.g., separate enantiomers) are all intended to be encompassed within the scope of the present invention. When a stereochemical depiction is shown, it is meant to refer the compound in which one of the isomers is present and substantially free of the other isomer. 'Substantially free of' another isomer indicates at least an 80/20 ratio of the two isomers, more preferably 90/10, or 95/5 or more. In some embodiments, one of the isomers will be present in an amount of at least 99%.

The compounds of the present invention may also contain unnatural proportions of atomic isotopes at one or more of the atoms that constitute such compounds. Unnatural proportions of an isotope may be defined as ranging from the amount found in nature to an amount consisting of 100% of the atom in question. For example, the compounds may incorporate radioactive isotopes, such as for example tritium ($^3$H), iodine-125 ($^{125}$I) or carbon-14 ($^{14}$C), or non-radioactive isotopes, such as deuterium ($^2$H) or carbon-13 ($^{13}$C). Such isotopic variations can provide additional utilities to those described elsewhere within this application. For instance, isotopic variants of the compounds of the invention may find additional utility, including but not limited to, as diagnostic and/or imaging reagents, or as cytotoxic/radiotoxic therapeutic agents. Additionally, isotopic variants of the compounds of the invention can have altered pharmacokinetic and pharmacodynamic characteristics which can contribute to enhanced safety, tolerability or efficacy during treatment. All isotopic variations of the compounds of the present invention, whether radioactive or not, are intended to be encompassed within the scope of the present invention.

The terms "patient" or "subject" are used interchangeably to refer to a human or a non-human animal (e.g., a mammal).

The terms "administration", "administer" and the like, as they apply to, for example, a subject, cell, tissue, organ, or biological fluid, refer to contact of, for example, an inhibitor of CD73, a pharmaceutical composition comprising same, or a diagnostic agent to the subject, cell, tissue, organ, or biological fluid. In the context of a cell, administration includes contact (e.g., in vitro or ex vivo) of a reagent to the cell, as well as contact of a reagent to a fluid, where the fluid is in contact with the cell.

The terms "treat", "treating", treatment" and the like refer to a course of action (such as administering an inhibitor of CD73 or a pharmaceutical composition comprising same) initiated after a disease, disorder or condition, or a symptom thereof, has been diagnosed, observed, and the like so as to eliminate, reduce, suppress, mitigate, or ameliorate, either temporarily or permanently, at least one of the underlying causes of a disease, disorder, or condition afflicting a subject, or at least one of the symptoms associated with a disease, disorder, condition afflicting a subject. Thus, treatment includes inhibiting (e.g., arresting the development or further development of the disease, disorder or condition or clinical symptoms association therewith) an active disease.

The term "in need of treatment" as used herein refers to a judgment made by a physician or other caregiver that a subject requires or will benefit from treatment. This judgment is made based on a variety of factors that are in the realm of the physician's or caregiver's expertise.

The terms "prevent", "preventing", "prevention" and the like refer to a course of action (such as administering an CD73 inhibitor or a pharmaceutical composition comprising same) initiated in a manner (e.g., prior to the onset of a disease, disorder, condition or symptom thereof) so as to prevent, suppress, inhibit or reduce, either temporarily or permanently, a subject's risk of developing a disease, disorder, condition or the like (as determined by, for example, the absence of clinical symptoms) or delaying the onset thereof, generally in the context of a subject predisposed to having a particular disease, disorder or condition. In certain instances, the terms also refer to slowing the progression of the disease, disorder or condition or inhibiting progression thereof to a harmful or otherwise undesired state.

The term "in need of prevention" as used herein refers to a judgment made by a physician or other caregiver that a subject requires or will benefit from preventative care. This judgment is made based on a variety of factors that are in the realm of a physician's or caregiver's expertise.

The phrase "therapeutically effective amount" refers to the administration of an agent to a subject, either alone or as part of a pharmaceutical composition and either in a single dose or as part of a series of doses, in an amount capable of having any detectable, positive effect on any symptom, aspect, or characteristic of a disease, disorder or condition when administered to the subject. The therapeutically effective amount can be ascertained by measuring relevant physiological effects, and it can be adjusted in connection with the dosing regimen and diagnostic analysis of the subject's condition, and the like. By way of example, measurement of the serum level of an CD73 inhibitor (or, e.g., a metabolite thereof) at a particular time post-administration may be indicative of whether a therapeutically effective amount has been used.

The phrase "in a sufficient amount to effect a change" means that there is a detectable difference between a level of an indicator measured before (e.g., a baseline level) and after administration of a particular therapy. Indicators include any objective parameter (e.g., serum concentration) or subjective parameter (e.g., a subject's feeling of well-being).

The term "small molecules" refers to chemical compounds having a molecular weight that is less than about 10 kDa, less than about 2 kDa, or less than about 1 kDa. Small molecules include, but are not limited to, inorganic molecules, organic molecules, organic molecules containing an inorganic component, molecules comprising a radioactive atom, and synthetic molecules. Therapeutically, a small molecule may be more permeable to cells, less susceptible to degradation, and less likely to elicit an immune response than large molecules.

The term "ligand" refers to, for example, a peptide, a polypeptide, a membrane-associated or membrane-bound molecule, or a complex thereof, that can act as an agonist or antagonist of a receptor. A ligand encompasses natural and synthetic ligands, e.g., cytokines, cytokine variants, analogs, muteins, and binding compositions derived from antibodies, as well as small molecules. The term also encompasses an agent that is neither an agonist nor antagonist, but that can bind to a receptor without significantly influencing its biological properties, e.g., signaling or adhesion. Moreover, the term includes a membrane-bound ligand that has been changed by, e.g., chemical or recombinant methods, to a soluble version of the membrane-bound ligand. A ligand or receptor may be entirely intracellular, that is, it may reside in the cytosol, nucleus, or some other intracellular compartment. The complex of a ligand and receptor is termed a "ligand-receptor complex."

The terms "inhibitors" and "antagonists", or "activators" and "agonists" refer to inhibitory or activating molecules, respectively, for example, for the activation of, e.g., a ligand, receptor, cofactor, gene, cell, tissue, or organ. Inhibitors are molecules that decrease, block, prevent, delay activation, inactivate, desensitize, or down-regulate, e.g., a gene, protein, ligand, receptor, or cell. Activators are molecules that increase, activate, facilitate, enhance activation, sensitize, or up-regulate, e.g., a gene, protein, ligand, receptor, or cell. An inhibitor may also be defined as a molecule that reduces, blocks, or inactivates a constitutive activity. An "agonist" is a molecule that interacts with a target to cause or promote an increase in the activation of the target. An "antagonist" is a molecule that opposes the action(s) of an agonist. An antagonist prevents, reduces, inhibits, or neutralizes the activity of an agonist, and an antagonist can also prevent, inhibit, or reduce constitutive activity of a target, e.g., a target receptor, even where there is no identified agonist.

The terms "modulate", "modulation" and the like refer to the ability of a molecule (e.g., an activator or an inhibitor) to increase or decrease the function or activity of CD73, either directly or indirectly. A modulator may act alone, or it may use a cofactor, e.g., a protein, metal ion, or small molecule. Examples of modulators include small molecule compounds and other bioorganic molecules. Numerous libraries of small molecule compounds (e.g., combinatorial libraries) are commercially available and can serve as a starting point for identifying a modulator. The skilled artisan is able to develop one or more assays (e.g., biochemical or cell-based assays) in which such compound libraries can be screened in order to identify one or more compounds having the desired properties; thereafter, the skilled medicinal chemist is able to optimize such one or more compounds by, for example, synthesizing and evaluating analogs and derivatives thereof. Synthetic and/or molecular modeling studies can also be utilized in the identification of an Activator.

The "activity" of a molecule may describe or refer to the binding of the molecule to a ligand or to a receptor; to catalytic activity; to the ability to stimulate gene expression or cell signaling, differentiation, or maturation; to antigenic activity; to the modulation of activities of other molecules; and the like. The term "proliferative activity" encompasses an activity that promotes, that is necessary for, or that is specifically associated with, for example, normal cell division, as well as cancer, tumors, dysplasia, cell transformation, metastasis, and angiogenesis.

As used herein, "comparable", "comparable activity", "activity comparable to", "comparable effect", "effect comparable to", and the like are relative terms that can be viewed quantitatively and/or qualitatively. The meaning of the terms is frequently dependent on the context in which they are used. By way of example, two agents that both activate a receptor can be viewed as having a comparable effect from a qualitative perspective, but the two agents can be viewed as lacking a comparable effect from a quantitative perspective if one agent is only able to achieve 20% of the activity of the other agent as determined in an art-accepted assay (e.g., a dose-response assay) or in an art-accepted animal model. When comparing one result to another result (e.g., one result to a reference standard), "comparable" frequently (though not always) means that one result deviates from a reference standard by less than 35%, by less than 30%, by less than 25%, by less than 20%, by less than 15%, by less than 10%, by less than 7%, by less than 5%, by less than 4%, by less than 3%, by less than 2%, or by less than 1%. In particular embodiments, one result is comparable to a reference standard if it deviates by less than 15%, by less than 10%, or by less than 5% from the reference standard. By way of example, but not limitation, the activity or effect may refer to efficacy, stability, solubility, or immunogenicity.

"Substantially pure" indicates that a component makes up greater than about 50% of the total content of the composition, and typically greater than about 60% of the total content. More typically, "substantially pure" refers to compositions in which at least 75%, at least 85%, at least 90% or more of the total composition is the component of interest. In some cases, the component of interest will make up greater than about 90%, or greater than about 95% of the total content of the composition.

The terms "specifically binds" or "selectively binds", when referring to a ligand/receptor, antibody/antigen, or other binding pair, indicates a binding reaction which is determinative of the presence of the protein in a heterogeneous population of proteins and other biologics. Thus, under designated conditions, a specified ligand binds to a particular receptor and does not bind in a significant amount to other proteins present in the sample. The antibody, or binding composition derived from the antigen-binding site of an antibody, of the contemplated method binds to its antigen, or a variant or mutein thereof, with an affinity that is at least two-fold greater, at least ten times greater, at least 20-times greater, or at least 100-times greater than the affinity with any other antibody, or binding composition derived therefrom. In a particular embodiment, the antibody will have an affinity that is greater than about $10^9$ liters/mol, as determined by, e.g., Scatchard analysis (Munsen, et al. 1980 Analyt. Biochem. 107:220-239).

The term "response," for example, of a cell, tissue, organ, or organism, encompasses a change in biochemical or physiological behavior, e.g., concentration, density, adhesion, or migration within a biological compartment, rate of gene expression, or state of differentiation, where the change is correlated with activation, stimulation, or treatment, or with internal mechanisms such as genetic programming. In certain contexts, the terms "activation", "stimulation", and the like refer to cell activation as regulated by internal mechanisms, as well as by external or environmental factors; whereas the terms "inhibition", "down-regulation" and the like refer to the opposite effects.

The terms "polypeptide," "peptide," and "protein", used interchangeably herein, refer to a polymeric form of amino acids of any length, which can include genetically coded and non-genetically coded amino acids, chemically or biochemically modified or derivatized amino acids, and polypeptides having modified polypeptide backbones. The terms include fusion proteins, including, but not limited to, fusion proteins with a heterologous amino acid sequence, fusion proteins with heterologous and homologous leader sequences, with or without N-terminus methionine residues; immunologically tagged proteins; and the like.

As used herein, the terms "variants" and "homologs" are used interchangeably to refer to amino acid or DNA sequences that are similar to reference amino acid or nucleic acid sequences, respectively. The term encompasses naturally-occurring variants and non-naturally-occurring variants. Naturally-occurring variants include homologs (polypeptides and nucleic acids that differ in amino acid or nucleotide sequence, respectively, from one species to another), and allelic variants (polypeptides and nucleic acids that differ in amino acid or nucleotide sequence, respectively, from one individual to another within a species). Thus, variants and homologs encompass naturally occurring DNA sequences and proteins encoded thereby and their isoforms, as well as splice variants of a protein or gene. The terms also encompass nucleic acid sequences that vary in one or more bases from a naturally-occurring DNA sequence but still translate into an amino acid sequence that corresponds to the naturally-occurring protein due to degeneracy of the genetic code. Non-naturally-occurring variants and homologs include polypeptides and nucleic acids that comprise a change in amino acid or nucleotide sequence, respectively, where the change in sequence is artificially introduced (e.g., muteins); for example, the change is generated in the laboratory by human intervention ("hand of man"). Therefore, non-naturally occurring variants and homologs may also refer to those that differ from the naturally-occurring sequences by one or more conservative substitutions and/or tags and/or conjugates.

The term "muteins" as used herein refers broadly to mutated recombinant proteins. These proteins usually carry single or multiple amino acid substitutions and are frequently derived from cloned genes that have been subjected to site-directed or random mutagenesis, or from completely synthetic genes.

The terms "DNA", "nucleic acid", "nucleic acid molecule", "polynucleotide" and the like are used interchangeably herein to refer to a polymeric form of nucleotides of any length, either deoxyribonucleotides or ribonucleotides, or analogs thereof. Non-limiting examples of polynucleotides include linear and circular nucleic acids, messenger RNA (mRNA), complementary DNA (cDNA), recombinant polynucleotides, vectors, probes, primers and the like.

As used herein, the term "parenteral administration" refers to any non-oral means of administration. Parenteral dosage forms are generally intended for administration as an injection or infusion. Common injection types include intravenous, subcutaneous and intramuscular; infusions are typically given intravenously. Other locations of application of parenteral administration include: epidural, intraspinal, intrathecal, intracerebral, intraarticular, intracardiac, intradermal, intraperitoneal, intravitreal, intraarterial, intraorbital, and transtracheal.

As used herein, the phrase "a desired in vitro activity" refers broadly to any information (e.g., potency data) that is obtained from an assessment (e.g., a biochemical assay) of a potential therapeutic, wherein that information is viewed favorably in the context of the drug development process. Because in vivo assessments of a potential therapeutic can be, for example, costly, labor intensive, and lengthy, one or more in vitro assessments are generally performed first. As an example of a series of in vitro evaluations, a potential therapeutic that has yielded favorable data in a first in vitro assay (e.g., an enzymatic assay) may be further evaluated in a confirmatory in vitro assay (e.g., a cell-based assay). A desired in vitro activity must be an activity that correlates in some type of meaningful matter to activity in a subject (e.g., a human subject).

As used herein, the terms "pharmacokinetics" and "PK" refer to the fate of a biopharmaceutical agent administered in vivo to a subject (e.g., a human or a rodent), from the time of administration to the point at which the agent is completely eliminated from the body. In particular, pharmacokinetics describes how the body affects a biopharmaceutical agent through the mechanisms of absorption (the process by which an agent enters the circulation), distribution (the dispersion of an agent through the body's fluids and tissues), metabolism (the biotransformation of an agent into metabolite(s)), and excretion (the removal of the metabolite(s) from the body and/or the removal of the parent biopharmaceutical agent if the agent is not completely metabolized). The two processes of metabolism and excretion are sometimes referred to together as "elimination". The processes are, collectively, commonly referred to as the "ADME" parameters (Absorption, Distribution, Metabolism, Excretion). Pharmacokinetic parameters are affected by, for example, the route of administration and the dose of the administered biopharmaceutical agent. Major pharmacokinetic parameters are defined and discussed hereafter. Unless otherwise indicated, as used herein such parameters have the meaning generally ascribed to them in the art.

As used herein, the phrase "a desired pharmacokinetic parameter" refers broadly to a favorable indicia measured after exposure of a therapeutic agent to a test system, including a subject (e.g., an animal model), wherein the indicia relates in some way to the fate of the therapeutic agent from the point at which it is administered up to the point at which it is completely eliminated.

As used herein, the terms "half-life" and "t½" refer to the time it takes for the plasma concentration to decrease by one-half. The half-life of a therapeutic agent is useful for determining its frequency of administration necessary to obtain the desired plasma concentration. Generally, the half-life of a particular agent is independent of the dose administered.

As used herein, the terms "area under curve" and "AUC" (mathematically known as the definite integral) in a plot of drug concentration in blood plasma versus time. In determining AUC, the approximation used is as follows: AUC=∫([C]×Dt), where [C] is the measured concentration and Dt is the interval of time between two measurements. In practice, the drug concentration is measured at certain discrete points in time and the trapezoidal rule is used to estimate AUC. The precision of the AUC grows with the number of measurements of concentration taken. The AUC is expressed in mass (mg, g)×time/volume. Knowing the AUC of a therapeutic agent allows the measurement of its bioavailability.

As used herein, the terms "bioavailability" and "F" refer to the percentage of the administered drug which arrives in the central "compartment". It is generally measured by comparing the AUC obtained after intravenous administration with that obtained after oral administration, for example. After intravenous administration, the AUC obtained corresponds to a bioavailability which, by definition, is 100%. After oral administration, the AUC corresponds at best to an identical bioavailability; it is generally lower, sometimes zero. The "compartment" indicates the fictitious volume in which a drug would be distributed. It may or may not correspond to a real volume. The anatomical sectors in which the drug is distributed at different concentrations is represented by one or two (vary rarely) three virtual compartments where the concentration of the drug is regarded as homogeneous. For example, in a two-compartment model the volume of blood may be called the first compartment, and the volume of the whole body except blood may be called second compartment. The compartment concept thus makes it possible to model the fate of a drug.

As used herein, the terms "volume of distribution" and "Vd" refer to the fictitious volume, expressed in volume (e.g., liters) or in volume per mass (e.g., liters per kilogram), in which the drug would have been distributed by assuming that its concentration is homogeneous (i.e., the average tissue concentration is identical to that of the plasma). It may be expressed as Vd=dose/Co (initial concentration); for example, after intravenous injection of 100 mg of a drug whose initial concentration, Co, in plasma is 10 mg/L, the volume of distribution is of 10 L. For a given drug, the knowledge of its desirable concentration in blood and of its volume of distribution allows evaluation of the dose that should be administered.

As used herein, the terms "clearance" and "Cl" refer to the fraction of a theoretical volume that becomes completely devoid of drug (i.e., purified) per unit of time. Plasma clearance is the apparent volume of plasma purified per unit of time. Total clearance (Clt) is the fraction of the volume of distribution, Vd, which is completely purified per unit of time. The total clearance depends on the constant of elimination and thus on t½ and on Vd. Clearance is a constant in linear kinetics.

As used herein, the terms "steady state concentration" and "Css" refer to the state of equilibrium obtained at the end of a certain number of administrations. To obtain an increase in the plasma concentration with repeated administrations, it is necessary that a residual concentration persists at the time following administration. At the steady state, if the dose and the frequency of administrations remain constant, the concentration obtained will also be constant. The steady state is obtained at the end of approximately five half-lives.

As used herein, the phrase "a means for estimating at least one human dosing property" refers broadly to any methodology that provides information that can be used to discern a parameter linked to administration of a therapeutic agent to a human subject. An example of a means for estimating a human dosing property is allometric scaling.

As used herein, the term "allometric scaling" refers to the process of projecting pharmacokinetic parameter values determined experimentally in a few animal species to other species and ultimately to humans. The concept of correlating pharmacokinetic parameters with body weight (frequently referred to as pharmacokinetic interspecies scaling) from different animal species has become a useful tool in drug development. Such projection or correlation permits early decisions about the developmental prospects for candidate drugs and forms a basis for selection of drug dosage to provide a desired level of systemic exposure.

The rationale allometric approach to interspecies scaling is generally based on the power function, where the body weight of the species is plotted against the pharmacokinetic parameter(s) of interest. Clearance (Cl), volume of distribution (Vd), and elimination half-life are the three most frequently extrapolated pharmacokinetic parameters. The predicted clearance can be used for estimating a first-in-human dose.

5'-Nucleotidase, Ecto and Inhibition Thereof

Human CD73 (also referred to as 5'-nucleotidase, ecto; NT5E; or 5NT) is a 574 amino acid residue protein (Accession No. AAH6593). Eukaryotic CD73 functions as a non-covalent homodimer with two structural domains, wherein the N- and C-terminal domains are connected by a hinge region that enables the enzyme to undergo large domain movements and switch between open and closed conformations (Knapp, K. et al. (2012) Structure 20:2161-73).

As used herein, the terms "CD73 inhibitor", "CD73 blocker", "adenosine by 5'-nucleotidase, ecto inhibitor", "NT5E inhibitor", "5NT inhibitor" and all other related art-accepted terms refer to a compound capable of modulating, either directly or indirectly, the CD73 receptor in an in vitro assay, an in vivo model, and/or other means indicative of therapeutic efficacy. The terms also refer to compounds that exhibit at least some therapeutic benefit in a human subject. An CD73 inhibitor may be a competitive, noncompetitive, or irreversible CD73 inhibitor. "A competitive CD73 inhibitor" is a compound that reversibly inhibits CD73 enzyme activity at the catalytic site; "a noncompetitive CD73 inhibitor" is a compound that reversibly inhibits CD73 enzyme activity at a non-catalytic site; and "an irreversible CD73 inhibitor" is a compound that irreversibly eliminates CD73 enzyme activity by forming a covalent bond (or other stable means of inhibiting enzyme function) with the enzyme.

CD73 inhibitors can modulate purinergic signaling, a type of extracellular signaling mediated by purine nucleotides and nucleosides such as ATP and adenosine. Purinergic signaling involves the activation of purinergic receptors in the cell and/or in nearby cells, resulting in the regulation of cellular functions. The enzymatic activity of CD73 plays a strategic role in calibrating the duration, magnitude, and chemical nature of purinergic signals delivered to various cells (e.g., immune cells). Alteration of these enzymatic activities can change the course or dictate the outcome of several pathophysiological events, including cancer, autoimmune and inflammatory diseases, infections, atherosclerosis, and ischemia-reperfusion injury, suggesting that these ecto-enzymes represent novel therapeutic targets for managing a variety of disorders.

Studies using tissues that overexpress CD73 and using CD73 knock-out mice have provided evidence that CD73 inhibitors have potential utility for melanomas, lung cancer, prostate cancer, and breast cancer (see, e.g., Sadej R. (2006) Melanoma Res 16:213-22). Because higher expression levels of CD73 are associated with tumor neovascularization, invasiveness, resistance to chemotherapy, and metastasis, CD73 inhibitors can be used to control tumor progression and metastasis. Other potential utilities are discussed elsewhere herein.

Asset forth above, although the compounds of the present invention are believed to affect their activity by inhibition of CD73, a precise understanding of the compounds' underlying mechanism of action is not required to practice the invention. For example, the compounds can also affect their activity, at least in part, through modulation (e.g., inhibition) of other components of the purinergic signaling pathway (e.g., CD39). The purinergic signaling system consists of transporters, enzymes and receptors responsible for the synthesis, release, action, and extracellular inactivation of (primarily) ATP and its extracellular breakdown product adenosine (Sperlagh, B. et al. (December 2012) Neuropsychopharmacologia Hungarica 14(4):231-38). A representation of extracellular purinergic signaling is set forth in, e.g., *North RA* (October 2002) *Physiological Reviews* 82(4):

1013-67. As indicated therein, there are several potential opportunities for modulation of the signaling process. However, as will be apparent to the skilled artisan, some of these opportunities are more tractable than others.

Identification of CD73 Inhibitors Suitable for Parenteral Administration

The present invention is drawn, in part, to the identification of inhibitors of CD73 having particular pharmacokinetic properties. In some embodiments, the particular PK properties allow the compounds identified by the methods set forth herein to be administered parenterally at least every week. In some embodiments, the compounds having the desired PK properties are identified from a genus of compounds set forth herein based on the following assessments (often in the sequence set forth) or a subset thereof is performed: assessment of activity in vitro; PK determination in animals; allometric scaling; acceptable formulation characteristics (e.g., solubility); and suitable dosing frequency for concomitant combination therapy. The methodologies, some of which are discussed hereafter, used in the various assessments will be apparent to the skilled artisan. For example, one step in the identification of candidate inhibitors may comprise utilizing an art-accepted assay or model to determine (or estimate) in vitro activity. Representative assays for determining in vitro activity is described in the Experimental section.

In one embodiment, the present invention contemplates a method of identifying a compound, or a pharmaceutically acceptable salt, hydrate, or solvate thereof, suitable for parenteral administration to a subject at an interval of at least every week, for the treatment of a disease, disorder, or condition, mediated at least in part by CD73, the method comprising, in either order: a) assessing the in vitro activity of at least one compound encompassed by a genus of compounds, wherein a compound(s) possessing a desired in vitro activity is a candidate compound(s); and b) determining the pharmacokinetic parameters in a subject of the candidate compound(s), wherein a candidate compound(s) possessing a desired pharmacokinetic parameter is a compound suitable for parenteral administration to a subject at an interval of at least every week, wherein the genus of compounds has the formula:

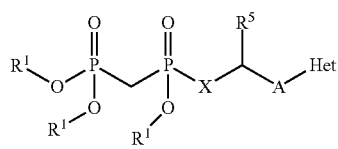

or a pharmaceutically acceptable salt, hydrate, or solvate thereof, wherein, each $R^1$ is independently selected from the group consisting of hydrogen, optionally substituted $C_1$-$C_6$ alkyl, optionally substituted aryl, and —C($R^2R^2$)—O—C(O)—O$R^3$, or two $R^1$ groups are optionally combined to form a 5- to 7-membered ring;

each $R^2$ is independently selected from the group consisting of H and optionally substituted $C_1$-$C_6$ alkyl;

each $R^3$ is independently selected from the group consisting of H, $C_1$-$C_6$ alkyl, and optionally substituted aryl;

$R^5$ is selected from the group consisting of H and optionally substituted $C_1$-$C_6$ alkyl;

X is O;

A is selected from the group consisting of:

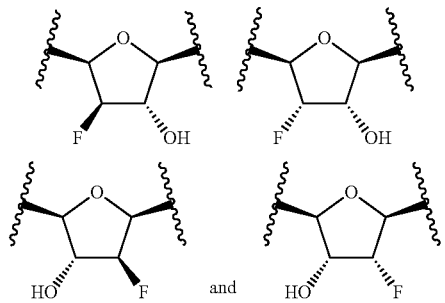

and

Het is selected from the group consisting of:

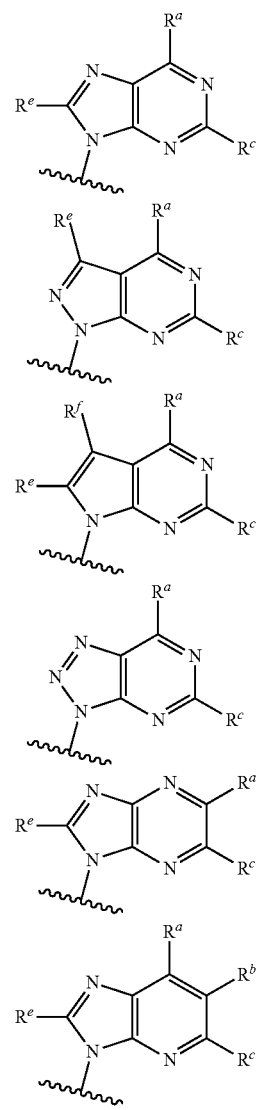

-continued

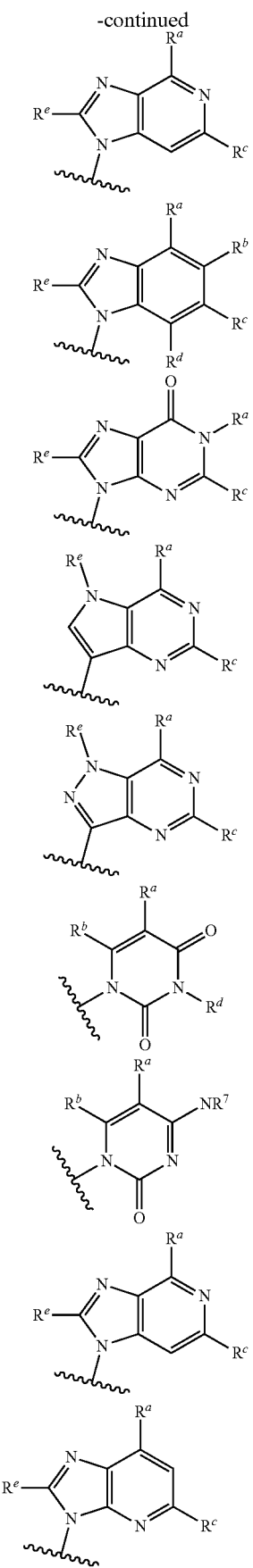

-continued

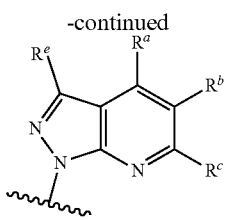

wherein the wavy line indicates the point of attachment to the remainder of the compound, and wherein:

$R^a$ is selected from the group consisting of H, $NH_2$, $NHR^7$, $NHC(O)R^7$, $NR^7R^7$, $R^7$, OH, $SR^7$ and $OR^7$;

$R^b$ is selected from the group consisting of H, halogen, $NH_2$, $NHR^7$, $NR^7R^7$, $R^7$, OH, and $OR^7$;

$R^c$ and $R^d$ are independently selected from the group consisting of H, halogen, haloalkyl, $NH_2$, $NHR^7$, $NR^7R^7$, $R^7$, OH, $OR^7$, $SR^7$, $SO_2R^7$, $-X^1-NH_2$, $-X^1-NHR^7$, $-X^1-NR^7R^7$, $-X^1-OH$, $-X^1-OR^7$, $-X^1-SR^7$ and $-X^1-SO_2R^7$;

$R^e$ and $R^f$ are independently selected from the group consisting of H, halogen, and optionally substituted $C_1$-$C_6$ alkyl;

each $X^1$ is $C_1$-$C_4$alkylene; and each $R^7$ is independently selected from the group consisting of optionally substituted $C_1$-$C_{10}$ alkyl, optionally substituted $C_2$-$C_{10}$ alkenyl, optionally substituted $C_2$-$C_{10}$ alkynyl, optionally substituted $C_3$-$C_7$ cycloalkyl, optionally substituted $C_3$-$C_7$ cycloalkyl$C_1$-$C_4$alkyl, optionally substituted 4-7 membered cycloheteroalkyl, optionally substituted 4-7 membered cycloheteroalkyl$C_1$-$C_4$alkyl, optionally substituted aryl, optionally substituted aryl$C_1$-$C_4$alkyl, optionally substituted ary$C_2$-$C_4$alkenyl, optionally substituted ary$C_2$-$C_4$alkynyl, optionally substituted heteroaryl, optionally substituted heteroaryl$C_1$-$C_4$alkyl, optionally substituted heteroaryl$C_1$-$C_4$alkenyl, optionally substituted heteroaryl$C_2$-$C_4$alkynyl, and optionally, two $R^7$ groups attached to a nitrogen atom are joined together to form a 4- to 7-membered heterocyclic ring, optionally fused to an aryl ring.

In some embodiments of the method of identifying a compound set forth above, A is

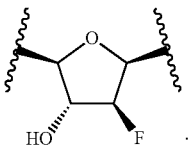

In other embodiments of the method of identifying a compound, Het is selected from the group consisting of:

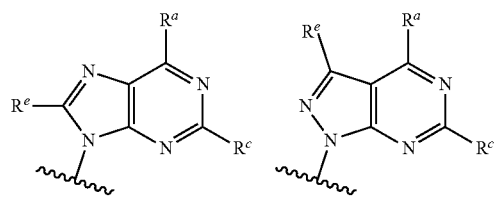

-continued

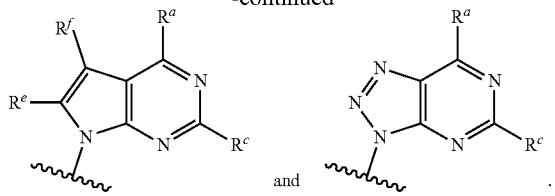

and

In still other embodiments of the above-described method of identifying a compound, the compound has the formula:

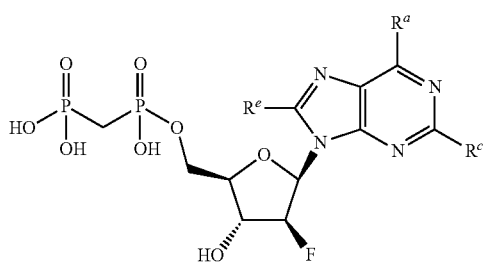

or a pharmaceutically acceptable salt, hydrate, or solvate thereof. In certain embodiments, the compound or a pharmaceutically acceptable salt, hydrate, or solvate thereof, $R^a$ is selected from the group consisting of $NH_2$, $NHR^7$, $NR^7R^7$, $SR^7$ and $OR^7$. In certain additional embodiments, the compound or a pharmaceutically acceptable salt, hydrate, or solvate thereof, $R^c$ is selected from the group consisting of halogen, $R^7$, $OR^7$, $SR^7$, $SO_2R^7$, $—X^1—NH_2$, $—X^1—NHR^7$, $—X^1—NR^7R^7$, $—X^1—OH$, $—X^1—OR^7$, $—X^1—SR^7$ and $—X^1—SO_2R^7$. In still certain additional embodiments, the compound or a pharmaceutically acceptable salt, hydrate, or solvate thereof, $R^e$ is H.

In another embodiment, the present invention contemplates a method of identifying a compound, or a pharmaceutically acceptable salt, hydrate, or solvate thereof, suitable for parenteral administration to a subject at an interval of at least every week, for the treatment of a disease, disorder, or condition, mediated at least in part by CD73, the method comprising, in either order: a) assessing the in vitro activity of at least one compound encompassed by a genus of compounds, wherein a compound(s) possessing a desired in vitro activity is a candidate compound(s); and b) determining the pharmacokinetic parameters in a subject of the candidate compound(s), wherein a candidate compound(s) possessing a desired pharmacokinetic parameter is a compound suitable for parenteral administration to a subject at an interval of at least every week, wherein the genus of compounds has the formula:

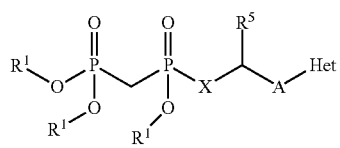

wherein,
each $R^1$ is independently selected from the group consisting of hydrogen, optionally substituted $C_1$-$C_6$ alkyl, optionally substituted aryl, and $—C(R^2R^2)—O—C$(O)—$OR^3$, or two $R^1$ groups are optionally combined to form a 5- to 7-membered ring;
each $R^2$ is independently selected from the group consisting of H and optionally substituted $C_1$-$C_6$ alkyl;
each $R^3$ is independently selected from the group consisting of H, $C_1$-$C_6$ alkyl, and optionally substituted aryl;
$R^5$ is selected from the group consisting of H and optionally substituted $C_1$-$C_6$ alkyl;
X is selected from the group consisting of O, $CH_2$, and S;
A is selected from the group consisting of:

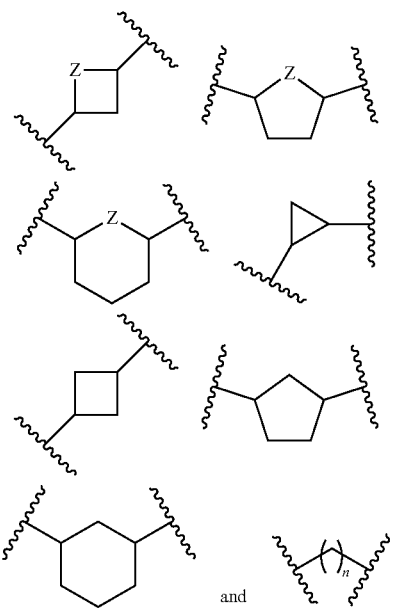

and each of which is optionally substituted with from 1 to 5 $R^6$ substituents, and wherein the subscript n is an integer from 0 to 3;
Z is selected from the group consisting of $CH_2$, $CHR^6$, $NR^6$, and O;
each $R^6$ is independently selected from the group consisting of H, $CH_3$, OH, CN, F, optionally substituted $C_1$-$C_6$ alkyl, and $OC(O)$—$C_1$-$C_6$ alkyl; and optionally two $R^6$ groups on adjacent ring vertices are joined together to form a 5- to 6-membered ring having at least one heteroatom as a ring vertex; and
Het is selected from the group consisting of:

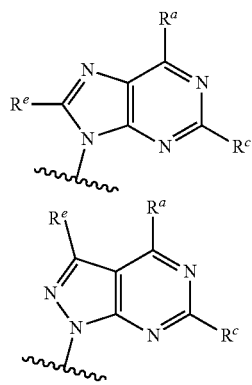

-continued

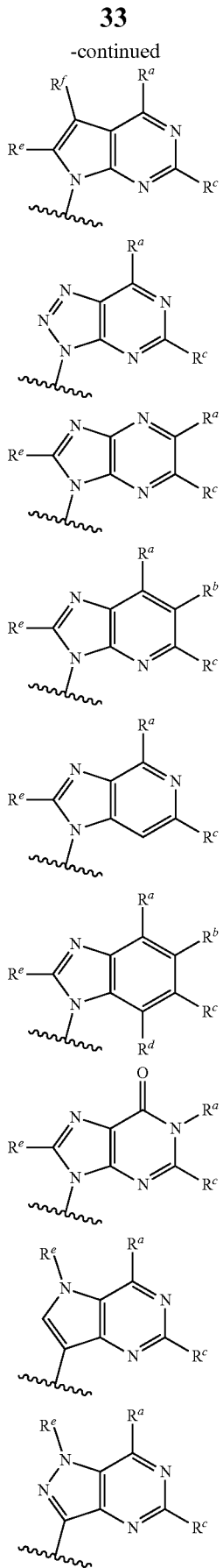

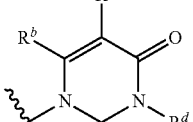

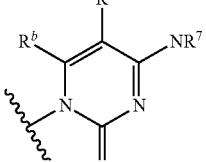

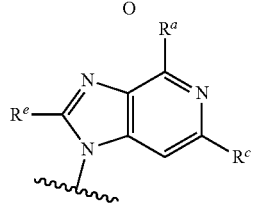

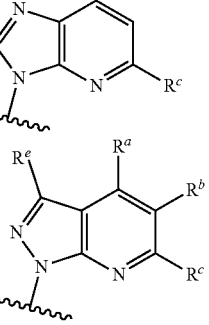

and wherein the wavy line indicates the point of attachment to the remainder of the compound, and wherein:

$R^a$ is selected from the group consisting of H, $NH_2$, $NHR^7$, $NHC(O)R^7$, $NR^7R^7$, $R^7$, OH, $SR^7$ and $OR^7$;

$R^b$ is selected from the group consisting of H, halogen, $NH_2$, $NHR^7$, $NR^7R^7$, $R^7$, OH, and $OR^7$;

$R^c$ and $R^d$ are independently selected from the group consisting of H, halogen, haloalkyl, $NH_2$, $NHR^7$, $NR^7R^7$, $R^7$, OH, $OR^7$, $SR^7$, $SO_2R^7$, —$X^1$—$NH_2$, —$X^1$—$NHR^7$, —$X^1$—$NR^7R^7$, —$X^1$—OH, —$X^1$—$OR^7$, —$X^1$—$SR^7$ and —$X^1$—$SO_2R^7$;

$R^e$ and $R^f$ are independently selected from the group consisting of H, halogen, and optionally substituted $C_1$-$C_6$ alkyl;

each $X^1$ is $C_1$-$C_4$alkylene; and each $R^7$ is independently selected from the group consisting of optionally substituted $C_1$-$C_{10}$ alkyl, optionally substituted $C_2$-$C_{10}$ alkenyl, optionally substituted $C_2$-$C_{10}$ alkynyl, optionally substituted $C_3$-$C_7$ cycloalkyl, optionally substituted $C_3$-$C_7$ cycloalkyl$C_1$-$C_4$alkyl, optionally substituted 4-7 membered cycloheteroalkyl, optionally substituted 4-7 membered cycloheteroalkyl$C_1$-$C_4$alkyl, optionally substituted aryl, optionally substituted aryl$C_1$-$C_4$alkyl, optionally substituted aryl$C_2$-$C_4$alkenyl, optionally substituted aryl$C_2$-$C_4$alkynyl, optionally substituted heteroaryl, optionally substituted heteroaryl$C_1$-$C_4$alkyl, optionally substituted heteroaryl$C_1$-$C_4$alkenyl, optionally substituted heteroarylC$_2$-C$_4$alkynyl, and optionally, two R$^7$ groups attached to a nitrogen atom are joined together to form a 4- to 7-membered heterocyclic ring, optionally fused to an aryl ring;

with the proviso that the compounds are other than those compounds wherein the combination of X, A, and Het results in

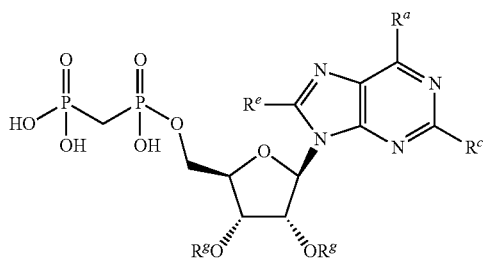

wherein R$^g$ is H or the two R$^g$ groups are combined to form an acetonide; and either (i) R$^c$ and R$^e$ are hydrogen and R$^a$ is —OEt, —OCH$_2$Ph, —SCH$_2$Ph, —NH$_2$, methylamino, ethylamino, dimethylamino, diethylamino, N-methyl-N-ethylamino, phenylamino, benzylamino, 1-phenylethylamino, 2-phenylethylamino, N-benzyl-N-ethylamino, N-benzyl-N-methylamino, dibenzylamino, 4-aminobenzylamino, 2-chlorobenzylamino, 3-chlorobenzylamino, 4-chlorobenzylamino, 4-hydroxybenzylamino, 4-methoxybenzylamino, 4-nitrobenzylamino, or 4-sulfamoylbenzylamino; or (ii) R$^c$ is hydrogen, R$^a$ is —NH$_2$, and R$^e$ is bromo, chloro, aminomethyl, or thioethyl; or (iii) R$^c$ is hydrogen, R$^a$ is benzylamino, and R$^e$ is bromo; or (iv) R$^c$ is amino, R$^e$ is hydrogen, and R$^a$ is —NH$_2$, dimethylamino, diethylamino, benzylamino or N-benzyl-N-methylamino; or (v) R$^c$ is chloro, R$^e$ is hydrogen, and R$^a$ is —NH$_2$, benzylamino, 2-chlorobenzylamino, 1-phenylethylamino, (S)-1-phenylethylamino, (R)-1-phenylethylamino or N-benzyl-N-methylamino; or (vi) R$^c$ is iodo, R$^e$ is hydrogen, and R$^a$ is —NH$_2$, benzylamino or N-benzyl-N-methylamino; or (vii) R$^a$ is amino, R$^e$ is hydrogen, and R$^c$ is piperazinyl, thioallyl or cyclohexylethylthio.

In some embodiments of the method of identifying a compound or a pharmaceutically acceptable salt, hydrate, or solvate thereof, A is:

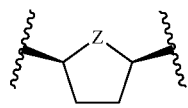

which is optionally substituted with from 1 to 5 R$^6$.

In still further embodiments of the method of identifying a compound, A is selected from the group consisting of:

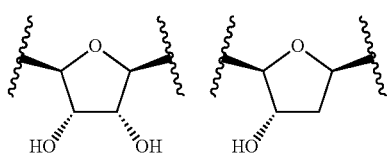

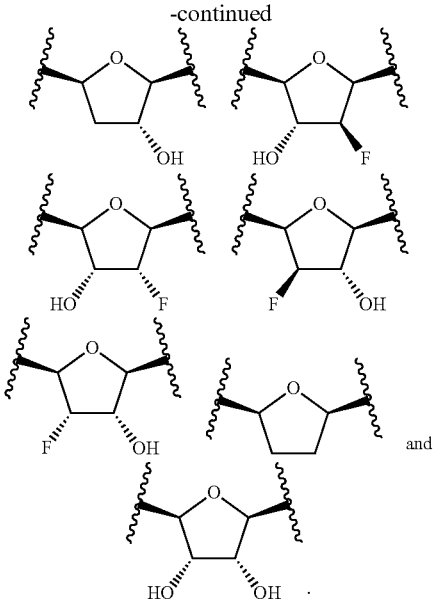

In particular embodiments of the method of identifying a compound, Het has the formula:

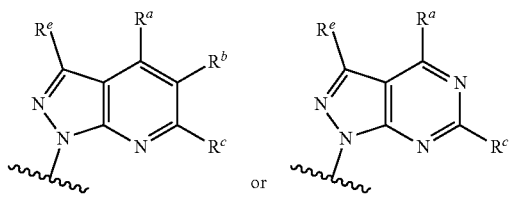

In particular embodiments, the present invention contemplates a method of identifying a compound, or a pharmaceutically acceptable salt, hydrate, or solvate thereof, wherein the compound is selected from the compounds of Table 3, set forth herein.

In other embodiments, the present invention contemplates a method of identifying a compound, or a pharmaceutically acceptable salt, hydrate, or solvate thereof, wherein the subject is a rodent (e.g., a mouse or rat), a non-human primate (e.g., a cynomolgus or rhesus monkey) or a human.

The present invention also contemplates embodiments wherein the foregoing method comprises further conducting a means (e.g., allometric scaling) for estimating at least one human dosing property.

In additional embodiments of the methods contemplated herein, a compound may be evaluated to determine whether it is suitable for parenteral administration. Such evaluation may include assessment of, for example, solubility and stability.

A compound may also be evaluated to determine whether it has a dosing frequency suitable for concomitant combination therapy. Such evaluation may include assessment of pharmacokinetic properties consistent with immuno-oncology antibody therapy (e.g., concomitant treatment with an immune checkpoint inhibitor).

In other embodiments, one of ordinary skill in the art will be able to conclude that a compound will have pharmacokinetic properties allowing parenteral administration (e.g., intravenous) of at least every week (e.g., that maintains therapeutic efficacy over the at least every week) based on the compound's characteristic(s). Such characteristics may include a compound's structural features which will dictate its metabolic fate.

After identification, candidate inhibitors can be further evaluated through the use of techniques that provide data regarding their potential commercial viability. Comparisons of the candidate inhibitors to a reference standard (which may the "best-of-class" of current inhibitors) are indicative of the potential viability of such candidates. CD73 inhibitors that can serve as reference or benchmark compounds include α,β-Methylene-ADP (AOPCP) and its derivatives and analogs described by Bhattarai et al. ((2015) J Med Chem 58:6248-63) and the purine CD73 derivatives reported in PCT Publn. 2015/164573. Other reference compounds subsequently identified by the skilled artisan can also be used to assess the viability of candidate CD73 inhibitors.

The present invention is also drawn, in part, to the identification of inhibitors of CD73 having multiple characteristics of therapeutic relevance—particularly with relation to having a long half-life in vivo that can result in dosing periods of 4 days up to about 4 weeks. Candidate inhibitors may be identified by using, for example, an art-accepted assay or model, examples of which will be apparent to the skilled artisan. The assay used to determine the CD73 inhibitory activity of the compounds described herein is set forth in the Experimental section.

After identification, candidate inhibitors can be further evaluated by using techniques that provide data regarding characteristics of the inhibitors (e.g., pharmacokinetic parameters). Comparisons of the candidate inhibitors to a reference standard (which may the "best-of-class" of current inhibitors) are indicative of the potential viability of such candidates.

For use in certain therapeutic methods described herein, the candidate CD73 inhibitors will be further evaluated as having a potency of CD73 inhibition of less than 10 nM; and further features selected from the group consisting of:

(i) permeability in Caco-2 cells of $<6\times10^{-6}$ cm/sec;
(ii) human plasma protein binding of >98%;
(iii) high stability in the presence of human hepatocytes, expressed as $CL_{INT}$<10 uL/min/million cells;
(iv) a topological polar surface area of >160 Å$^2$;
(v) c Log D<−3;
(vi) c Log P<1;
(vii) from 10 to 24 H-bond donors/acceptors; and
(viii) solubility in water or saline of greater than 10 mg/mL.

CD73 inhibitors that can serve as reference or benchmark compounds include α,β-Methylene-ADP (AOPCP) and its derivatives and analogs described by Bhattarai et al. ((2015) J Med Chem 58:6248-63) and the purine CD73 derivatives reported in PCT Pubn. 2015/164573. Other reference compounds subsequently identified by the skilled artisan can also be used to assess the viability of candidate CD73 inhibitors.

Assays for Identifying CD73 Inhibitors

In one aspect, provided herein are methods to identify long half-life CD73 inhibitors. In general, candidate compounds are assayed according to procedures herein, or known protocols, for CD73 inhibition. Suitable candidate compounds for further evaluation are those that exhibit a potency of CD73 inhibition of less than 10 nM.

Following the selection of further candidate compounds, a series of screens or filters of various properties can be conducted as follows:

(i) a Caco-2 cell permeability assay, wherein a threshold value for further consideration of said candidate inhibitor is $<6\times10^{-6}$ cm/s;
(ii) a human plasma protein binding assay, wherein a threshold value for further consideration of said candidate inhibitor is >98%;
(iii) a solubility evaluation in water or saline, wherein a threshold value for further consideration of said candidate inhibitor is ≥10 mg/mL;
(iv) a determination of the candidate inhibitor's topological polar surface area, wherein a threshold value for further consideration of said candidate inhibitor is >160 Å$^2$;
(v) a determination of the candidate inhibitor's c Log D, wherein a threshold value for further consideration of said candidate inhibitor is <−3;
(vi) a determination of the candidate inhibitor's c Log P, wherein a threshold value for further consideration of said candidate inhibitor is <1;
(vii) a determination of the candidate inhibitor's number of H-bond donors/acceptors, wherein a threshold value for further consideration of said candidate inhibitor is ≥10;
(viii) a determination of the candidate inhibitor's stability in human hepatocytes, wherein a threshold value for further consideration of said candidate inhibitor is $CL_{INT}$<10 uL/min/million cells; and
(ix) an identification of any acidic moieties on the candidate inhibitor, wherein a threshold number of acidic moieties for further consideration of said candidate inhibitor is at least one acidic moiety having a pKa<3.

One of skill in the art will appreciate that certain evaluations can be accomplished using commercially available programs that utilize the chemical structure of a compound to determine, for example, (iv) a candidate compound's topological surface area, (v) a candidate compound's c Log D, (vi) a candidate compound's c Log P, (vii) the number of H-bond donor/acceptor groups present as structural elements of a candidate compound, and (ix) the number/identify of acidic functional groups present on the candidate compound.

Other properties of the candidate compounds that give rise to their long half-life and use in the methods described herein arise from evaluation in a cell permeability assay, a plasma protein binding assay, a solubility (water or saline) assay, and a hepatocyte stability assay. Threshold values indicating a positive result for the candidate compounds are as noted above. Suitable assays for these evaluations are provided in the Examples.

Compounds of the Invention

Provided herein are compounds having Formula (I) that are candidates for parenteral administration according to the teachings set forth herein:

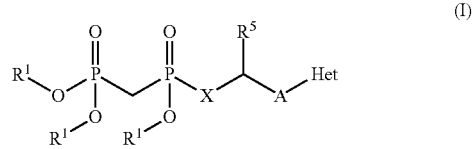

(I)

or a pharmaceutically acceptable salt, hydrate, or solvate thereof, wherein, each $R^1$ is independently selected from the group consisting of hydrogen, optionally substituted $C_1$-$C_6$ alkyl, optionally substituted aryl, and —C($R^2R^2$)—O—C(O)—O$R^3$, or two $R^1$ groups are optionally combined to form a 5- to 7-membered ring;

each $R^2$ is independently selected from the group consisting of H and optionally substituted $C_1$-$C_6$ alkyl;

each $R^3$ is independently selected from the group consisting of H, $C_1$-$C_6$ alkyl, and optionally substituted aryl;

$R^5$ is selected from the group consisting of H and optionally substituted $C_1$-$C_6$ alkyl;

X is selected from the group consisting of O, $CH_2$, and S;

A is selected from the group consisting of:

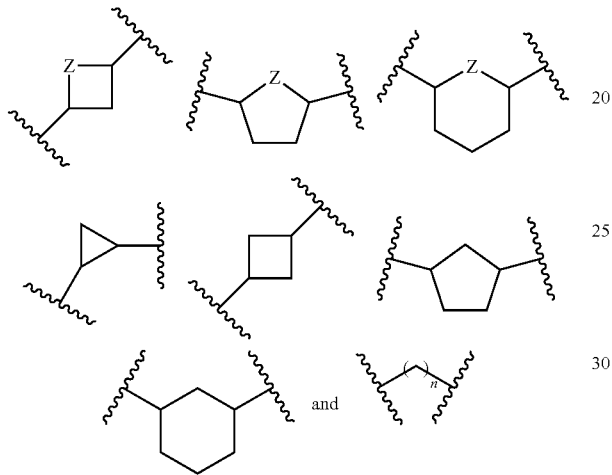

each of which is optionally substituted with from 1 to 5 $R^6$ substituents, and wherein the subscript n is an integer from 0 to 3;

Z is selected from the group consisting of $CH_2$, $CHR^6$, $NR^6$, and O;

each $R^6$ is independently selected from the group consisting of H, $CH_3$, OH, CN, F, optionally substituted $C_1$-$C_6$ alkyl, and OC(O)—$C_1$-$C_6$ alkyl; and optionally two $R^6$ groups on adjacent ring vertices are joined together to form a 5- to 6-membered ring having at least one heteroatom as a ring vertex; and Het is selected from the group consisting of:

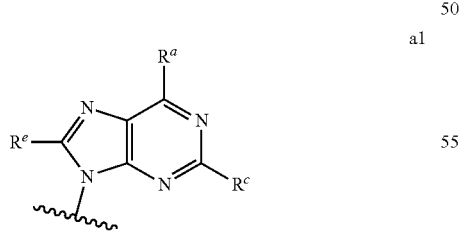

a1

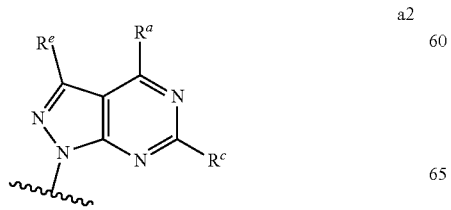

a2

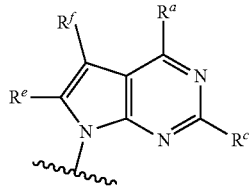

a3

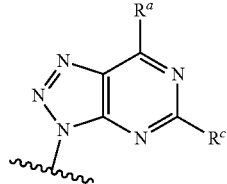

a4

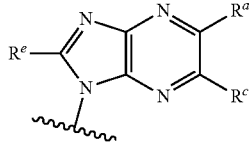

a5

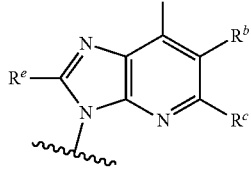

a6

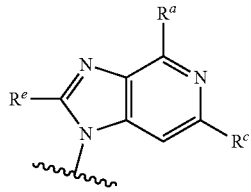

a7

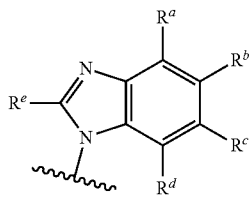

a8

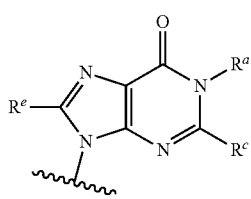

a9

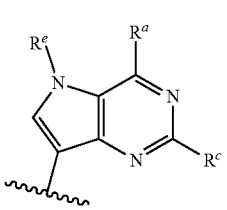

a10

-continued a11
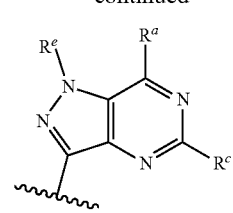

a12
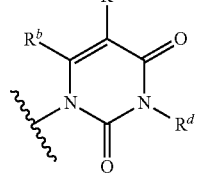

a13
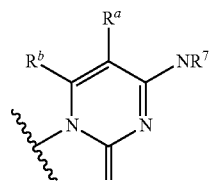

a14
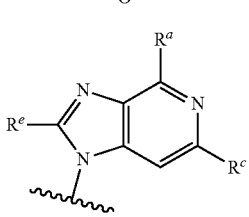

a15
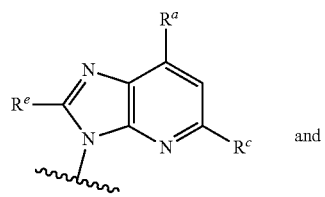

and a16
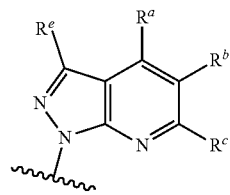

wherein the wavy line indicates the point of attachment to the remainder of the compound, and wherein:

$R^a$ is selected from the group consisting of H, $NH_2$, $NHR^7$, $NHC(O)R^7$, $NR^7R^7$, $R^7$, OH, $SR^7$ and $OR^7$;

$R^b$ is selected from the group consisting of H, halogen, $NH_2$, $NHR^7$, $NR^7R^7$, $R^7$, OH, and $OR^7$;

$R^c$ and $R^d$ are independently selected from the group consisting of H, halogen, haloalkyl, $NH_2$, $NHR^7$, $NR^7R^7$, $R^7$, OH, $OR^7$, $SR^7$, $SO_2R^7$, —$X^1$—$NH_2$, —$X^1$—$NHR^7$, —$X^1$—$NR^7R^7$, —$X^1$—OH, —$X^1$—$OR^7$, —$X^1$—$SR^7$ and —$X^1$—$SO_2R^7$;

$R^e$ and $R^f$ are independently selected from the group consisting of H, halogen, and optionally substituted $C_1$-$C_6$ alkyl;

each $X^1$ is $C_1$-$C_4$alkylene; and each $R^7$ is independently selected from the group consisting of optionally substituted $C_1$-$C_{10}$ alkyl, optionally substituted $C_2$-$C_{10}$ alkenyl, optionally substituted $C_2$-$C_{10}$ alkynyl, optionally substituted $C_3$-$C_7$ cycloalkyl, optionally substituted $C_3$-$C_7$ cycloalkyl$C_1$-$C_4$alkyl, optionally substituted 4-7 membered cycloheteroalkyl, optionally substituted 4-7 membered cycloheteroalkyl$C_1$-$C_4$alkyl, optionally substituted aryl, optionally substituted aryl$C_1$-$C_4$alkyl, optionally substituted ary$C_2$-$C_4$alkenyl, optionally substituted aryl$C_2$-$C_4$alkynyl, optionally substituted heteroaryl, optionally substituted heteroaryl$C_1$-$C_4$alkyl, optionally substituted heteroaryl$C_1$-$C_4$alkenyl, optionally substituted heteroaryl$C_2$-$C_4$alkynyl, and optionally, two $R^7$ groups attached to a nitrogen atom are joined together to form a 4- to 7-membered heterocyclic ring, optionally fused to an aryl ring;

with the proviso that the compounds are other than those compounds wherein the combination of X, A, and Het results in

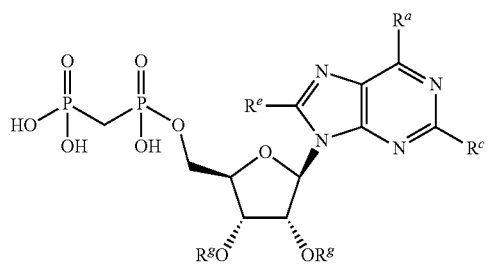

wherein $R^g$ is H or the two $R^g$ groups are combined to form an acetonide; and either (i) $R^c$ and $R^e$ are hydrogen and $R^a$ is —OEt, —OCH$_2$Ph, —SCH$_2$Ph, —NH$_2$, methylamino, ethylamino, dimethylamino, diethylamino, N-methyl-N-ethylamino, phenylamino, benzylamino, 2-phenylethylamino, N-benzyl-N-ethylamino, dibenzylamino, 4-aminobenzylamino, 4-chlorobenzylamino, 4-nitrobenzylamino, or 4-sulfamoylbenzylamino; or (ii) $R^c$ is hydrogen, $R^a$ is —NH$_2$, and $R^e$ is bromo, chloro, aminomethyl, or thioethyl; or (iii) $R^c$ is hydrogen, $R^a$ is benzylamino, and $R^e$ is bromo.

In related embodiments, provided herein are compounds having Formula (I'), (II') or (III'):

(I')
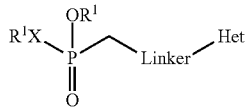

(II')
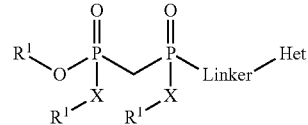

(III')
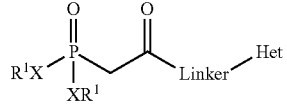

or a pharmaceutically acceptable salt, hydrate, or solvate thereof, wherein, each R¹ is independently selected from the group consisting of hydrogen, optionally substituted $C_1$-$C_6$ alkyl, optionally substituted aryl, —C(R²R²)—O—C(O)—OR³, —C(R²R²)—O—C(O)R³, and —C(R²R²)C(O)OR³, or two R¹ groups can be combined to form a 5- to 6-membered ring;

each R² is independently selected from the group consisting of H and optionally substituted $C_1$-$C_6$ alkyl;

each R³ is independently selected from the group consisting of H, $C_1$-$C_6$ alkyl, $C_1$-$C_6$ alkoxy$C_1$-$C_6$ alkyl, and optionally substituted aryl;

each X is independently selected from the group consisting of O, NH, and S; Het is a 6,5- or 6,6-fused heteroaryl ring system and is substituted or unsubstituted; and each Linker is independently an acyclic, cyclic, or combination of acyclic and cyclic groups that join Het to indicated atoms in each of formulae (I'), (II') and (III'), and provides a spacing of from two to ten atoms between the joined groups;

and wherein said compound has at least three features selected from the group consisting of:
  (i) permeability in Caco-2 cells of $<6 \times 10^{-6}$ cm/sec;
  (ii) human plasma protein binding of >98%;
  (iii) high stability in the presence of human hepatocytes, expressed as $CL_{INT}<10$ uL/min/million cells;
  (iv) a topological polar surface area of >160 Å²;
  (v) c Log D<−3;
  (vi) c Log P<1;
  (vii) from 10 to 24 H-bond donors/acceptors;
  (viii) solubility in water or saline of greater than 10 mg/mL; and
  (ix) potency of CD73 inhibition of less than 10 nM.

For the above formulae, the term 'optionally substituted' is used in connection with alkyl groups, cycloalkyl groups, cycloheteroalkyl groups, aryl groups and heteroaryl groups. Within each of these groups, some selected optional substituents are as follows:

Alkyl groups: halogen, —OR', —NR'R", —SR', —SiR'R"R'", —OC(O)R', —C(O)R', —CO₂R', —CONR'R", —OC(O)NR'R", —NR"C(O)R', —NR'—C(O)NR"R'", —NR"C(O)₂R', —CN and —NO₂. R', R" and R'" each independently refer to hydrogen, unsubstituted $C_{1-4}$ alkyl, or $C_{1-4}$ haloalkyl. When R' and R" are attached to the same nitrogen atom, or when R" and R'" are attached to the same nitrogen, they can be combined with the nitrogen atom to form a 3-, 4-, 5-, 6-, or 7-membered ring. For example, —NR'R" is meant to include 1-pyrrolidinyl and 4-morpholinyl.

Cycloalkyl groups and cycloheteroalkyl groups: The selected substituents noted above for 'alkyl groups' are also useful with cycloalkyl and cycloheteroalkyl groups. Additionally, each of the cycloalkyl and cycloheteroalkyl groups can be optionally substituted with oxo (═O).

Aryl groups and heteroaryl groups: -halogen, —OR', —OC(O)R', —NR'R", —R', —CN, —NO₂, —CO₂R', —CONR'R", —C(O)R', —OC(O)NR'R", —NR"C(O)R', —NR"C(O)₂R', —NR'—C(O)NR"R'", —S(O)₂R', —S(O)₂NR'R", —NR'S(O)₂R", and perfluoro($C_1$-$C_4$) alkyl, where R', R" and R'" are independently selected from hydrogen, $C_{1-4}$ alkyl, $C_{1-4}$ haloalkyl and $C_{3-6}$ cycloalkyl.

In one selected group of embodiments, compounds of Formula (I) that are candidates for parenteral administration according to the teachings set forth herein are provided wherein A has the formula:

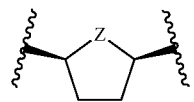

which is optionally substituted with from 1 to 5 R⁶.

In another selected group of embodiments, compounds of Formula (I) that are candidates for parenteral administration according to the teachings set forth herein are provided wherein A has a formula selected from the group consisting of:

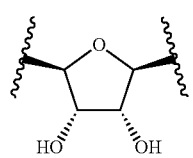

b1

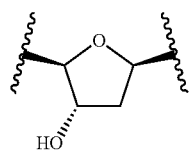

b2

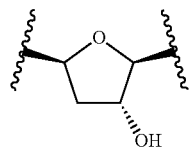

b3

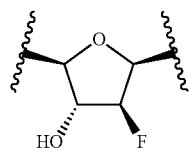

b4

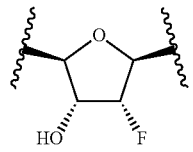

b5

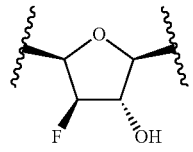

b6

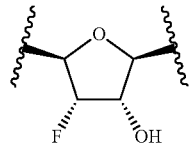

b7

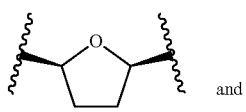 b8 and

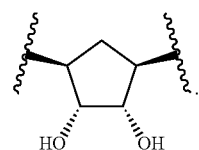 b9.

In some selected embodiments, any one of a1 through a16 can be independently combined with any one of b1 through b9, to provide selected embodiments of Formula (I). For example, provided herein are compounds of Formula (I) having the following combinations of Het-A-: a1/b1; a1/b2; a1/b3; a1/b4; a1/b5; a1/b6; a1/b7; a1/b8; a1/b9; a2/b1; a2/b2; a2/b3; a2/b4; a2/b5; a2/b6; a2/b7; a2/b8; a2/b9; a3/b1; a3/b2; a3/b3; a3/b4; a3/b5; a3/b6; a3/b7; a3/b8; a3/b9; a4/b1; a4/b2; a4/b3; a4/b4; a4/b5; a4/b6; a4/b7; a4/b8; a4/b9; a5/b1; a5/b2; a5/b3; a5/b4; a5/b5; a5/b6; a5/b7; a5/b8; a5/b9; a6/b1; a6/b2; a6/b3; a6/b4; a6/b5; a6/b6; a6/b7; a6/b8; a6/b9; a7/b1; a7/b2; a7/b3; a7/b4; a7/b5; a7/b6; a7/b7; a7/b8; a7/b9; a8/b1; a8/b2; a8/b3; a8/b4; a8/b5; a8/b6; a8/b7; a8/b8; a8/b9; a9/b1; a9/b2; a9/b3; a9/b4; a9/b5; a9/b6; a9/b7; a9/b8; a9/b9; a10/b1; a10/b2; a10/b3; a10/b4; a10/b5; a10/b6; a10/b7; a10/b8; a10/b9; a11/b1; a11/b2; a11/b3; a11/b4; a11/b5; a11/b6; a11/b7; a11/b8; a11/b9; a12/b1; a12/b2; a12/b3; a12/b4; a12/b5; a12/b6; a12/b7; a12/b8; a12/b9; a13/b1; a3/b2; a3/b3; a13/b4; a13/b5; a13/b6; a13/b7; a13/b8; a3/b9; a14/b1; a14/b2; a14/b3; a14/b4; a14/b5; a14/b6; a14/b7; a14/b8; a14/b9; a15/b1; a15/b2; a15/b3; a15/b4; a15/b5; a15/b6; a15/b7; a15/b8; a15/b9; a16/b1; a16/b2; a16/b3; a16/b4; a16/b5; a16/b6; a16/b7; a16/b8; or a16/b9.

In still other selected embodiments, compounds of Formula (I) that are candidates for parenteral administration according to the teachings set forth herein are provided wherein Het has the formula:

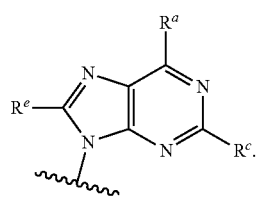 (a1)

In some selected embodiments, $R^c$ is other than H.

In yet other selected embodiments, compounds of Formula (I) that are candidates for parenteral administration according to the teachings set forth herein are provided that are represented by one of the following subformulae:

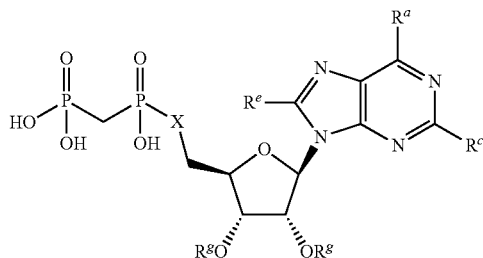

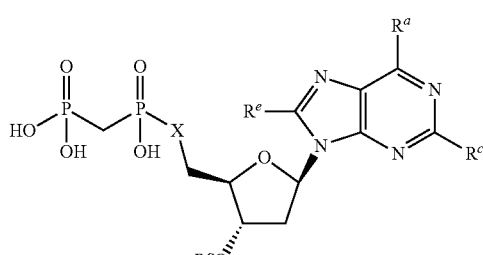

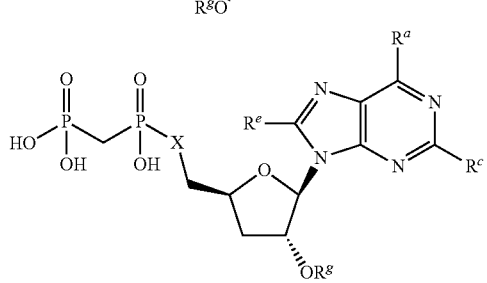

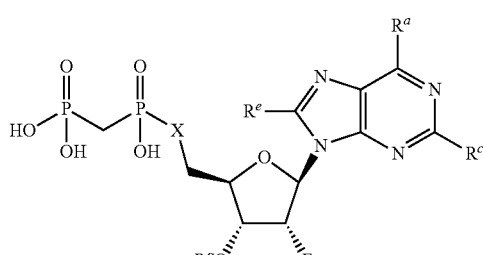

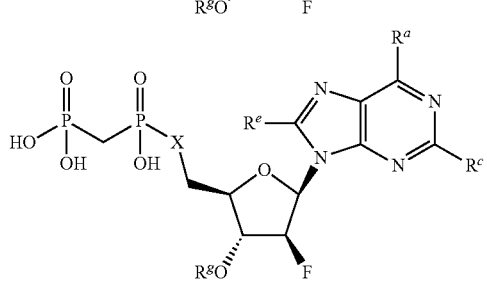

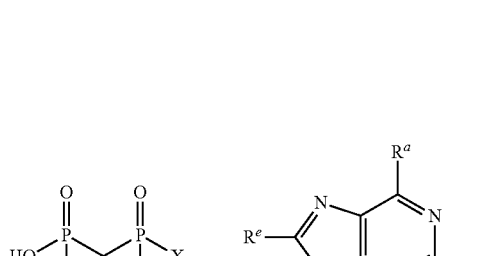

-continued

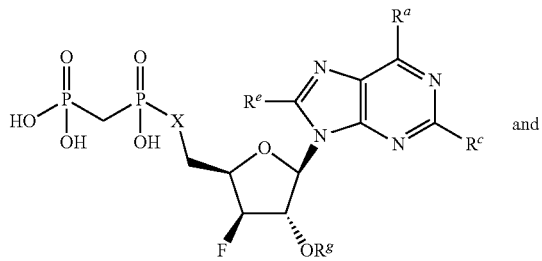

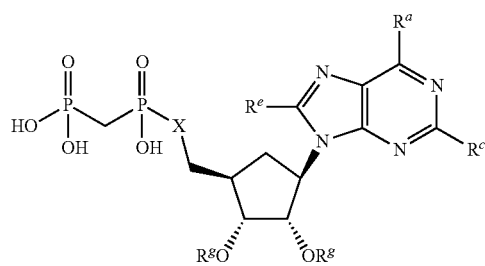

wherein each $R^g$ is independently selected from the group consisting of H and C(O)—$C_1$-$C_6$ alkyl. Still further selected embodiments of the subformulae above, are those wherein X is oxygen. In other selected embodiments of the subformulae above, X is oxygen and $R^e$ is hydrogen. In still other selected embodiments of the subformulae above, X is oxygen, $R^e$ is hydrogen, and each $R^g$ is hydrogen.

In another group of selected embodiments, compounds of Formula (I) that are candidates for parenteral administration according to the teachings set forth herein are provided wherein Het is selected from:

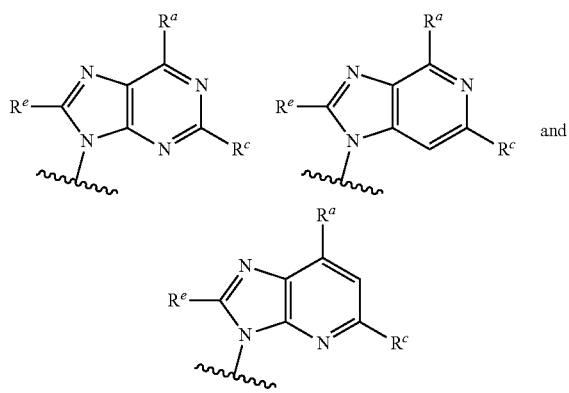

wherein $R^a$, $R^c$ and $R^e$ have the meanings provided with reference to Formula (I) above. In some further selected embodiments, $R^5$ is H, X is O, and each $R^1$ is H. In still other selected embodiments, $R^5$ is H, X is O, each $R^1$ is H, $R^e$ is H, and $R^a$ is selected from the group consisting of $NH_2$, $NHR^7$ and $N(R^7)_2$. In yet other selected embodiments, $R^5$ is H, X is O, each $R^1$ is H, R is H, $R^c$ is other than H, and $R^a$ is $NHR^7$.

Still other selected embodiments of the Formula (I) that are candidates for parenteral administration according to the teachings set forth herein, are compounds having a subformulae selected from the following:

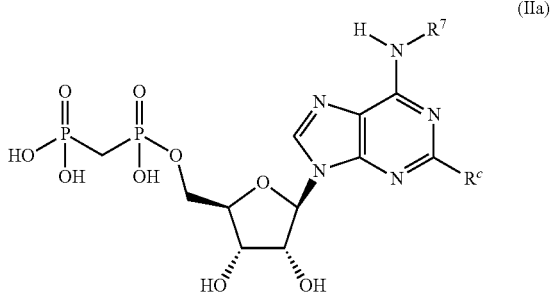

(IIa)

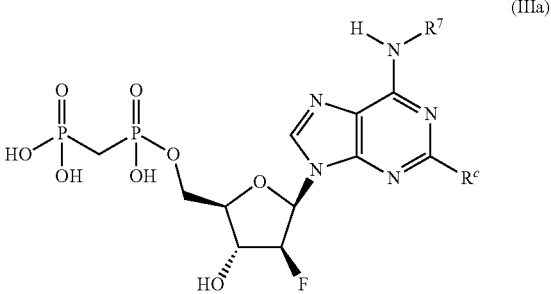

(IIIa)

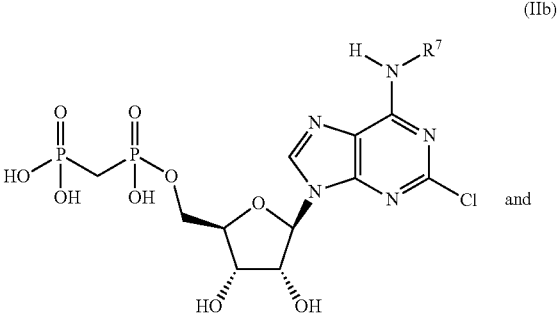

(IIb)

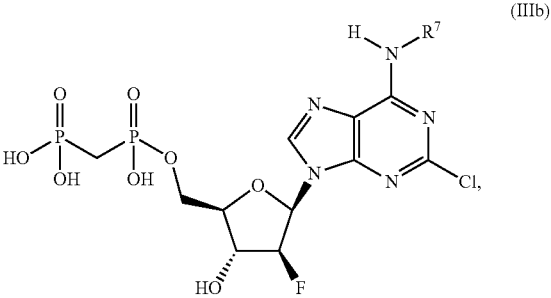

(IIIb)

wherein $R^7$ and $R^c$ have the meanings provided with respect to Formula (I), and certain selected embodiments as described herein.

Also provided herein, in one group of embodiments, are compounds that are candidates for parenteral administration according to the teachings set forth herein having the formula:

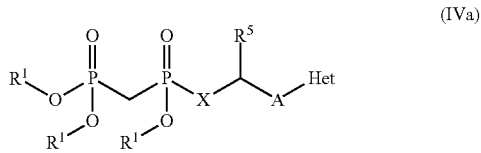

(IVa)

or a pharmaceutically acceptable salt, hydrate, or solvate thereof, wherein, each R¹ is independently selected from the group consisting of hydrogen, optionally substituted $C_1$-$C_6$ alkyl, optionally substituted aryl, and —C(R²R²)—O—C(O)—OR³, or two R¹ groups are optionally combined to form a 5- to 7-membered ring;

each R² is independently selected from the group consisting of H and optionally substituted $C_1$-$C_6$ alkyl;

each R³ is independently selected from the group consisting of H, $C_1$-$C_6$ alkyl, and optionally substituted aryl;

R⁵ is selected from the group consisting of H and optionally substituted $C_1$-$C_6$ alkyl;

X is O;

A is selected from the group consisting of:

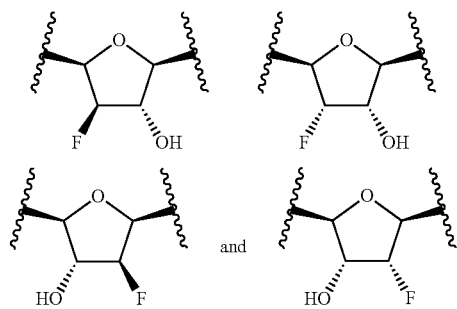

and

Het is selected from the group consisting of:

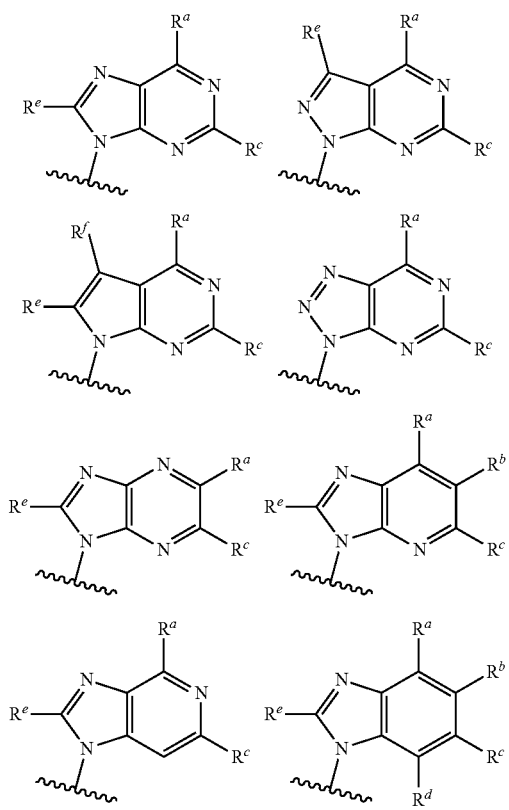

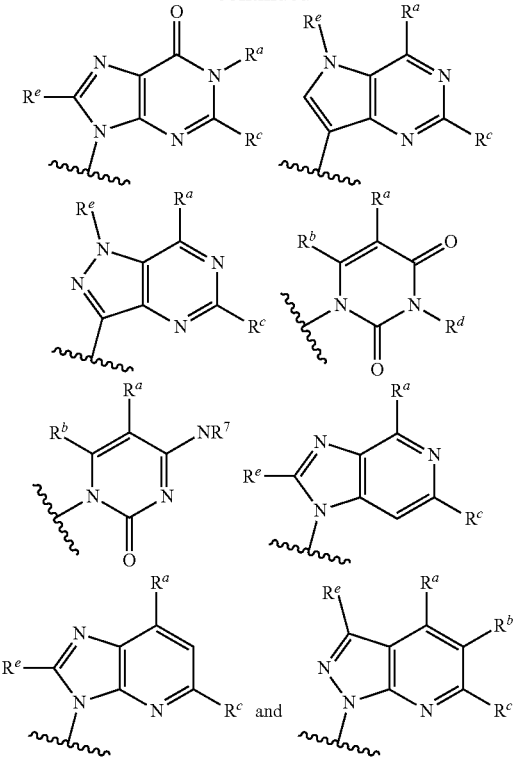

wherein the wavy line indicates the point of attachment to the remainder of the compound, and wherein:

Rᵃ is selected from the group consisting of H, NH₂, NHR⁷, NHC(O)R⁷, NR⁷R⁷, R⁷, OH SR⁷ and OR⁷;

Rᵇ is selected from the group consisting of H, halogen, NH₂, NHR⁷, NR⁷R⁷, R⁷, O, and OR;

Rᶜ and Rᵈ are independently selected from the group consisting of H, halogen, haloalkyl, NH₂, NHR⁷, NR⁷R⁷, R⁷, OH, OR⁷, SR⁷, SO₂R⁷, —X¹—NH₂, —X¹—NHR⁷, —X¹—NR⁷R⁷, —X¹—OH, —X¹—OR⁷, —X¹—SR⁷ and —X¹—SO₂R⁷;

Rᵉ and Rᶠ are independently selected from the group consisting of H, halogen, and optionally substituted $C_1$-$C_6$ alkyl;

each X¹ is $C_1$-$C_4$alkylene; and each R⁷ is independently selected from the group consisting of optionally substituted $C_1$-$C_{10}$ alkyl, optionally substituted $C_2$-$C_{10}$ alkenyl, optionally substituted $C_2$-$C_{10}$ alkynyl, optionally substituted $C_3$-$C_7$ cycloalkyl, optionally substituted $C_3$-$C_7$ cycloalkyl$C_1$-$C_4$alkyl, optionally substituted 4-7 membered cycloheteroalkyl, optionally substituted 4-7 membered cycloheteroalkyl$C_1$-$C_4$alkyl, optionally substituted aryl, optionally substituted aryl$C_1$-$C_4$alkyl, optionally substituted ary$C_2$-$C_4$alkenyl, optionally substituted aryl$C_2$-$C_4$alkynyl, optionally substituted heteroaryl, optionally substituted heteroaryl$C_1$-$C_4$alkyl, optionally substituted heteroaryl$C_1$-$C_4$alkenyl, optionally substituted heteroaryl$C_2$-$C_4$alkynyl, and optionally, two R⁷ groups attached to a nitrogen atom are joined together to form a 4- to 7-membered heterocyclic ring, optionally fused to an aryl ring.

In one selected group of embodiments, the compounds of formula (IVa) that are candidates for parenteral administration according to the teachings set forth herein are those wherein A is

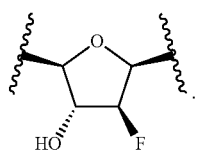 [SMILES: *[C@@H]1O[C@H](*)[C@@H](O)[C@@H]1F]

In another selected group of embodiments, the compounds of formula (IVa) that are candidates for parenteral administration according to the teachings set forth herein are those wherein Het is selected from the group consisting of:

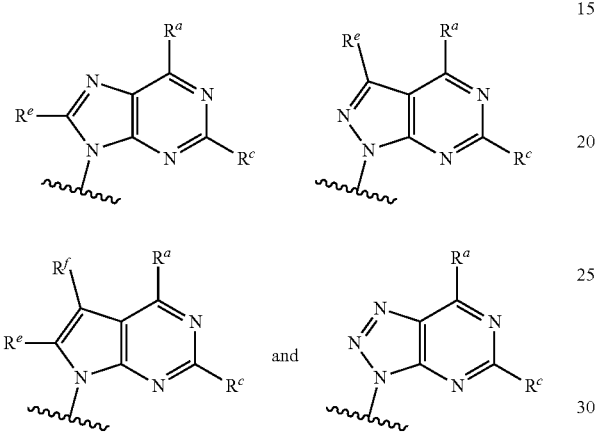

In still another selected group of embodiments, the compounds that are candidates for parenteral administration according to the teachings set forth herein have the formula:

(IVb)

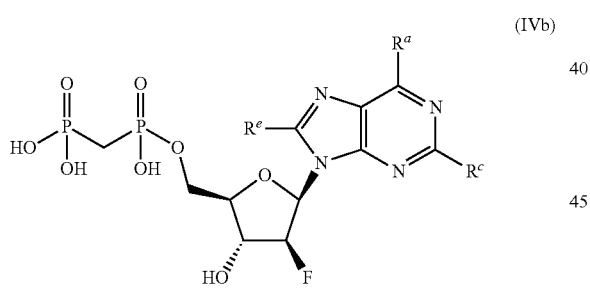

or a pharmaceutically acceptable salt, hydrate, or solvate thereof.

In one selected group of embodiments, the compounds of formula (IVb) that are candidates for parenteral administration according to the teachings set forth herein are those wherein $R^a$ is selected from the group consisting of $NH_2$, $NHR^7$, $NR^7R^7$, $SR^7$ and $OR^7$. In one selected group of embodiments, the compounds of formula (Ib) are those wherein $R^c$ is selected from the group consisting of halogen, $R^7$, $OR^7$, $SR^7$, $SO_2R^7$, —$X^1$—$NH_2$, —$X^1$—$NHR^7$, —$X^1$—$NR^7R^7$, —$X^1$—OH, —$X^1$—$OR^7$, —$X^1$—$SR^7$ and —$X^1$—$SO_2R^7$.

In yet another selected group of embodiments, the compounds of formula (IVb) that are candidates for parenteral administration according to the teachings set forth herein are those wherein $R^c$ is H.

In some embodiments of Formula (I'), (II') and (III'), Het is selected from the group consisting of:

a1
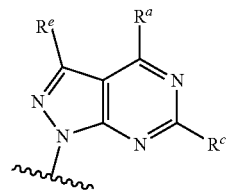

a2
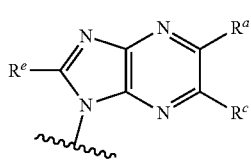

a3
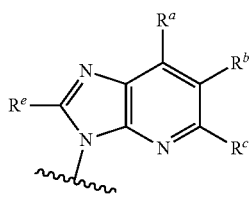

a4
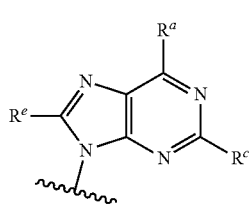

a5
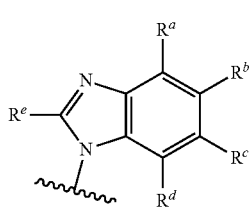

a6
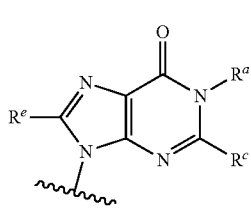

a7
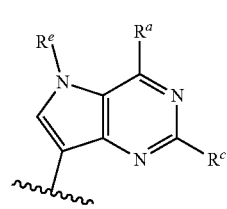

a8
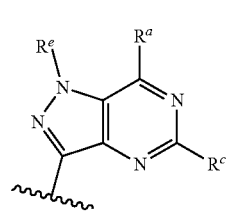

-continued

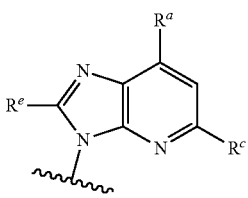
a9

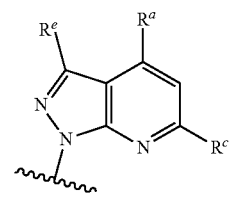
a10

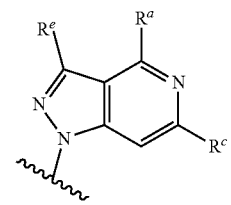
a11

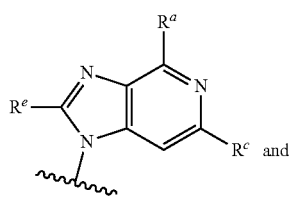
a12

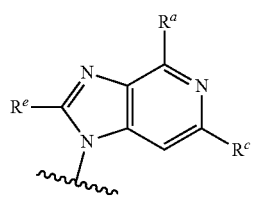
a13 wherein the wavy line indicates the point of attachment to Linker, and wherein:

$R^a$, $R^b$, $R^c$ and $R^d$ are each independently selected from the group consisting of H, halogen, haloalkyl, $NH_2$, $NHR^7$, $NR^7R^7$, $NHC(O)R^7$, $R^7$, OH, $OR^7$, $SR^7$, $SO_2R^7$, —$X^1$—$NH_2$, —$X^1$—$NHR^7$, —$X^1$—$NR^7R^7$, —$X^1$—OH, —$X^1$—$OR^7$, —$X^1$—$SR^7$ and —$X^1$—$SO_2R^7$;

$R^e$ is selected from the group consisting of H, halogen, and optionally substituted $C_1$-$C_6$ alkyl;

each $X^1$ is $C_1$-$C_4$ alkylene; and each $R^7$ is independently selected from the group consisting of optionally substituted $C_1$-$C_{10}$ alkyl, optionally substituted $C_2$-$C_{10}$ alkenyl, optionally substituted $C_2$-$C_{10}$ alkynyl, optionally substituted $C_3$-$C_7$ cycloalkyl, optionally substituted $C_3$-$C_7$ cycloalkyl$C_1$-$C_4$alkyl, optionally substituted 4-7 membered cycloheteroalkyl, optionally substituted 4-7 membered cycloheteroalkyl$C_1$-$C_4$alkyl, optionally substituted aryl, optionally substituted aryl$C_1$-$C_4$alkyl, optionally substituted aryl$C_2$-$C_4$alkenyl, optionally substituted aryl$C_2$-$C_4$alkynyl, optionally substituted heteroaryl, optionally substituted heteroaryl$C_1$-$C_4$alkyl, optionally substituted heteroaryl$C_1$-$C_4$alkenyl, optionally substituted heteroaryl$C_2$-$C_4$alkynyl, and optionally, two $R^7$ groups attached to a nitrogen atom are joined together to form a 4- to 7-membered heterocyclic ring, optionally fused to an aryl ring In some embodiments of Formula (I'), (II') or (III'), Linker has the formula:

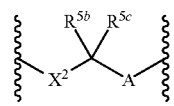

wherein $X^2$ is selected from the group consisting of O, S and $N(R^5)$;

A is selected from the group consisting of:

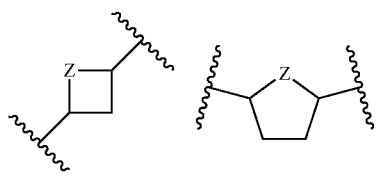

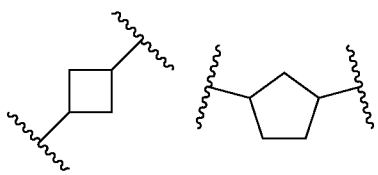

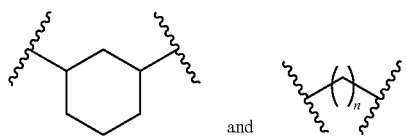

each of which is optionally substituted with from 1 to 5 $R^6$ substituents, and wherein the subscript n is an integer from 0 to 3;

$R^{5a}$, $R^{5b}$ and $R^{5c}$ are independently selected from the group consisting of H, deuterium, optionally substituted $C_1$-$C_6$ alkyl, —C(O)$OR^3$, $C_3$-$C_6$ cycloalkyl $(C_1$-$C_6)$alkyl, aryl$(C_1$-$C_6)$alkyl, $C_3$-$C_6$ cycloalkyl and aryl;

Z is selected from the group consisting of NH, NR$^6$, and O;

each R$^6$ is independently selected from the group consisting of CH$_3$, OR, CN, F, and optionally substituted C$_1$-C$_6$ alkyl; or two R$^6$ groups on adjacent ring vertices are optionally joined together to form a 5- to 6-membered ring having at least one heteroatom as a ring vertex; and each R$^g$ is independently selected from the group consisting of H and —C(O)—C$_1$-C$_6$ alkyl.

In some embodiments, the Linker of Formulae (I'), (II') and (III') above, has the formula:

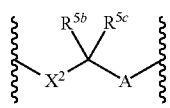

wherein

X$^2$ is selected from the group consisting of O, S and N(R$^5$);

A is:

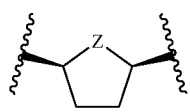

which is optionally substituted with from 1 to 5 R$^6$; and the groups provided as X$^2$, R$^{5a}$, R$^{5b}$, R$^{5c}$ and R$^6$ have the meanings provided above.

In related embodiments to those provided, A is selected from the group consisting of:

b1
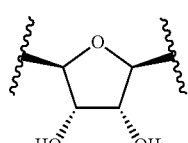

b2
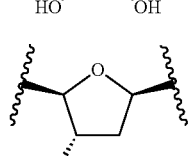

b3
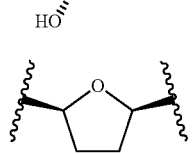

b4
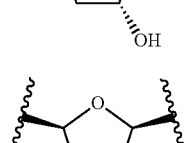

-continued b5
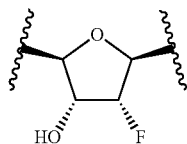

b6
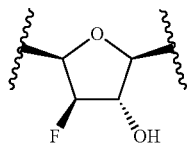

b7
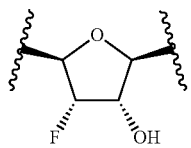

b8
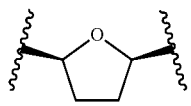

b9
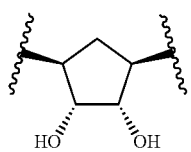

b10
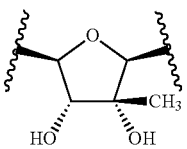

b11
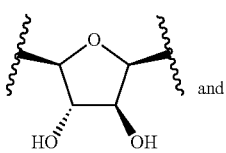 and b12
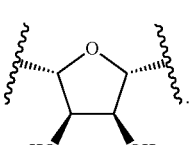.

In still other selected embodiments, compounds are provided as set out in Table 1.

TABLE 1

| Structure | log P | H-bond donors | H-bond acceptors | log D | Topological polar surface area (Å²) |
|---|---|---|---|---|---|
| | −0.67 | 6 | 11 | −4.62 | 196.49 |
| | −0.67 | 6 | 11 | −4.62 | 196.49 |
| | −0.67 | 6 | 11 | −4.62 | 196.49 |
| | −0.67 | 6 | 11 | −4.62 | 196.49 |

TABLE 1-continued

| Structure | log P | H-bond donors | H-bond acceptors | log D | Topological polar surface area (Å²) |
|---|---|---|---|---|---|
| (structure) | −0.67 | 6 | 11 | −4.62 | 196.49 |
| (structure) | −0.67 | 6 | 11 | −4.62 | 196.49 |
| (structure) | −0.09 | 5 | 10 | −4.02 | 185.49 |
| (structure) | −1.38 | 6 | 11 | −3.82 | 196.49 |

TABLE 1-continued
| Structure | log P | H-bond donors | H-bond acceptors | log D | Topological polar surface area (Å²) |
|---|---|---|---|---|---|
| 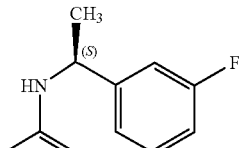 | −1.38 | 6 | 11 | −3.82 | 196.49 |
| 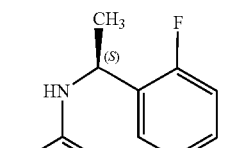 | −1.38 | 6 | 11 | −3.82 | 196.49 |
| 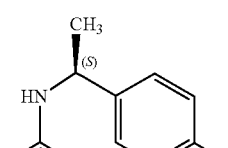 | −0.67 | 6 | 11 | −4.62 | 196.49 |
| 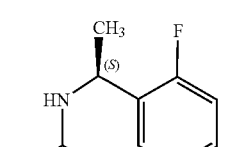 | −0.67 | 6 | 11 | −4.62 | 196.49 |

TABLE 1-continued
| Structure | log P | H-bond donors | H-bond acceptors | log D | Topological polar surface area (Å²) |
|---|---|---|---|---|---|
| 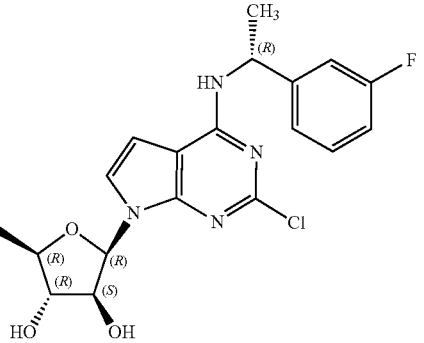 | −0.5 | 5 | 10 | −2.94 | 176.26 |
| 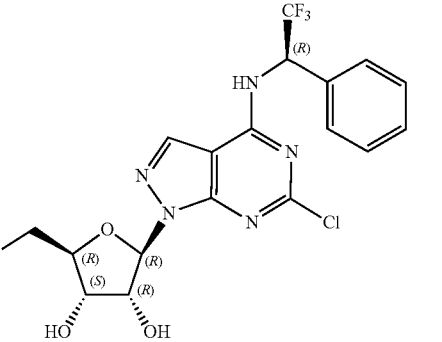 | −0.37 | 6 | 12 | −4.29 | 209.38 |
| 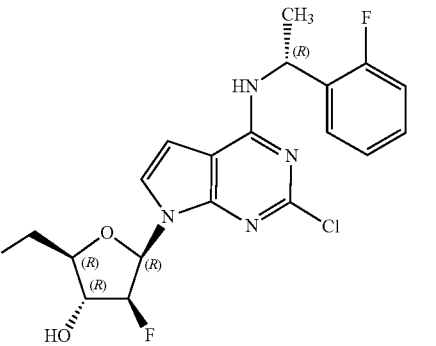 | −0.5 | 5 | 10 | −2.94 | 176.26 |
| 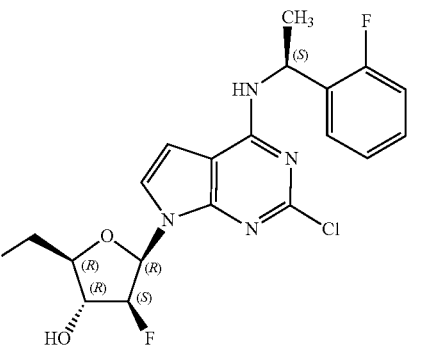 | −0.5 | 5 | 10 | −2.94 | 176.26 |

TABLE 1-continued

| Structure | log P | H-bond donors | H-bond acceptors | log D | Topological polar surface area (Å$^2$) |
|---|---|---|---|---|---|
| | −0.5 | 5 | 10 | −2.94 | 176.26 |
| | −0.86 | 6 | 12 | −4.74 | 209.38 |
| | −0.86 | 6 | 12 | −4.74 | 209.38 |
| | −0.86 | 6 | 12 | −4.74 | 209.38 |

TABLE 1-continued
| Structure | log P | H-bond donors | H-bond acceptors | log D | Topological polar surface area (Å²) |
|---|---|---|---|---|---|
| 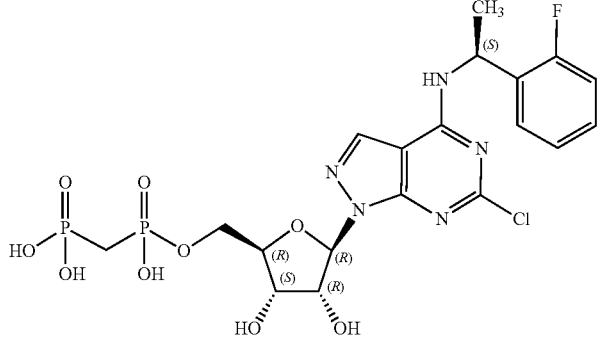 | −0.86 | 6 | 12 | −4.74 | 209.38 |
| 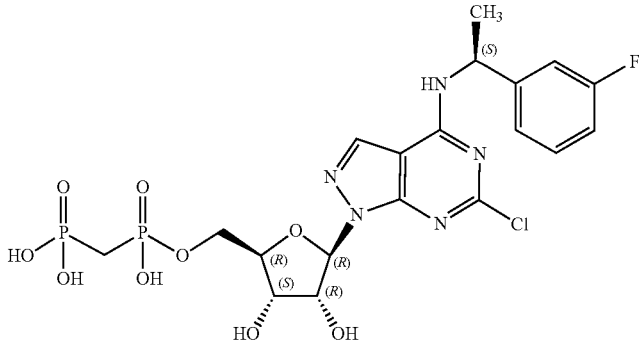 | −0.86 | 6 | 12 | −4.74 | 209.38 |
| 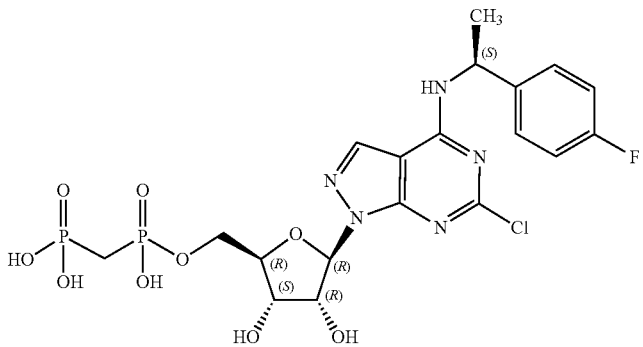 | −0.86 | 6 | 12 | −4.74 | 209.38 |
| 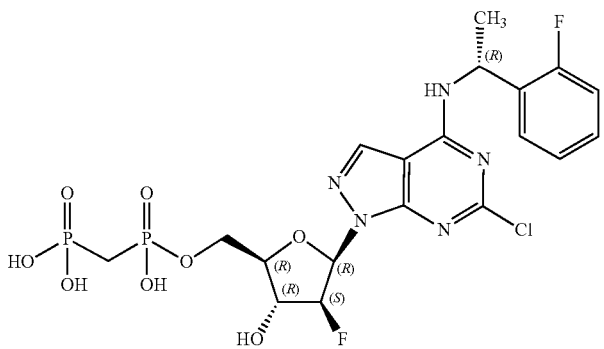 | 0.02 | 5 | 11 | −3.86 | 189.15 |

TABLE 1-continued

| Structure | log P | H-bond donors | H-bond acceptors | log D | Topological polar surface area (Å$^2$) |
|---|---|---|---|---|---|
| | 0.02 | 5 | 11 | −3.86 | 189.15 |
| | 0.02 | 5 | 11 | −3.86 | 189.15 |
| | −0.5 | 5 | 10 | −2.94 | 176.26 |
| | −0.5 | 5 | 10 | −2.94 | 176.26 |

TABLE 1-continued

| Structure | log P | H-bond donors | H-bond acceptors | log D | Topological polar surface area (Å²) |
|---|---|---|---|---|---|
| | 0.06 | 5 | 10 | −3.89 | 176.26 |
| | 0.06 | 5 | 10 | −3.89 | 176.26 |
| | −0.81 | 5 | 10 | −4.75 | 176.26 |
| | 0.02 | 5 | 11 | −3.86 | 189.15 |

TABLE 1-continued

| Structure | log P | H-bond donors | H-bond acceptors | log D | Topological polar surface area (Å²) |
|---|---|---|---|---|---|
| | 0.02 | 5 | 11 | −3.86 | 189.15 |
| | 0.02 | 5 | 11 | −3.86 | 189.15 |
| | −0.82 | 6 | 11 | −4.77 | 196.49 |
| | −0.82 | 6 | 11 | −4.77 | 196.49 |

TABLE 1-continued
| Structure | log P | H-bond donors | H-bond acceptors | log D | Topological polar surface area (Å²) |
|---|---|---|---|---|---|
| 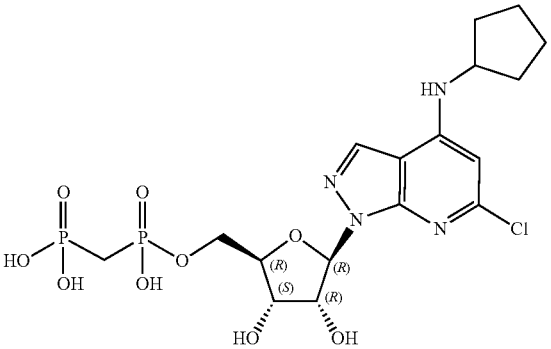 | −1.69 | 6 | 11 | −5.63 | 196.49 |
| 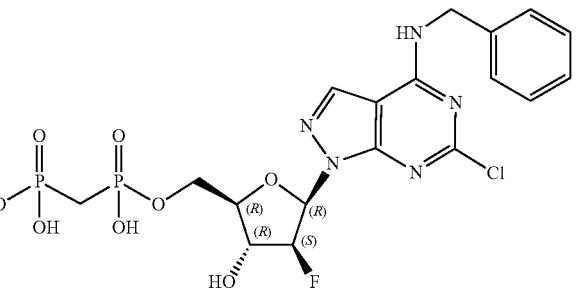 | −0.54 | 5 | 11 | −4.42 | 189.15 |
| 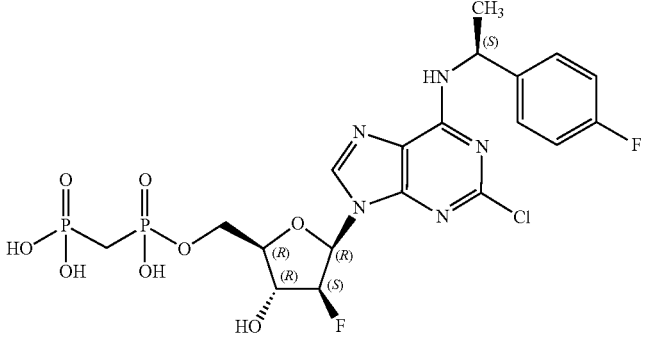 | 0.23 | 5 | 11 | −3.76 | 189.15 |
| 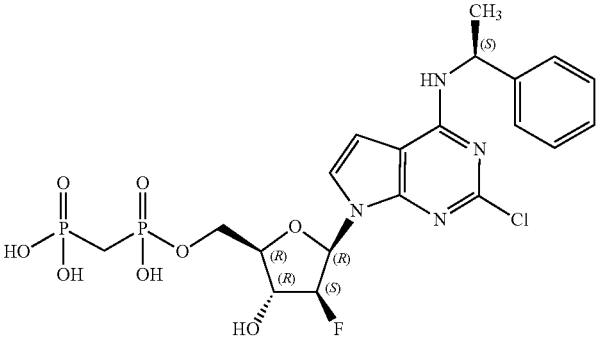 | −0.65 | 5 | 10 | −3.09 | 176.26 |

TABLE 1-continued

| Structure | log P | H-bond donors | H-bond acceptors | log D | Topological polar surface area (Å$^2$) |
| --- | --- | --- | --- | --- | --- |
| | −0.65 | 5 | 10 | −3.09 | 176.26 |
| | −0.12 | 5 | 11 | −4.01 | 189.15 |
| | −0.12 | 5 | 11 | −4.01 | 189.15 |
| | −4.32 | 6 | 12 | −6.64 | 209.38 |

TABLE 1-continued

| Structure | log P | H-bond donors | H-bond acceptors | log D | Topological polar surface area (Å$^2$) |
| --- | --- | --- | --- | --- | --- |
| | −1.94 | 6 | 13 | −6 | 233.17 |
| | 0.08 | 5 | 11 | −3.91 | 189.15 |
| | 0.08 | 5 | 11 | −3.91 | 189.15 |
| | −2.98 | 5 | 11 | −7 | 197.35 |

TABLE 1-continued

| Structure | log P | H-bond donors | H-bond acceptors | log D | Topological polar surface area (Å²) |
|---|---|---|---|---|---|
| | −0.73 | 5 | 11 | −4.77 | 197.35 |
| | −0.16 | 5 | 12 | −4.08 | 200.59 |
| | −1.28 | 6 | 12 | −5.15 | 209.38 |
| | −0.72 | 5 | 12 | −4.65 | 200.59 |

TABLE 1-continued
| Structure | log P | H-bond donors | H-bond acceptors | log D | Topological polar surface area (Å$^2$) |
|---|---|---|---|---|---|
| 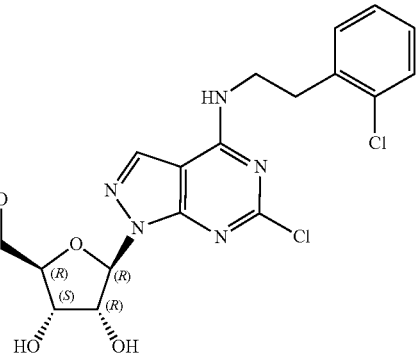 | −0.61 | 6 | 12 | −4.45 | 209.38 |
| 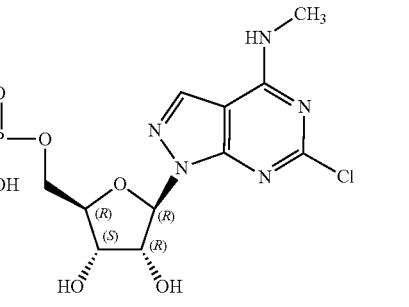 | −3.19 | 6 | 12 | −7.02 | 209.38 |
| 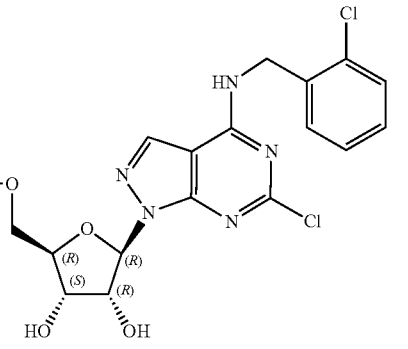 | −0.86 | 6 | 12 | −4.73 | 209.38 |
| 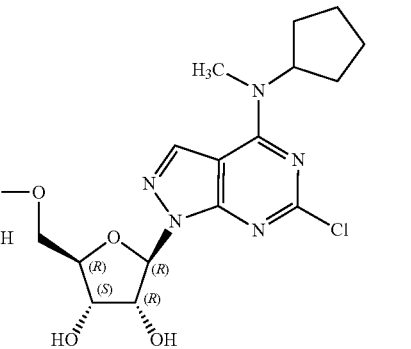 | −1.18 | 5 | 12 | −5.1 | 200.59 |

TABLE 1-continued

| Structure | log P | H-bond donors | H-bond acceptors | log D | Topological polar surface area (Å$^2$) |
| --- | --- | --- | --- | --- | --- |
| | −3.31 | 6 | 13 | −7.18 | 218.61 |
| | −0.86 | 6 | 12 | −4.73 | 209.38 |
| | −1 | 6 | 12 | −4.88 | 209.38 |
| | −1 | 6 | 12 | −4.88 | 209.38 |

TABLE 1-continued
| Structure | log P | H-bond donors | H-bond acceptors | log D | Topological polar surface area (Å$^2$) |
|---|---|---|---|---|---|
| 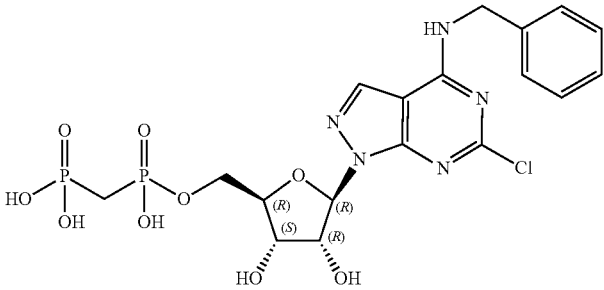 | −1.42 | 6 | 12 | −5.29 | 209.38 |
| 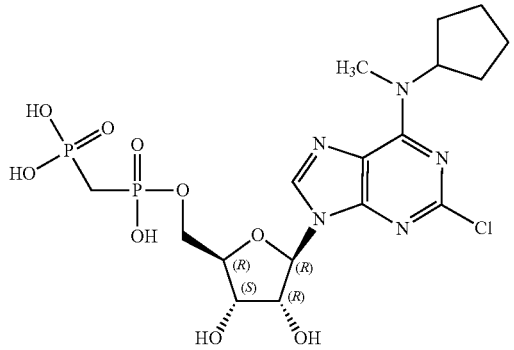 | −0.97 | 5 | 12 | −5 | 200.59 |
| 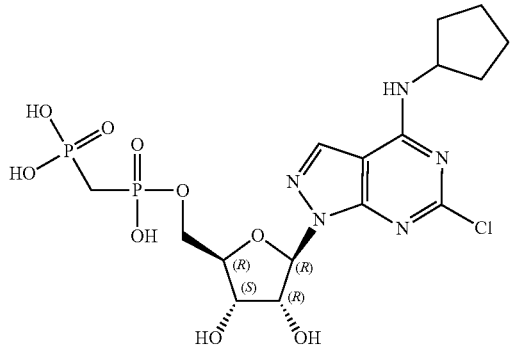 | −1.89 | 6 | 12 | −5.74 | 209.38 |
| 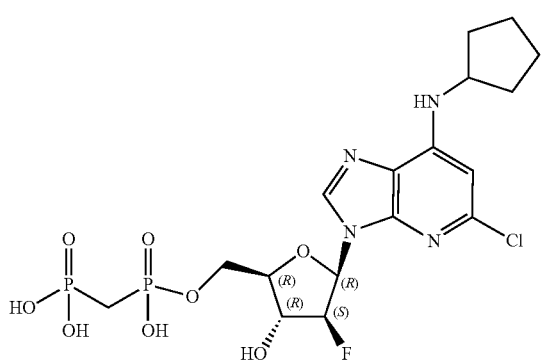 | −1.3 | 5 | 10 | −4.66 | 176.26 |

TABLE 1-continued

| Structure | log P | H-bond donors | H-bond acceptors | log D | Topological polar surface area (Å²) |
|---|---|---|---|---|---|
| | −0.81 | 5 | 12 | −4.85 | 200.59 |
| | −1.95 | 5 | 11 | −4.65 | 185.49 |
| | −0.84 | 4 | 10 | −3.3 | 167.47 |
| | −2.83 | 6 | 12 | −5.53 | 205.72 |

TABLE 1-continued

| Structure | log P | H-bond donors | H-bond acceptors | log D | Topological polar surface area (Å²) |
|---|---|---|---|---|---|
| | −2.17 | 6 | 11 | −5.54 | 196.49 |
| | 0.13 | 5 | 11 | −4.54 | 189.15 |
| | −1.01 | 5 | 11 | −4.87 | 189.15 |
| | −2.95 | 6 | 11 | −5.26 | 196.49 |

TABLE 1-continued
| Structure | log P | H-bond donors | H-bond acceptors | log D | Topological polar surface area (Å²) |
|---|---|---|---|---|---|
| 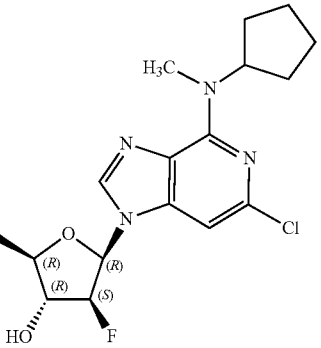 | −1.37 | 4 | 10 | −3.74 | 167.47 |
| 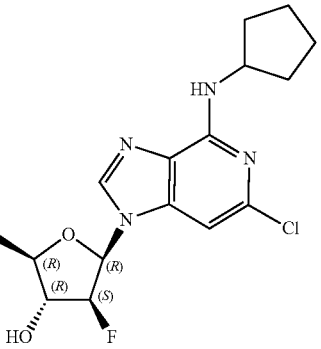 | −2.07 | 5 | 10 | −4.39 | 176.26 |
| 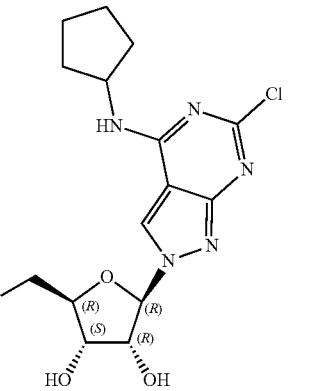 | −0.75 | 6 | 12 | −5.42 | 209.38 |
| 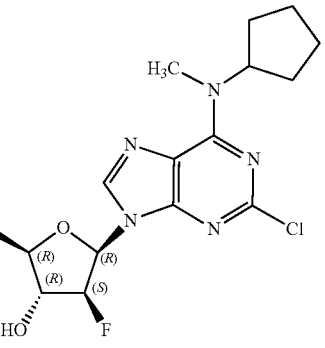 | −0.09 | 4 | 11 | −4.13 | 180.36 |

TABLE 1-continued

| Structure | log P | H-bond donors | H-bond acceptors | log D | Topological polar surface area (Å²) |
|---|---|---|---|---|---|
| [Structure: cyclopentyl-NH-purine (2-Cl) with ribose (2'-Me, 2'-OH, 3'-OH, R configurations) linked via 5'-O to methylenebisphosphonate] | −1.52 | 6 | 12 | −5.49 | 209.38 |
| [Structure: cyclopentyl-NH-purine (2-Cl) with 2'-F, 3'-OMe ribose linked via 5'-O to methylenebisphosphonate] | −0.22 | 4 | 11 | −4.2 | 178.15 |
| [Structure: benzyl-NH-purine (2-Cl) with ribose bearing ethyl substituent (R/S) at 5' position linked to methylenebisphosphonate] | −0.32 | 6 | 12 | −4.3 | 209.38 |
| [Structure: benzyl-NH-purine (2-Cl) with ribose bearing methyl substituent (R/S) at 5' position linked to methylenebisphosphonate] | −0.82 | 6 | 12 | −4.79 | 209.38 |

TABLE 1-continued

| Structure | log P | H-bond donors | H-bond acceptors | log D | Topological polar surface area (Å²) |
|---|---|---|---|---|---|
| | −3.01 | 6 | 13 | −5.36 | 218.61 |
| | −2.6 | 6 | 12 | −4.94 | 209.38 |
| | −2.22 | 5 | 12 | −6.21 | 198.38 |
| | −1.63 | 5 | 11 | −4.26 | 189.15 |

TABLE 1-continued

| Structure | log P | H-bond donors | H-bond acceptors | log D | Topological polar surface area (Å²) |
|---|---|---|---|---|---|
| | −2.33 | 5 | 12 | −5.3 | 198.38 |
| | −2.68 | 5 | 11 | −4.62 | 189.15 |
| | −3.13 | 5 | 11 | −5.07 | 189.15 |
| | −2.16 | 5 | 12 | −6.13 | 198.38 |

TABLE 1-continued

| Structure | log P | H-bond donors | H-bond acceptors | log D | Topological polar surface area (Å²) |
|---|---|---|---|---|---|
| | −1.76 | 5 | 12 | −4.02 | 192.39 |
| | −1.36 | 6 | 12 | −3.97 | 209.38 |
| | 0.22 | 5 | 11 | −3.76 | 189.15 |
| | −0.19 | 5 | 11 | −4.18 | 189.15 |

TABLE 1-continued

| Structure | log P | H-bond donors | H-bond acceptors | log D | Topological polar surface area (Å$^2$) |
|---|---|---|---|---|---|
| | 0.4 | 4 | 11 | −4.07 | 186.35 |
| | 0.16 | 5 | 11 | −3.82 | 189.15 |
| | −1.64 | 5 | 11 | −5.61 | 189.15 |
| | −1.74 | 5 | 11 | −5.7 | 189.15 |
| | −2.1 | 5 | 11 | −6.05 | 189.15 |

TABLE 1-continued

| Structure | log P | H-bond donors | H-bond acceptors | log D | Topological polar surface area (Å²) |
|---|---|---|---|---|---|
| (structure) | −2.22 | 5 | 12 | −6.21 | 198.38 |
| (structure) | −1.33 | 5 | 11 | −5.29 | 189.15 |
| (structure) | −1.31 | 5 | 11 | −5.29 | 189.15 |
| (structure) | −1.65 | 4 | 12 | −5.69 | 189.59 |

TABLE 1-continued

| Structure | log P | H-bond donors | H-bond acceptors | log D | Topological polar surface area (Å²) |
|---|---|---|---|---|---|
| | −0.57 | 4 | 11 | −4.61 | 180.36 |
| | −0.99 | 4 | 11 | −5.03 | 180.36 |
| | 0.76 | 5 | 11 | −2.39 | 189.15 |
| | −1.52 | 5 | 10 | −3.95 | 176.26 |

TABLE 1-continued

| Structure | log P | H-bond donors | H-bond acceptors | log D | Topological polar surface area (Å$^2$) |
|---|---|---|---|---|---|
| (structure: N-cyclopentyl, 2-CF$_3$ adenine with 2'-F, 3'-OH ribose and methylenebisphosphonate at 5') | 0.23 | 5 | 11 | −4.01 | 189.15 |
| (structure: N-(pyridin-4-ylmethyl), 2-Cl adenine with 2'-F, 3'-OH ribose and methylenebisphosphonate at 5') | −3.1 | 5 | 12 | −5.55 | 202.04 |
| (structure: N-(2-phenylethyl), 2-Cl adenine with 2'-F, 3'-OH ribose and methylenebisphosphonate at 5') | −0.08 | 5 | 11 | −4.05 | 189.15 |
| (structure: N-benzyl, 2-(2-phenylethyl) adenine with 2'-F, 3'-OH ribose and methylenebisphosphonate at 5') | −0.44 | 5 | 11 | −2.39 | 189.15 |

TABLE 1-continued

| Structure | log P | H-bond donors | H-bond acceptors | log D | Topological polar surface area (Å²) |
|---|---|---|---|---|---|
| | −0.74 | 5 | 11 | −2.81 | 189.15 |
| | −0.72 | 5 | 11 | −2.78 | 189.15 |
| | −0.19 | 5 | 11 | −4.18 | 189.15 |
| | 0.22 | 5 | 11 | −3.76 | 189.15 |
| | −1.07 | 5 | 10 | −3.5 | 176.26 |

TABLE 1-continued
| Structure | log P | H-bond donors | H-bond acceptors | log D | Topological polar surface area (Å²) |
|---|---|---|---|---|---|
| 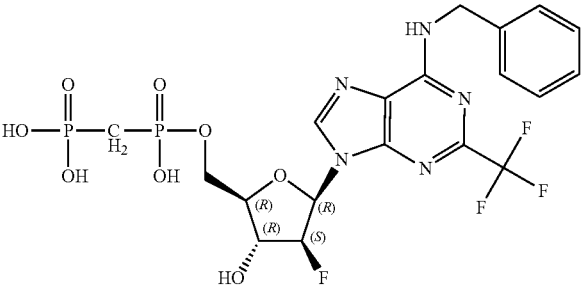 | 0.68 | 5 | 11 | −3.56 | 189.15 |
| 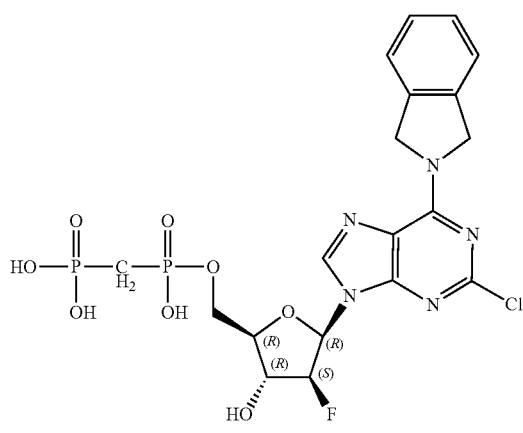 | 0.15 | 4 | 11 | −3.92 | 180.36 |
| 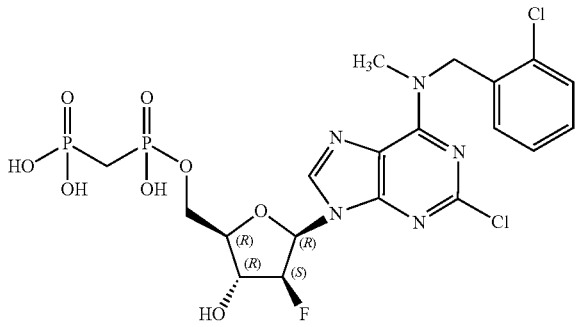 | 0.93 | 4 | 11 | −3.11 | 180.36 |
| 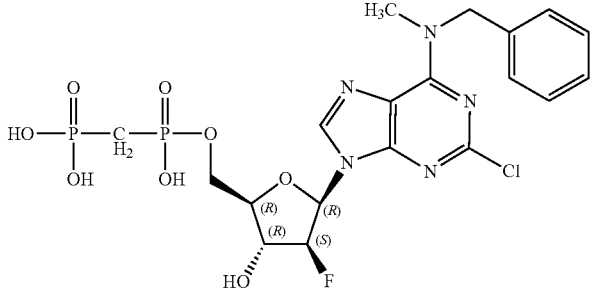 | 0.36 | 4 | 11 | −3.68 | 180.36 |

TABLE 1-continued

| Structure | log P | H-bond donors | H-bond acceptors | log D | Topological polar surface area (Å²) |
|---|---|---|---|---|---|
| | 0.22 | 5 | 11 | −3.76 | 189.15 |
| | −2.48 | 6 | 12 | −4.43 | 209.38 |
| | −2.9 | 6 | 12 | −4.85 | 209.38 |
| | −3.56 | 6 | 12 | −5.5 | 209.38 |

TABLE 1-continued

| Structure | log P | H-bond donors | H-bond acceptors | log D | Topological polar surface area (Å²) |
|---|---|---|---|---|---|
| | −0.79 | 5 | 11 | −4.77 | 189.15 |
| | −2.26 | 6 | 12 | −4.69 | 209.38 |
| | −2.59 | 6 | 12 | −4.6 | 209.38 |
| | −1.14 | 6 | 14 | −5.59 | 243.52 |
| | −1.86 | 6 | 12 | −4.24 | 209.38 |

TABLE 1-continued

| Structure | log P | H-bond donors | H-bond acceptors | log D | Topological polar surface area (Å$^2$) |
|---|---|---|---|---|---|
| (adenine base with 2'-methyl ribose, methylene bisphosphonate) | −5.67 | 6 | 12 | −8.01 | 223.37 |
| (N6-methyl-N6-isopropyl-2-chloroadenine ribose methylene bisphosphonate) | −1.49 | 5 | 12 | −5.52 | 200.59 |
| (N6-benzyl-2-chloroadenine 2'-fluoro ribose methylene bisphosphonate) | −0.34 | 5 | 11 | −4.32 | 189.15 |
| (N6-cyclopropyl-2-chloroadenine 2'-deoxyribose methylene bisphosphonate) | −2.51 | 6 | 12 | −6.49 | 209.38 |
| (2-fluoroadenine ribose methylene bisphosphonate) | −3.4 | 6 | 12 | −7.57 | 223.37 |

TABLE 1-continued
| Structure | log P | H-bond donors | H-bond acceptors | log D | Topological polar surface area (Å$^2$) |
|---|---|---|---|---|---|
| 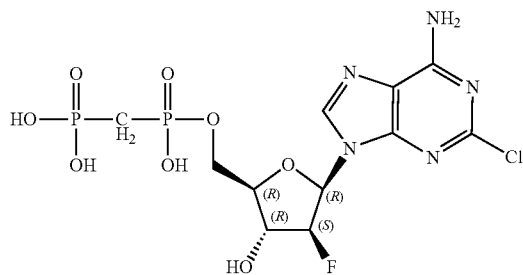 | −2.51 | 5 | 11 | −6.39 | 203.14 |
| 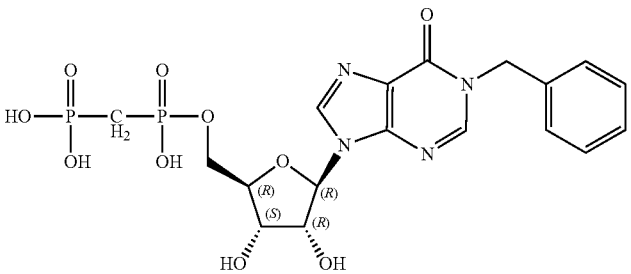 | −3.16 | 5 | 11 | −6.91 | 204.24 |
| 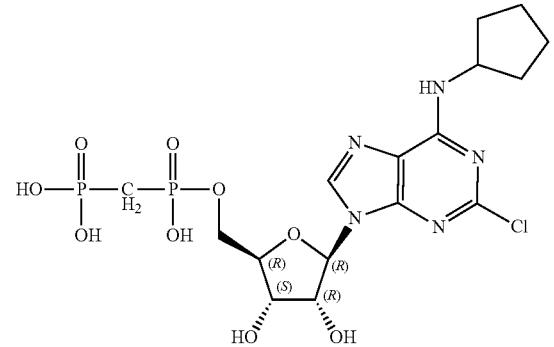 | −1.67 | 6 | 12 | −5.65 | 209.38 |
| 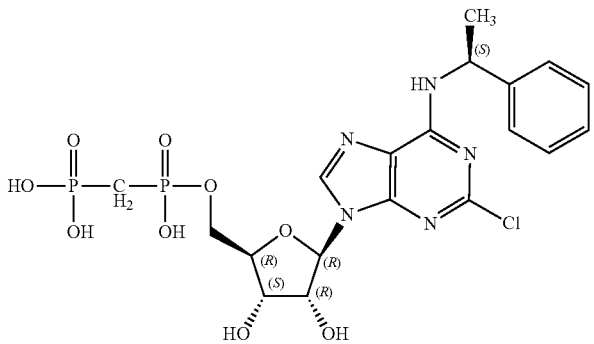 | −0.8 | 6 | 12 | −4.79 | 209.38 |

TABLE 1-continued

| Structure | log P | H-bond donors | H-bond acceptors | log D | Topological polar surface area (Å²) |
|---|---|---|---|---|---|
| [Structure: methylene bisphosphonate linked to ribose with N6-((R)-1-phenylethyl)amino-2-chloropurine] | −0.8 | 6 | 12 | −4.79 | 209.38 |
| [Structure: methylene bisphosphonate linked to ribose with N6-(4-tert-butylbenzyl)amino-2-chloropurine] | 0.37 | 6 | 12 | −3.61 | 209.38 |
| [Structure: methylene bisphosphonate linked to ribose with 3-deaza-6-amino-7-fluoropurine analog] | −3.87 | 6 | 11 | −7.18 | 210.48 |
| [Structure: methylene bisphosphonate linked to 2'-fluoro-ribose with adenine] | −4.95 | 5 | 11 | −7.28 | 203.14 |
| [Structure: methylene bisphosphonate linked to ribose with N6-benzyl-2-morpholinopurine] | −3.2 | 6 | 14 | −5.52 | 221.85 |

TABLE 1-continued

| Structure | log P | H-bond donors | H-bond acceptors | log D | Topological polar surface area (Å²) |
|---|---|---|---|---|---|
| | −2.11 | 6 | 13 | −4.43 | 212.62 |
| | −2.91 | 6 | 13 | −5.23 | 212.62 |
| | −3.56 | 7 | 13 | −5.88 | 221.41 |
| | −2.53 | 6 | 13 | −4.85 | 212.62 |
| | −3.01 | 6 | 13 | −5.63 | 218.61 |

TABLE 1-continued

| Structure | log P | H-bond donors | H-bond acceptors | log D | Topological polar surface area (Å²) |
|---|---|---|---|---|---|
| *(structure: N-benzyl, 2-chloro adenine ribose methylenebisphosphonate)* | −1.22 | 6 | 12 | −5.2 | 209.38 |
| *(structure: N-(3,5-dichlorobenzyl) adenine ribose methylenebisphosphonate)* | −2.6 | 6 | 12 | −4.97 | 209.38 |
| *(structure: N-(4-methylbenzyl) adenine ribose methylenebisphosphonate)* | −3.23 | 6 | 12 | −5.6 | 209.38 |
| *(structure: N-(4-trifluoromethylbenzyl) adenine ribose methylenebisphosphonate)* | −2.85 | 6 | 12 | −5.22 | 209.38 |
| *(structure: N-(4-biphenylmethyl) adenine ribose methylenebisphosphonate)* | −2.07 | 6 | 12 | −4.44 | 209.38 |

TABLE 1-continued
| Structure | log P | H-bond donors | H-bond acceptors | log D | Topological polar surface area (Å²) |
|---|---|---|---|---|---|
| 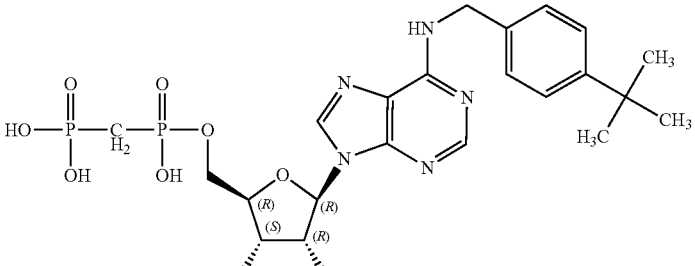 | −2.14 | 6 | 12 | −4.51 | 209.38 |
| 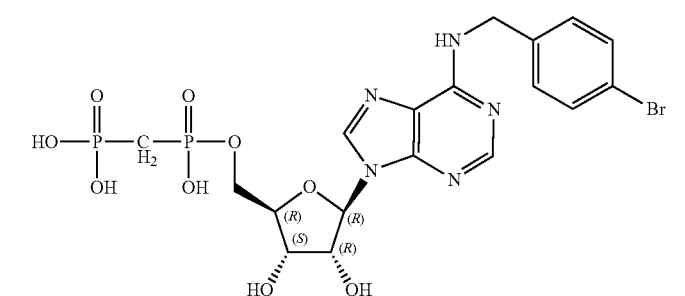 | −2.96 | 6 | 12 | −5.33 | 209.38 |
| 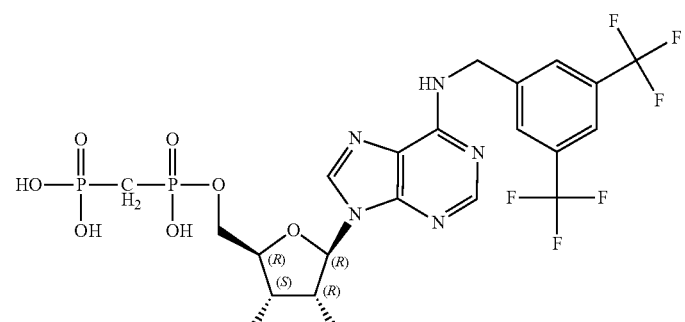 | −1.97 | 6 | 12 | −4.34 | 209.38 |
| 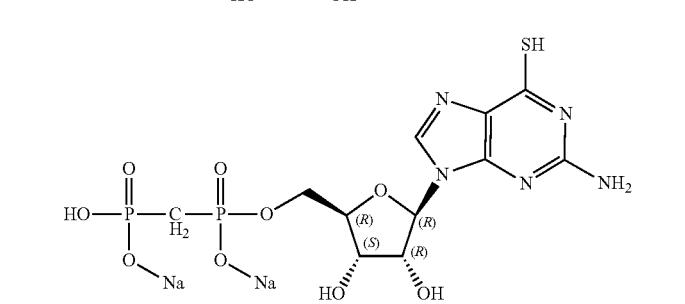 | −2.58 | 5 | 10 | −3.69 | 199.98 |
| 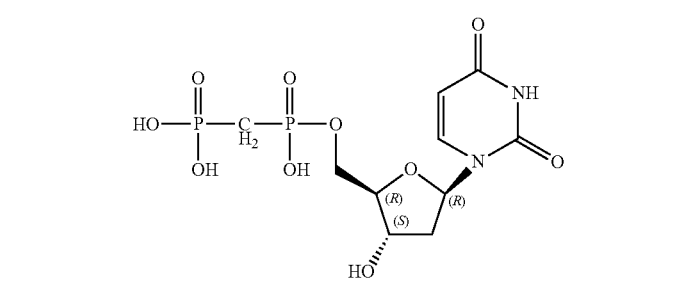 | −2.76 | 5 | 9 | −7.43 | 182.93 |

TABLE 1-continued

| Structure | log P | H-bond donors | H-bond acceptors | log D | Topological polar surface area (Å$^2$) |
|---|---|---|---|---|---|
| [Structure: adenosine analog with methylene bisphosphonate and N-benzyl group on purine] | −3.73 | 6 | 12 | −6.1 | 209.38 |

Methods of Synthesis

In general, the compounds provided herein, and in the Table above, can be prepared by methods as described related applications WO 2017/120508, WO 2018/067424 and WO 2018/094148. Selected examples of synthesis routes and compounds are provided in the Examples below.

Modifications to Enhance Inhibitor Characteristics

It is frequently beneficial, and sometimes imperative, to improve one or more physical properties of the treatment modalities disclosed herein and/or the manner in which they are administered. Improvements of physical properties include, for example, methods of increasing water solubility, bioavailability, serum half-life, and/or therapeutic half-life; and/or modulating biological activity.

Modifications known in the art include pegylation, Fc-fusion and albumin fusion. Although generally associated with large molecule agents (e.g., polypeptides), such modifications have recently been evaluated with particular small molecules. By way of example, Chiang, M. et al. (J. Am. Chem. Soc., 2014, 136(9):3370-73) describe a small molecule agonist of the adenosine 2a receptor conjugated to the immunoglobulin Fc domain. The small molecule-Fc conjugate retained potent Fc receptor and adenosine 2a receptor interactions and showed superior properties compared to the unconjugated small molecule. Covalent attachment of PEG molecules to small molecule therapeutics has also been described (Li, W. et al., Progress in Polymer Science, 2013 38:421-44).

Therapeutic and Prophylactic Uses

The present invention contemplates the use of the CD73 inhibitors described herein in the treatment or prevention of a broad range of diseases, disorders and/or conditions, and/or the symptoms thereof. While particular uses are described in detail hereafter, it is to be understood that the present invention is not so limited. Furthermore, although general categories of particular diseases, disorders and conditions are set forth hereafter, some of the diseases, disorders and conditions may be a member of more than one category, and others may not be a member of any of the disclosed categories.

Oncology-Related Disorders.

In accordance with the present invention, an CD73 inhibitor can be used to treat or prevent a proliferative condition or disorder, including a cancer, for example, cancer of the uterus, cervix, breast, prostate, testes, gastrointestinal tract (e.g., esophagus, oropharynx, stomach, small or large intestines, colon, or rectum), kidney, renal cell, bladder, bone, bone marrow, skin, head or neck, liver, gall bladder, heart, lung, pancreas, salivary gland, adrenal gland, thyroid, brain (e.g., gliomas), ganglia, central nervous system (CNS) and peripheral nervous system (PNS), and cancers of the hematopoietic system and the immune system (e.g., spleen or thymus). The present invention also provides methods of treating or preventing other cancer-related diseases, disorders or conditions, including, for example, immunogenic tumors, non-immunogenic tumors, dormant tumors, virus-induced cancers (e.g., epithelial cell cancers, endothelial cell cancers, squamous cell carcinomas and papillomavirus), adenocarcinomas, lymphomas, carcinomas, melanomas, leukemias, myelomas, sarcomas, teratocarcinomas, chemically-induced cancers, metastasis, and angiogenesis. The invention contemplates reducing tolerance to a tumor cell or cancer cell antigen, e.g., by modulating activity of a regulatory T-cell and/or a CD8+ T-cell (see, e.g., Ramirez-Montagut, et al. (2003) Oncogene 22:3180-87; and Sawaya, et al. (2003) New Engl. J. Med. 349:1501-09). In particular embodiments, the tumor or cancer is colon cancer, ovarian cancer, breast cancer, melanoma, lung cancer, glioblastoma, or leukemia. The use of the term(s) cancer-related diseases, disorders and conditions is meant to refer broadly to conditions that are associated, directly or indirectly, with cancer, and includes, e.g., angiogenesis and precancerous conditions such as dysplasia.

In certain embodiments, a cancer be metastatic or at risk of becoming metastatic, or may occur in a diffuse tissue, including cancers of the blood or bone marrow (e.g., leukemia). In some further embodiments, the compounds of the invention can be used to overcome T-cell tolerance.

In some embodiments, the present invention provides methods for treating a proliferative condition, cancer, tumor, or precancerous condition with an CD73 inhibitor and at least one additional therapeutic or diagnostic agent, examples of which are set forth elsewhere herein.

Immune-Related Disorders and Disorders with an Inflammatory Component.

As used herein, terms such as "immune disease", "immune condition", "immune disorder", "inflammatory disease", "inflammatory condition", "inflammatory disorder" and the like are meant to broadly encompass any immune-related condition (e.g., an autoimmune disease) or a disorder with an inflammatory component that can be treated by the CD73 inhibitors described herein such that some therapeutic benefit is obtained. Such conditions frequently are inextricably intertwined with other diseases, disorders and conditions. By way of example, an "immune condition" may refer to proliferative conditions, such as cancer, tumors, and angiogenesis; including infections (acute and chronic), tumors, and cancers that resist eradication by the immune system.

The CD73 inhibitors described herein can be used to increase or enhance an immune response; to improve immunization, including increasing vaccine efficacy; and to increase inflammation. Immune deficiencies associated with immune deficiency diseases, immunosuppressive medical treatment, acute and/or chronic infection, and aging can be treated using the compounds disclosed herein. The CD73 inhibitors can also be used to stimulate the immune system of patients suffering from iatrogenically-induced immune suppression, including those who have undergone bone marrow transplants, chemotherapy, or radiotherapy.

In particular embodiments of the present disclosure, the CD73 inhibitors described herein are used to increase or enhance an immune response to an antigen by providing adjuvant activity. In a particular embodiment, at least one antigen or vaccine is administered to a subject in combination with at least one CD73 inhibitor set forth herein to prolong an immune response to the antigen or vaccine. Therapeutic compositions are also provided which include at least one antigenic agent or vaccine component, including, but not limited to, viruses, bacteria, and fungi, or portions thereof, proteins, peptides, tumor-specific antigens, and nucleic acid vaccines, in combination with at least one CD73 inhibitor according to the teachings of the present invention.
Microbial-Related Disorders.

By inhibiting the immunosuppressive and anti-inflammatory activity of CD73, the present invention contemplates the use of the CD73 inhibitors described herein in the treatment and/or prevention of any viral, bacterial, fungal, parasitic or other infective disease, disorder or condition for which treatment with an CD73 inhibitor may be beneficial. Examples of such diseases and disorders include HIV and AIDS, staphylococcal and streptococcal infections (e.g., *Staphylococcus aureus* and *streptococcus sanguinis*, respectively), *leishmania, toxoplasma, trichomonas, giardia, Candida albicans, Bacillus anthracis*, and *Pseudomonas aeruginosa*. Compounds of the invention can be used to treat sepsis, decrease or inhibit bacterial growth, and reduce or inhibit inflammatory cytokines.

CNS-Related and Neurological Disorders.

Inhibition of CD73 may also be an important treatment strategy for patients with neurological, neuropsychiatric, neurodegenerative or other diseases, disorders and conditions having some association with the central nervous system, including disorders associated with impairment of cognitive function and motor function. Examples include Parkinson's disease, extra pyramidal syndrome (EPS), dystonia, akathisia, tardive dyskinesia, restless leg syndrome (RLS), epilepsy, periodic limb movement in sleep (PLMS), attention deficit disorders, depression, anxiety, dementia, Alzheimer's disease, Huntington's disease, multiple sclerosis, cerebral ischemia, hemorrhagic stroke, subarachnoid hemorrhage, and traumatic brain injury.
Other Disorders.

Embodiments of the present invention contemplate the administration of the CD73 inhibitors described herein to a subject for the treatment or prevention of any other disorder that may benefit from at least some level of CD73 inhibition. Such diseases, disorders and conditions include, for example, cardiovascular (e.g., cardiac ischemia), gastrointestinal (e.g., Crohn's disease), metabolic (e.g., diabetes), hepatic (e.g., hepatic fibrosis, NASH, and NAFLD), pulmonary (e.g., COPD and asthma), ophthalmologic (e.g., diabetic retinopathy), and renal (e.g., renal failure) disorders.

In some embodiments, the CD73 inhibitors of the present invention may be used to inhibit statin-induced adenosine production, or reduce or decrease increases in blood glucose caused by a statin in a subject taking a statin (e.g., lovastatin and pravastatin)
Pharmaceutical Compositions The CD73 inhibitors of the present invention may be in the form of compositions suitable for administration to a subject. In general, such compositions are "pharmaceutical compositions" comprising an CD73 inhibitor(s) and one or more pharmaceutically acceptable or physiologically acceptable diluents, carriers or excipients. In certain embodiments, the CD73 inhibitors are present in a therapeutically acceptable amount. The pharmaceutical compositions may be used in the methods of the present invention; thus, for example, the pharmaceutical compositions can be administered ex vivo or in vivo to a subject in order to practice the therapeutic and prophylactic methods and uses described herein.

The pharmaceutical compositions of the present invention can be formulated to be compatible with the intended method or route of administration; exemplary routes of administration are set forth herein. Furthermore, the pharmaceutical compositions may be used in combination with other therapeutically active agents or compounds as described herein in order to treat or prevent the diseases, disorders and conditions as contemplated by the present invention.

The pharmaceutical compositions typically comprise a therapeutically effective amount of an CD73 inhibitor contemplated by the present invention and one or more pharmaceutically and physiologically acceptable formulation agents. Suitable pharmaceutically acceptable or physiologically acceptable diluents, carriers or excipients include, but are not limited to, antioxidants (e.g., ascorbic acid and sodium bisulfate), preservatives (e.g., benzyl alcohol, methyl parabens, ethyl or n-propyl, p-hydroxybenzoate), emulsifying agents, suspending agents, dispersing agents, solvents, fillers, bulking agents, detergents, buffers, vehicles, diluents, and/or adjuvants. For example, a suitable vehicle may be physiological saline solution or citrate buffered saline, possibly supplemented with other materials common in pharmaceutical compositions for parenteral administration. Neutral buffered saline or saline mixed with serum albumin are further exemplary vehicles. Those skilled in the art will readily recognize a variety of buffers that can be used in the pharmaceutical compositions and dosage forms contemplated herein. Typical buffers include, but are not limited to, pharmaceutically acceptable weak acids, weak bases, or mixtures thereof. As an example, the buffer components can be water soluble materials such as phosphoric acid, tartaric acids, lactic acid, succinic acid, citric acid, acetic acid, ascorbic acid, aspartic acid, glutamic acid, and salts thereof. Acceptable buffering agents include, for example, a Tris buffer, N-(2-Hydroxyethyl)piperazine-N'-(2-ethanesulfonic acid) (HEPES), 2-(N-Morpholino)ethanesulfonic acid (MES), 2-(N-Morpholino)ethanesulfonic acid sodium salt (MES), 3-(N-Morpholino)propanesulfonic acid (MOPS), and N-tris[Hydroxymethyl]methyl-3-aminopropanesulfonic acid (TAPS).

After a pharmaceutical composition has been formulated, it may be stored in sterile vials as a solution, suspension, gel, emulsion, solid, or dehydrated or lyophilized powder. Such formulations may be stored either in a ready-to-use form, a lyophilized form requiring reconstitution prior to use, a liquid form requiring dilution prior to use, or other acceptable form. In some embodiments, the pharmaceutical composition is provided in a single-use container (e.g., a single-use vial, ampoule, syringe, or autoinjector (similar to, e.g., an EpiPen®)), whereas a multi-use container (e.g., a multi-use vial) is provided in other embodiments.

Formulations can also include carriers to protect the composition against rapid degradation or elimination from the body, such as a controlled release formulation, including liposomes, hydrogels, prodrugs and microencapsulated delivery systems. For example, a time delay material such as glyceryl monostearate or glyceryl stearate alone, or in combination with a wax, may be employed. Any drug delivery apparatus may be used to deliver an CD73 inhibitor, including implants (e.g., implantable pumps) and catheter systems, slow injection pumps and devices, all of which are well known to the skilled artisan.

Depot injections, generally administered subcutaneously or intramuscularly, can also be utilized to release the CD73 inhibitors disclosed herein over a defined period of time. Depot injections are usually either solid- or oil-based and generally comprise at least one of the formulation components set forth herein. One of ordinary skill in the art is familiar with possible formulations and uses of depot injections.

Pharmaceutical compositions as provided herein can also be in the form of a sterile injectable aqueous or oleagenous suspensions. This suspension may be formulated according to the known art using those suitable dispersing or wetting agents and suspending agents mentioned herein. The sterile injectable preparation may also be a sterile injectable solution or suspension in a non-toxic parenterally-acceptable diluent or solvent, for example, as a solution in 1,3-butane diol. Acceptable diluents, solvents and dispersion media that may be employed include water, Ringer's solution, isotonic sodium chloride solution, Cremophor EL™ (BASF, Parsippany, NJ) or phosphate buffered saline (PBS), ethanol, polyol (e.g., glycerol, propylene glycol, and liquid polyethylene glycol), and suitable mixtures thereof. In addition, sterile, fixed oils are conventionally employed as a solvent or suspending medium. For this purpose any bland fixed oil may be employed, including synthetic mono- or diglycerides. Moreover, fatty acids such as oleic acid, find use in the preparation of injectables. Prolonged absorption of particular injectable formulations can be achieved by including an agent that delays absorption (e.g., aluminum monostearate or gelatin).

Routes of Administration

The present invention contemplates the administration of CD73 inhibitors, and compositions thereof, in any appropriate manner. Suitable routes of administration include parenteral (e.g., intramuscular, intravenous, subcutaneous (e.g., injection or implant), intraperitoneal, intracisternal, intraarticular, intraperitoneal, intracerebral (intraparenchymal) and intracerebroventricular), and intraocular. Depot injections, which are generally administered subcutaneously or intramuscularly, may also be utilized to release the CD73 inhibitors described herein over a defined period of time.

Combination Therapy

The present invention contemplates the use of CD73 inhibitors alone or in combination with one or more active therapeutic agents. The additional active therapeutic agents can be small chemical molecules; macromolecules such as proteins, antibodies, peptibodies, peptides, DNA, RNA or fragments of such macromolecules; or cellular or gene therapies. In such combination therapy, the various active agents frequently have different, complementary mechanisms of action. Such combination therapy may be especially advantageous by allowing a dose reduction of one or more of the agents, thereby reducing or eliminating the adverse effects associated with one or more of the agents. Furthermore, such combination therapy may have a synergistic therapeutic or prophylactic effect on the underlying disease, disorder, or condition.

As used herein, "combination" is meant to include therapies that can be administered separately, for example, formulated separately for separate administration (e.g., as may be provided in a kit), and therapies that can be administered together in a single formulation (i.e., a "co-formulation").

In certain embodiments, the CD73 inhibitors are administered or applied sequentially, e.g., where one agent is administered prior to one or more other agents. In other embodiments, the CD73 inhibitors are administered simultaneously, e.g., where two or more agents are administered at or about the same time; the two or more agents may be present in two or more separate formulations or combined into a single formulation (i.e., a co-formulation). Regardless of whether the two or more agents are administered sequentially or simultaneously, they are considered to be administered in combination for purposes of the present invention.

The CD73 inhibitors described herein can be used in combination with at least one other (active) agent in any manner appropriate under the circumstances. In one embodiment, treatment with the at least one active agent and at least one CD73 inhibitor of the present invention is maintained over a period of time. In another embodiment, treatment with the at least one active agent is reduced or discontinued (e.g., when the subject is stable), while treatment with an CD73 inhibitor of the present invention is maintained at a constant dosing regimen. In a further embodiment, treatment with the at least one active agent is reduced or discontinued (e.g., when the subject is stable), while treatment with an CD73 inhibitor of the present invention is reduced (e.g., lower dose, less frequent dosing or shorter treatment regimen). In yet another embodiment, treatment with the at least one active agent is reduced or discontinued (e.g., when the subject is stable), and treatment with the CD73 inhibitor of the present invention is increased (e.g., higher dose, more frequent dosing or longer treatment regimen). In yet another embodiment, treatment with the at least one active agent is maintained and treatment with the CD73 inhibitor of the present invention is reduced or discontinued (e.g., lower dose, less frequent dosing or shorter treatment regimen). In yet another embodiment, treatment with the at least one active agent and treatment with the CD73 inhibitor of the present invention are reduced or discontinued (e.g., lower dose, less frequent dosing or shorter treatment regimen).

Oncology-Related Disorders.

The present invention provides methods for treating and/or preventing a proliferative condition, cancer, tumor, or precancerous disease, disorder or condition with an CD73 inhibitor and at least one additional therapeutic or diagnostic agent.

In certain embodiments, the present invention provides methods for tumor suppression of tumor growth comprising administration of an CD73 inhibitor described herein in combination with a signal transduction inhibitor (STI) to achieve additive or synergistic suppression of tumor growth. As used herein, the term "signal transduction inhibitor" refers to an agent that selectively inhibits one or more steps in a signaling pathway. Signal transduction inhibitors (STIs) of the present invention include: (i) bcr/abl kinase inhibitors (e.g., GLEEVEC); (ii) epidermal growth factor (EGF) receptor inhibitors, including kinase inhibitors and antibodies; (iii) her-2/neu receptor inhibitors (e.g., HERCEPTIN); (iv) inhibitors of Akt family kinases or the Akt pathway (e.g., rapamycin); (v) cell cycle kinase inhibitors (e.g., flavopiridol); and (vi) phosphatidyl inositol kinase inhibitors. Agents involved in in immunomodulation can also be used in combination with the CD73 inhibitors described herein for the suppression of tumor growth in cancer patients.

Examples of chemotherapeutic agents include, but are not limited to, alkylating agents such as thiotepa and cycosphosphamide; alkyl sulfonates such as busulfan, improsulfan and piposulfan; aziridines such as benzodopa, carboquone, meturedopa, and uredopa; ethylenimines and methylamelamines including altretamine, triethylenemelamine, trietylenephosphoramide, triethylenethiophosphaoramide and trimethylolomelamime; nitrogen mustards such as chiorambucil, chlornaphazine, cholophosphamide, estramustine, ifosfamide, mechlorethamine, mechlorethamine oxide hydrochloride, melphalan, novembichin, phenesterine, prednimustine, trofosfamide, uracil mustard; nitrosureas such as carmustine, chlorozotocin, fotemustine, lomustine, nimustine, ranimustine; antibiotics such as aclacinomysins, actinomycin, authramycin, azaserine, bleomycins, cactinomycin, calicheamicin, carabicin, caminomycin, carzinophilin, chromomycins, dactinomycin, daunorubicin, detorubicin, 6-diazo-5-oxo-L-norleucine, doxorubicin, epirubicin, esorubicin, idarubicin, marcellomycin, mitomycins, mycophenolic acid, nogalamycin, olivomycins, peplomycin, potfiromycin, puromycin, quelamycin, rodorubicin, streptonigrin, streptozocin, tubercidin, ubenimex, zinostatin, zorubicin; anti-metabolites such as methotrexate and 5-fluorouracil (5-FU); folic acid analogs such as denopterin, methotrexate, pteropterin, trimetrexate; purine analogs such as fludarabine, 6-mercaptopurine, thiamiprine, thioguanine; pyrimidine analogs such as ancitabine, azacitidine, 6-azauridine, carmofur, cytarabine, dideoxyuridine, doxifluridine, enocitabine, floxuridine, 5-FU; androgens such as calusterone, dromostanolone propionate, epitiostanol, mepitiostane, testolactone; anti-adrenals such as aminoglutethimide, mitotane, trilostane; folic acid replenisher such as frolinic acid; aceglatone; aldophosphamide glycoside; aminolevulinic acid; amsacrine; bestrabucil; bisantrene; edatraxate; defofamine; demecolcine; diaziquone; elformithine; elliptinium acetate; etoglucid; gallium nitrate; hydroxyurea; lentinan; lonidamine; mitoguazone; mitoxantrone; mopidamol; nitracrine; pentostatin; phenamet; pirarubicin; podophyllinic acid; 2-ethylhydrazide; procarbazine; razoxane; sizofiran; spirogermanium; tenuazonic acid; triaziquone; 2,2',2"-trichlorotriethylamine; urethan; vindesine; dacarbazine; mannomustine; mitobronitol; mitolactol; pipobroman; gacytosine; arabinoside (Ara-C); cyclophosphamide; thiotepa; taxoids, e.g., paclitaxel and doxetaxel; chlorambucil; gemcitabine; 6-thioguanine; mercaptopurine; methotrexate; platinum and platinum coordination complexes such as cisplatin and carboplatin; vinblastine; etoposide (VP-16); ifosfamide; mitomycin C; mitoxantrone; vincristine; vinorelbine; navelbine; novantrone; teniposide; daunomycin; aminopterin; xeloda; ibandronate; CPT11; topoisomerase inhibitors; difluoromethylornithine (DMFO); retinoic acid; esperamicins; capecitabine; and pharmaceutically acceptable salts, acids or derivatives of any of the above.

Chemotherapeutic agents also include anti-hormonal agents that act to regulate or inhibit hormonal action on tumors such as anti-estrogens, including for example tamoxifen, raloxifene, aromatase inhibiting 4(5)-imidazoles, 4-hydroxytamoxifen, trioxifene, keoxifene, onapristone, and toremifene; and antiandrogens such as flutamide, nilutamide, bicalutamide, leuprolide, and goserelin; and pharmaceutically acceptable salts, acids or derivatives of any of the above. In certain embodiments, combination therapy comprises administration of a hormone or related hormonal agent.

Additional treatment modalities that may be used in combination with an CD73 inhibitor include radiotherapy, a monoclonal antibody against a tumor antigen, a complex of a monoclonal antibody and toxin, a T-cell adjuvant, bone marrow transplant, or antigen presenting cells (e.g., dendritic cell therapy), including TLR agonists which are used to stimulate such antigen presenting cells.

In certain embodiments, the present invention contemplates the use of the compounds described herein in combination with adoptive cell therapy, a new and promising form of personalized immunotherapy in which immune cells with anti-tumor activity are administered to cancer patients. Adoptive cell therapy is being explored using tumor-infiltrating lymphocytes (TIL) and T cells engineered to express, for example, chimeric antigen receptors (CAR) or T cell receptors (TCR). Adoptive cell therapy generally involves collecting T cells from an individual, genetically modifying them to target a specific antigen or to enhance their anti-tumor effects, amplifying them to a sufficient number, and infusion of the genetically modified T cells into a cancer patient. T cells can be collected from the patient to whom the expanded cells are later reinfused (e.g., autologous) or can be collected from donor patients (e.g., allogeneic).

In certain embodiments, the present invention contemplates the use of the compounds described herein in combination with RNA interference-based therapies to silence gene expression. RNAi begins with the cleavage of longer double-stranded RNAs into small interfering RNAs (siRNAs). One strand of the siRNA is incorporated into a ribonucleoprotein complex known as the RNA-induced silencing complex (RISC), which is then used to identify mRNA molecules that are at least partially complementary to the incorporated siRNA strand. RISC can bind to or cleave the mRNA, both of which inhibits translation.

In further embodiments, the present invention contemplates the use of the inhibitors of CD73 function described herein in combination with activators of the antitumor immune T cell response through agonistic targets (e.g., CD137, OX40 and GITR), or by exposing immune cells to antigens through vaccines and oncolytic viruses.

CD137, also referred to as 4-1BB, is a tumor necrotic factor receptor found primarily on activated T cells, NK cells, and myeloid cells. Binding of CD137 with its ligand (CD137L) results in a stimulatory signal to activate CD4+ and CD8+ T cells by increasing IL-2, IL-4 and interferon gamma production. When evaluated in murine models, CD137 antibodies have increased antitumor immune responses, and decreased humoral immune responses and antibody production that leads to autoimmune diseases. A CD137 antibody, urelumab, has been evaluated in clinical trials for the treatment of head and neck cancer and metastatic melanoma. OX40 is a costimulatory transmembrane glycoprotein receptor on activated T cells. Ligands on APCs binding to OX40 have been shown to increase T-cell proliferation, cytotoxic activity and survival. In murine models, OX40 antibodies have demonstrated tumor regression, and Phase I clinical trials with OX40 antibodies are underway. GITR (Glucocorticoid-induced TNFR family related gene; also known as CD357) is also an activation immune checkpoint that enhances host immune responses. Compared to other checkpoints, less work has been conducted to determine GITR's potential as a target in oncology therapy.

Vaccines, especially those that target dendritic cells, represent another mechanism to activate an antitumor T-cell response. Clinical trials using dendritic cell vaccines are on-going for, for example, melanoma (Gp 100 peptide-pulsed DC vaccine) and glioblastoma (heat shock protein peptide complex-96). Vaccine therapy in combination with checkpoint inhibitors is also being evaluated.

Oncolytic viruses that are injected into the tumor microenvironment represent another avenue to stimulate an immune reaction against a tumor. Oncolytic viruses are engineered to specifically target cancer cells for replication and toxicity. Currently, adenoviruses, HSV, the measles virus, retroviruses, and parvoviruses are being investigated as potential oncolytic viral therapies. Talimogene laherparepvec (T-VEC) has been evaluated in melanoma in Phase III trials, and clinical trials are ongoing for pancreatic cancer, ovarian cancer and hepatocellular carcinoma, among others.

Immune Checkpoint Inhibitors.

The present invention contemplates the use of the inhibitors of CD73 function described herein in combination with immune checkpoint inhibitors.

The tremendous number of genetic and epigenetic alterations that are characteristic of all cancers provides a diverse set of antigens that the immune system can use to distinguish tumor cells from their normal counterparts. In the case of T cells, the ultimate amplitude (e.g., levels of cytokine production or proliferation) and quality (e.g., the type of immune response generated, such as the pattern of cytokine production) of the response, which is initiated through antigen recognition by the T-cell receptor (TCR), is regulated by a balance between costimulatory and inhibitory signals (immune checkpoints). Under normal physiological conditions, immune checkpoints are crucial for the prevention of autoimmunity (i.e., the maintenance of self-tolerance) and also for the protection of tissues from damage when the immune system is responding to pathogenic infection. The expression of immune checkpoint proteins can be dysregulated by tumors as an important immune resistance mechanism.

Examples of immune checkpoints (ligands and receptors), some of which are selectively upregulated in various types of tumor cells, that are candidates for blockade include PD1 (programmed cell death protein 1); PDL1 (PD1 ligand); BTLA (B and T lymphocyte attenuator); CTLA4 (cytotoxic T-lymphocyte associated antigen 4); TIM3 (T-cell membrane protein 3); LAG3 (lymphocyte activation gene 3); TIGIT (T cell immunoreceptor with Ig and ITIM domains); A2aR (adenosine A2a receptor A2aR); and Killer Inhibitory Receptors, which can be divided into two classes based on their structural features: i) killer cell immunoglobulin-like receptors (KIRs), and ii) C-type lectin receptors (members of the type II transmembrane receptor family). Other less well-defined immune checkpoints have been described in the literature, including both receptors (e.g., the 2B4 (also known as CD244) receptor) and ligands (e.g., certain B7 family inhibitory ligands such B7-H3 (also known as CD276) and B7-H4 (also known as B7-S1, B7x and VCTN1)). See Pardoll, (April 2012) Nature Rev. Cancer 12:252-64.

The present invention contemplates the use of the inhibitors of CD73 function that are candidates for parenteral administration according to the teachings set forth herein in combination with inhibitors of the aforementioned immune-checkpoint receptors and ligands, as well as yet-to-be-described immune-checkpoint receptors and ligands. Certain modulators of immune checkpoints are currently available, whereas others are in late-stage development. To illustrate, when it was approved for the treatment of melanoma in 2011, the fully humanized CTLA4 monoclonal antibody ipilimumab (YERVOY; Bristol-Myers Squibb) became the first immune checkpoint inhibitor to receive regulatory approval in the US. Fusion proteins comprising CTLA4 and an antibody (CTLA4-Ig; abatcept (ORENCIA; Bristol-Myers Squibb)) have been used for the treatment of rheumatoid arthritis, and other fusion proteins have been shown to be effective in renal transplantation patients that are sensitized to Epstein Barr Virus. The next class of immune checkpoint inhibitors to receive regulatory approval were against PD-1 and its ligands PD-L1 and PD-L2. Approved anti-PD1 antibodies include nivolumab (OPDIVO; Bristol-Myers Squibb) and pembrolizumab (KEYTRUDA; Merck) for various cancers, including squamous cell carcinoma, classical Hodgkin lymphoma and urothelial carcinoma. Approved anti-PDL1 antibodies include avelumab (BAVENCIO, EMD Serono & Pfizer), atezolizumab (TECENTRIQ; Roche/Genentech), and durvalumab (IMFINZI; AstraZeneca) for certain cancers, including urothelial carcinoma. While there are no approved therapeutics targeting TIGIT or its ligands CD155 and CD112, those in development include BMS-986207 (Bristol-Myers Squibb), MTIG7192A/RG6058 (Roche/Genentech), and OMP-31M32 (OncoMed).

The present invention encompasses pharmaceutically acceptable salts, acids or derivatives of any of the above.

In the 2015-17 timeframe, the FDA approved immune checkpoint inhibitors for the treatment of certain types of lung cancer, head and neck cancer, bladder cancer, kidney cancer, and Hodgkin lymphoma. Some of these are described in more detail hereafter.

Advanced Melanoma.

The number of people diagnosed with melanoma has risen sharply over the last three decades and is continuing to increase worldwide. Melanoma is the fifth most common cancer among men and the seventh most common cancer among women. Although it accounts for only 1% of all skin cancers, melanoma causes the vast majority of deaths. Although most people with melanoma are cured with surgery alone, among patients with metastatic melanoma, only 17% will live 5 years after their diagnosis.

When it was approved, ipilimumab became the first therapy that could prolong life for patients with advanced melanoma. The FDA subsequently approved two additional checkpoint inhibitors, pembrolizumab and nivolumab, for the treatment of advanced melanoma. In particular studies, both were more effective than ipilimumab and caused fewer adverse effects.

Advanced Lung Cancer.

Lung cancer is the most common cancer worldwide, with 1.8 million new diagnoses in 2012, and it is also the leading cause of cancer-related death, causing roughly 1.6 million deaths each year. Non-small-cell lung cancer (NSCLC) accounts for the great majority (85%) of all lung cancers. As opposed to melanoma and renal cell cancer, NSCLC had previously not been considered to be a cancer sensitive to immunotherapy. Indeed, there has only recently been a paradigm shift in lung cancer therapy from targeting the cancer cell itself to targeting cancer cell immune tolerance.

Until the approval of the PD-1 checkpoint inhibitors pembrolizumab (200 mg every three weeks) and nivolumab in 2015, the median life expectancy with standard chemotherapy was only 10 months. Pembrolizumab therapy offered marked improvement in survival, and the rate of severe adverse effects was much lower than with standard chemotherapy. Although PD-1/PD-L1 blockade therapy results in marked clinical benefits in roughly 20% of patients with advanced NSCLC, about 80% of patients are refractory to such therapy. As such, combination therapy and the like are deemed to be especially beneficial for this type of cancer.

In view of the effectiveness of immuno-therapy, PD-L1 biomarker testing is emerging as a means for selecting patients who are most likely to benefit from immune checkpoint inhibitors.

Thus, newly diagnosed NSCLC patients will undergo testing for PD-L1, and patients with high PD-L1 levels will likely receive immuno-therapy rather than chemotherapy.

The PD-L1 inhibitor atezolizumab, previously approved for the treatment of bladder cancer, was approved by the FDA in 2016 for patients with previously treated, metastatic NSCLC. In 2016, the FDA also approved pembrolizumab for use as first-line treatment for patients with advanced, PD-L1-positive NSCLC.

Advanced Bladder Cancer.

Bladder cancer, which is more common among men than women, is the fourth most common cancer among men. The most commonly diagnosed type of bladder cancer is superficial bladder cancer, which can typically be treated successfully. However, patients having advanced bladder cancer have historically had limited treatment options. Indeed, there had been little progress in the treatment of advanced bladder cancer for several decades until the FDA approval of the immunotherapy atezolizumab in May 2016. Among patients with bladder cancer that worsens after initial cisplatin- or platinum-based chemotherapy, historical response rates to chemotherapy have been poor, with tumors shrinking in only approximately 10% of patients. In contrast, in certain studies the response rate to atezolizumab was 15% among all patients and 27% in those patients with more PD-L1-positive immune cells.

In clinical trials employing the use of pembrolizumab in patients with advanced bladder cancer, patients with previously treated cancer who received pembrolizumab lived longer than those who received chemotherapy. Another clinical trial suggested that pembrolizumab may also be effective as a first-line treatment for patients with advanced bladder cancer who are not eligible for cisplatin chemotherapy.

Treatment of bladder cancer is addressed further below in conjunction with the discussion of urothelial carcinoma.

Recurrent or Metastatic Head and Neck Cancer.

More than 600,000 people around the world are diagnosed with head and neck cancer every year, with nearly 50,000 in the United States alone. Few treatment options exist, particularly if it recurs or metastasizes. Patients with squamous cell head and neck cancer that worsens within 6 months of treatment with chemotherapy have no life-extending therapy options.

Nivolumab has been approved for the treatment of patients with recurrent or metastatic squamous cell carcinoma of the head and neck. In clinical studies, the estimated 1-year survival rate was more than two-fold higher among patients treated with nivolumab than that among those treated with standard chemotherapy. Moreover, fewer patients receiving nivolumab experienced severe adverse effects, and the quality of life remained stable among patients who received nivolumab but deteriorated among those who received chemotherapy.

Currently no other immunotherapy agents have been approved in the United States for treating head and neck cancer.

Slowing of Ovarian Cancer Progression.

Although ovarian cancer is relatively uncommon compared to other cancers, it is the fifth most common cause of cancer-related deaths among US women. Because of the lack of specific symptoms, ovarian cancer has often reached an advanced stage by the time of diagnosis. Despite surgery and chemotherapy, more than 70% of women with ovarian cancer that goes into remission eventually experience a relapse. Fewer than half of such women live 5 years after diagnosis.

Clinical studies in 2015 suggested that nivolumab may help some women with ovarian cancer that has relapsed after platinum-based chemotherapy. Research is on-going regarding how best to incorporate immunotherapy into the treatment of ovarian cancer, including, for example, the use of nivolumab in combination with other immunotherapies for women with recurrent ovarian cancer.

Hodgkin Lymphoma.

Hodgkin lymphoma is a cancer of the lymphatic system that is more prevalent among young adults and men than it is among women. Classic Hodgkin lymphoma, the most common type of Hodgkin lymphoma, has been treated with some success with traditional chemotherapy. However, approximately 20% to 30% of patients with classic Hodgkin lymphoma will relapse after initial treatment or will not respond to therapy at all; such patients require further, more intensive treatment, such as high-dose chemotherapy followed by autologous stem-cell transplantation (ASCT).

Genetic changes in malignant classic Hodgkin lymphoma cells (Reed-Sternberg cells) result in an abundance of immune checkpoint molecules PD-L1 and PD-L2, which help the cancer cells dampen immune responses through the PD-1/PD-L1 checkpoint. Thus, classic Hodgkin lymphoma is particularly susceptible to PD-1 and PD-L1 immune checkpoint inhibitors. The PD-1 checkpoint inhibitors nivolumab and pembrolizumab have been approved for treatment of relapsed or refractory classic Hodgkin lymphoma.

Urothelial Carcinoma.

Urothelial carcinoma is one of the top ten leading causes of cancer death worldwide. The pathological sites of urothelial carcinoma include the ureter and renal pelvis in the upper tract and the urethra and bladder in the lower tract, with bladder being the most common. Current treatment modalities include cisplatin-based systemic chemotherapy and *Bacillus* Calmette-Guerin (BCG), an attenuated live strain of *Mycobacterium bovis*. None of the existing therapies has demonstrated acceptable efficacy and/or adverse event profiles in all patient populations. Indeed, few effective treatment options previously existed for patients with advanced or metastatic urothelial carcinoma following unsuccessful first-line platinum-based chemotherapy.

Over the twelve-month period spanning May 2016 to May 2017, five anti-PD-1/PD-L1 antibodies received regular or accelerated FDA approval for locally advanced or metastatic urothelial carcinoma. The anti-PD-1 antibodies nivolumab (OPDIVO) and pembrolizumab (KEYTRUDA); and the anti-PD-L1 antibodies avelumab (BAVENCIO), atezolizumab (TECENTRIQ), and durvalumab (IMFINZI) were all approved for patients who experienced disease progression during or after platinum-based chemotherapy, or within 12 months of neoadjuvant or adjuvant treatment with platinum-based chemotherapy. Clinical trials are currently evaluating the efficacy and safety profiles of these PD-1/PD-L1 inhibitors in combination with chemotherapy, radiation and other immune checkpoint inhibitors (e.g., anti-CTLA-4 antibodies).

Pembrolizumab.

Further to the disclosure elsewhere herein, KEYTRUDA (pembrolizumab) is PD-1-blocking antibody that is administered as an intravenous infusion over 30 minutes. Pembrolizumab was formerly known as lambrolizumab and MK-3475.

Pembrolizumab is indicated for the treatment of patients having a) unresectable or metastatic melanoma (200 mg every 3 weeks); b) metastatic non-small cell lung cancer (NSCLC) whose tumors have high PD-L1 expression (200 mg every 3 weeks); c) head and neck squamous cell cancer (HNSCC) (200 mg every 3 weeks); d) classical Hodgkin lymphoma (cHL) (200 mg every 3 weeks for adults; 2 mg/kg (up to 200 mg) every 3 weeks for pediatrics; e) urothelial carcinoma, including locally advanced or metastatic urothelial (200 mg every 3 weeks); e) microsatellite instability-high cancer (MSI-H) (200 mg every 3 weeks for adults and 2 mg/kg (up to 200 mg) every 3 weeks for pediatrics); and f) gastric cancer (200 mg every 3 weeks).

Treatment of some of the aforementioned indications is associated with particular requirements. For example, treatment may require that the tumors exhibit particular baseline levels of PD-L1 expression, that pembrolizumab be administered in conjunction with one or more additional treatment modalities (e.g., combination therapy with a platinum containing chemotherapeutic or radiation therapy), and/or that previous therapeutic regimens have been unsuccessful. Regarding PD-L1 expression, the complementary diagnostic VENTANA PD-L1 (SP142) Assay (Roche) has received FDA approval for determining PD-L1 expression levels in tumors.

Nivolumab.

Further to the disclosure elsewhere herein, OPDIVO (nivolumab) injection is a PD-1 blocking antibody that is administered as an intravenous infusion, generally over 60 minutes. Nivolumab was formerly known as BMS-936558, MDX-1106, and ONO-4538.

Nivolumab is indicated for the treatment of patients having a) unresectable or metastatic melanoma (240 mg every 2 weeks); b) metastatic non-small cell lung cancer (NSCLC) (240 mg every 2 weeks); c) advanced renal cell carcinoma (240 mg every 2 weeks); d) classical Hodgkin lymphoma (cHL) (3 mg/kg every 2 weeks); e) recurrent or metastatic squamous cell carcinoma of the head and neck (3 mg/kg every 2 weeks); f) locally advanced or metastatic urothelial carcinoma (240 mg every 2 weeks); g) microsatellite instability-high (MSI-H) or mismatch repair deficient (dMMR) metastatic colorectal cancer (240 mg every 2 weeks); and h) hepatocellular carcinoma (HCC) (240 mg every 2 weeks). For unresectable or metastatic melanoma, nivolumab has also been approved in combination with ipilimumab (nivolumab 1 mg/kg followed by ipilimumab on the same day, every 3 weeks for 4 doses, then nivolumab 240 mg every 2 weeks).

Atezolizumab.

Further to the disclosure elsewhere herein, TECENTRIQ (atezolizumab) is the first approved anti-PD-L1 therapy. It is administered as an intravenous infusion (1,200 mg) over 60 minutes every 3 weeks.

Atezolizumab is indicated for the treatment of patients having a) metastatic non-small cell lung cancer; or b) locally advanced or metastatic urothelial carcinoma (10 mg/kg every 2 weeks), when the patients are not eligible for cisplatin-containing therapy, or have disease progression i) during or following platinum-containing chemotherapy, or ii) within 12 months of neoadjuvant or adjuvant chemotherapy. Atezolizumab should be withheld in a host of clinical situations.

Avelumab.

Further to the disclosure elsewhere herein, BAVENCIO (avelumab) injection is a PD-L1 blocking antibody that is administered as an intravenous infusion over 60 minutes. Avelumab was formerly known as MSB0010718C and MSB0010682.

Avelumab is indicated for the treatment of patients having a) metastatic Merkel cell carcinoma (MCC) (10 mg/kg every 2 weeks); or b) locally advanced or metastatic urothelial carcinoma (10 mg/kg every 2 weeks), when the patients have disease progression i) during or following platinum-containing chemotherapy, or ii) within 12 months of neoadjuvant or adjuvant treatment with platinum-containing chemotherapy. Prior to the first 4 infusions, patients should be premedicated with an antihistamine and acetaminophen.

Durvalumab.

Further to the disclosure elsewhere herein, IMFINZI (durvalumab) injection is a PD-L1 blocking antibody that is administered as an intravenous infusion over 60 minutes. Durvalumab was formerly known as MEDI-4736.

Durvalumab is indicated for the treatment of patients having locally advanced or metastatic urothelial carcinoma (10 mg/kg every 2 weeks), when the patients have disease progression i) during or following platinum-containing chemotherapy, or ii) within 12 months of neoadjuvant or adjuvant treatment with platinum-containing chemotherapy. Although no dose reductions are recommended, there are numerous bases for withholding and/or discontinuing therapy; such bases include pneumonitis, colitis or diarrhea, nephritis, and infection.

Ipilimumab.

Further to the disclosure elsewhere herein, YERVOY (ipilimumab) is a CTLA-4 blocking antibody that is administered as an intravenous infusion over 90 minutes.

Ipilimumab is indicated for the treatment of patients having a) unresectable or metastatic melanoma (3 mg/kg every 3 weeks for a total of 4 doses); or b) adjuvant melanoma (10 mg/kg every 3 weeks for 4 doses, followed by 10 mg/kg every 12 weeks for up to 3 years or until documented disease recurrence or unacceptable toxicity).

Treatment of some of the aforementioned indications is associated with particular requirements. For example, treatment may require that the cancer not have a mutation in BRAF (serine/threonine-protein kinase B-Raf), that pembrolizumab be administered in conjunction with one or more additional treatment modalities, and/or that previous therapeutic regimens have been unsuccessful.

Metabolic and Cardiovascular Diseases.

The present invention provides methods for treating and/or preventing certain cardiovascular- and/or metabolic-related diseases, disorders and conditions, as well as disorders associated therewith, with an CD73 inhibitor and at least one additional therapeutic or diagnostic agent.

Examples of therapeutic agents useful in combination therapy for the treatment of hypercholesterolemia (and atherosclerosis as well) include statins (e.g., CRESTOR, LESCOL, LIPITOR, MEVACOR, PRAVACOL, and ZOCOR), which inhibit the enzymatic synthesis of cholesterol; bile acid resins (e.g., COLESTID, LO-CHOLEST, PREVALITE, QUESTRAN, and WELCHOL), which sequester cholesterol and prevent its absorption; ezetimibe (ZETIA), which blocks cholesterol absorption; fibric acid (e.g., TRICOR), which reduces triglycerides and may modestly increase HDL; niacin (e.g., NIACOR), which modestly lowers LDL cholesterol and triglycerides; and/or a combination of the aforementioned (e.g., VYTORIN (ezetimibe with simvastatin). Alternative cholesterol treatments that may be candidates for use in combination with the CD73 inhibitors described herein include various supplements and herbs (e.g., garlic, policosanol, and guggul).

The present invention encompasses pharmaceutically acceptable salts, acids or derivatives of any of the above.

Immune-Related Disorders and Disorders Having an Inflammatory Component.

The present invention provides methods for treating and/or preventing immune-related diseases, disorders and conditions; and diseases, disorders and conditions having an inflammatory component; with an CD73 inhibitor and at least one additional therapeutic or diagnostic agent.

Examples of therapeutic agents useful in combination therapy are specific to the underlying disease, disorder or condition, and are known to the skilled artisan.

Microbial Diseases.

The present invention provides methods for treating and/or preventing viral, bacterial, fungal and parasitic diseases, disorders and conditions, as well as disorders associated therewith, with an CD73 inhibitor and at least one additional therapeutic or diagnostic agent (e.g., one or more other antiviral agents and/or one or more agents not associated with viral therapy).

Such combination therapy includes anti-viral agents targeting various viral life-cycle stages and having different mechanisms of action, including, but not limiting to, the following: inhibitors of viral uncoating (e.g., amantadine and rimantidine); reverse transcriptase inhibitors (e.g., acyclovir, zidovudine, and lamivudine); agents that target integrase; agents that block attachment of transcription factors to viral DNA; agents (e.g., antisense molecules) that impact translation (e.g., fomivirsen); agents that modulate translation/ribozyme function; protease inhibitors; viral assembly modulators (e.g., rifampicin); antiretrovirals such as, for example, nucleoside analogue reverse transcriptase inhibitors (e.g., azidothymidine (AZT), ddI, ddC, 3TC, d4T); non-nucleoside reverse transcriptase inhibitors (e.g., efavirenz, nevirapine); nucleotide analogue reverse transcriptase inhibitors; and agents that prevent release of viral particles (e.g., zanamivir and oseltamivir). Treatment and/or prevention of certain viral infections (e.g., HIV) frequently entail a group ("cocktail") of antiviral agents.

Other antiviral agents contemplated for use in combination with an CD73 inhibitor include, but are not limited to, the following: abacavir, adefovir, amantadine, amprenavir, ampligen, arbidol, atazanavir, atripla, boceprevirertet, cidofovir, combivir, darunavir, delavirdine, didanosine, docosanol, edoxudine, emtricitabine, enfuvirtide, entecavir, famciclovir, fosamprenavir, foscarnet, fosfonet, http://en.wikipedia.org/wiki/Fusion_inhibitor ganciclovir, ibacitabine, imunovir, idoxuridine, imiquimod, indinavir, inosine, various interferons (e.g., peginterferon alfa-2a), lopinavir, loviride, maraviroc, moroxydine, methisazone, nelfinavir, nexavir, penciclovir, peramivir, pleconaril, podophyllotoxin, raltegravir, ribavirin, ritonavir, pyramidine, saquinavir, stavudine, telaprevir, tenofovir, tipranavir, trifluridine, trizivir, tromantadine, truvada, valaciclovir, valganciclovir, vicriviroc, vidarabine, viramidine, and zalcitabine.

The present invention contemplates the use of the inhibitors of CD73 function described herein in combination with antiparasitic agents. Such agents include, but are not limited to, thiabendazole, pyrantel pamoate, mebendazole, praziquantel, niclosamide, bithionol, oxamniquine, metrifonate, ivermectin, albendazole, eflornithine, melarsoprol, pentamidine, benznidazole, nifurtimox, and nitroimidazole. The skilled artisan is aware of other agents that may find utility for the treatment of parasitic disorders.

Embodiments of the present invention contemplate the use of the CD73 inhibitors described herein in combination with agents useful in the treatment or prevention of bacterial disorders. Antibacterial agents can be classified in various manners, including based on mechanism of action, based on chemical structure, and based on spectrum of activity. Examples of antibacterial agents include those that target the bacterial cell wall (e.g., cephalosporins and penicillins) or the cell membrane (e.g., polymyxins), or interfere with essential bacterial enzymes (e.g., sulfonamides, rifamycins, and quinolines). Most antibacterial agents that target protein synthesis (e.g., tetracyclines and macrolides) are bacteriostatic, whereas agents such as the aminoglycoside are bactericidal. Another means of categorizing antibacterial agents is based on their target specificity; "narrow-spectrum" agents target specific types of bacteria (e.g., Gram-positive bacteria such as *Streptococcus*), while "broad-spectrum" agents have activity against a broader range of bacteria. The skilled artisan is aware of types of anti-bacterial agents that are appropriate for use in specific bacterial infections.

Embodiments of the present invention contemplate the use of the CD73 inhibitors described herein in combination with agents useful in the treatment or prevention of fungal disorders. Antifungal agents include polyenes (e.g., amphotericin, nystatin, and pimaricin); azoles (e.g., fluconazole, itraconazole, and ketoconazole); allylamines (e.g., naftifine, and terbinafine) and morpholines (e.g., amorolfine); and antimetabolies (e.g., 5-fluorocytosine).

The present invention encompasses pharmaceutically acceptable salts, acids or derivatives of the agents (and members of the classes of agents) set forth above.

Dosing

The CD73 inhibitors of the present invention may be administered to a subject in an amount that is dependent upon, for example, the goal of administration (e.g., the degree of resolution desired); the age, weight, sex, and health and physical condition of the subject to which the formulation is being administered; the route of administration; and the nature of the disease, disorder, condition or symptom thereof. The dosing regimen may also take into consideration the existence, nature, and extent of any adverse effects associated with the agent(s) being administered. Effective dosage amounts and dosage regimens can readily be determined from, for example, safety and dose-escalation trials, in vivo studies (e.g., animal models), and other methods known to the skilled artisan.

In general, dosing parameters dictate that the dosage amount be less than an amount that could be irreversibly toxic to the subject (the maximum tolerated dose (MTD)) and not less than an amount required to produce a measurable effect on the subject. Such amounts are determined by, for example, the pharmacokinetic and pharmacodynamic parameters associated with ADME, taking into consideration the route of administration and other factors.

An effective dose (ED) is the dose or amount of an agent that produces a therapeutic response or desired effect in some fraction of the subjects taking it. The "median effective dose" or ED50 of an agent is the dose or amount of an agent that produces a therapeutic response or desired effect in 50% of the population to which it is administered. Although the ED50 is commonly used as a measure of reasonable expectance of an agent's effect, it is not necessarily the dose that a clinician might deem appropriate taking into consideration all relevant factors. Thus, in some situations the effective amount is more than the calculated ED50, in other situations the effective amount is less than the calculated ED50, and in still other situations the effective amount is the same as the calculated ED50.

In addition, an effective dose of the CD73 inhibitors of the present invention may be an amount that, when administered in one or more doses to a subject, produces a desired result relative to a healthy subject. For example, for a subject experiencing a particular disorder, an effective dose may be one that improves a diagnostic parameter, measure, marker and the like of that disorder by at least about 5%, at least about 10%, at least about 20%, at least about 25%, at least about 30%, at least about 40%, at least about 50%, at least about 60%, at least about 70%, at least about 80%, at least about 90%, or more than 90%, where 100% is defined as the diagnostic parameter, measure, marker and the like exhibited by a normal subject.

In certain embodiments, the CD73 inhibitors contemplated for use according to the present invention may be administered at dosage levels of about 0.01 mg/kg to about 50 mg/kg, or about 1 mg/kg to about 25 mg/kg, of subject body weight per day, one or more times a day, to obtain the desired therapeutic effect.

In some embodiments, administration of the CD73 inhibitors described herein is parenteral—typically via intravenous injection, intramuscular injection or subcutaneous injection. For these methods an infusion period of 1 min to 6 hours is generally used, though more typically an infusion period of 10 min to 1 hour is used. In some embodiments, an infusion period of approximately 30 minutes is used.

In certain embodiments, the dosage of the desired CD73 inhibitor is contained in a "unit dosage form". The phrase "unit dosage form" refers to physically discrete units, each unit containing a predetermined amount of the CD73 inhibitor, either alone or in combination with one or more additional agents, sufficient to produce the desired effect. It will be appreciated that the parameters of a unit dosage form will depend on the particular agent and the effect to be achieved.

Kits

The present invention also contemplates kits comprising an CD73 inhibitor, and pharmaceutical compositions thereof. The kits are generally in the form of a physical structure housing various components, as described below, and may be utilized, for example, in practicing the methods described above.

A kit can include one or more of the CD73 inhibitors disclosed herein (provided in, e.g., a sterile container), which may be in the form of a pharmaceutical composition suitable for administration to a subject. The CD73 inhibitors can be provided in a form that is ready for use or in a form requiring, for example, reconstitution or dilution (e.g., a powder) prior to administration. When the CD73 inhibitors are in a form that needs to be reconstituted or diluted by a user, the kit may also include diluents (e.g., sterile water), buffers, pharmaceutically acceptable excipients, and the like, packaged with or separately from the CD73 inhibitors. When combination therapy is contemplated, the kit may contain the several agents separately or they may already be combined in the kit. Each component of the kit may be enclosed within an individual container, and all of the various containers may be within a single package. A kit of the present invention may be designed for conditions necessary to properly maintain the components housed therein (e.g., refrigeration or freezing).

A kit may contain a label or packaging insert including identifying information for the components therein and instructions for their use (e.g., dosing parameters, clinical pharmacology of the active ingredient(s), including mechanism of action, pharmacokinetics and pharmacodynamics, adverse effects, contraindications, etc.). Labels or inserts can include manufacturer information such as lot numbers and expiration dates. The label or packaging insert may be, e.g., integrated into the physical structure housing the components, contained separately within the physical structure, or affixed to a component of the kit (e.g., an ampule, tube or vial).

Labels or inserts can additionally include, or be incorporated into, a computer readable medium, such as a disk (e.g., hard disk, card, memory disk), optical disk such as CD- or DVD-ROM/RAM, DVD, MP3, magnetic tape, or an electrical storage media such as RAM and ROM or hybrids of these such as magnetic/optical storage media, FLASH media or memory-type cards. In some embodiments, the actual instructions are not present in the kit, but means for obtaining the instructions from a remote source, e.g., via the internet, are provided.

EXPERIMENTAL

The following examples are put forth so as to provide those of ordinary skill in the art with a complete disclosure and description of how to make and use compounds set forth herein, and are not intended to limit the scope of what the inventors regard as their invention, nor are they intended to represent that the experiments below were performed or that they are all of the experiments that may be performed. It is to be understood that exemplary descriptions written in the present tense were not necessarily performed, but rather that the descriptions can be performed to generate data and the like of a nature described therein. Efforts have been made to ensure accuracy with respect to numbers used (e.g., amounts, temperature, etc.), but some experimental errors and deviations should be accounted for.

Unless indicated otherwise, parts are parts by weight, molecular weight is weight average molecular weight, temperature is in degrees Celsius (° C.), and pressure is at or near atmospheric. Standard abbreviations are used, including the following: wt=wildtype; bp=base pair(s); kb=kilobase(s); nt=nucleotides(s); aa=amino acid(s); s or sec=second(s); min=minute(s); h or hr=hour(s); ng=nanogram; μg=microgram; mg=milligram; g=gram; kg=kilogram; dl or dL=deciliter; l or sL=microliter; ml or mL=milliliter; l or L=liter; sM=micromolar; mM=millimolar; M=molar; kDa=kilodalton; i.m.=intramuscular(ly); i.p.=intraperitoneal(ly); SC or SQ=subcutaneous(ly); QD=daily; BID=twice daily; QW=weekly; QM=monthly; HPLC=high performance liquid chromatography; BW=body weight; U=unit; ns=not statistically significant; PBS=phosphate-buffered saline; IHC=immunohistochemistry; DMEM=Dulbeco's Modification of Eagle's Medium; EDTA=ethylenediaminetetraacetic acid.

The following general materials and methods were used, where indicated, or may be used in the Examples below:

Standard methods in molecular biology are described in the scientific literature (see, e.g., Sambrook and Russell (2001) Molecular Cloning, 3$^{rd}$ ed., Cold Spring Harbor Laboratory Press, Cold Spring Harbor, N.Y.; and Ausubel, et al. (2001) Current Protocols in Molecular Biology, Vols. 1-4, John Wiley and Sons, Inc. New York, N.Y., which describes cloning in bacterial cells and DNA mutagenesis (Vol. 1), cloning in mammalian cells and yeast (Vol. 2), glycoconjugates and protein expression (Vol. 3), and bioinformatics (Vol. 4)).

The scientific literature describes methods for protein purification, including immunoprecipitation, chromatography, electrophoresis, centrifugation, and crystallization, as well as chemical analysis, chemical modification, post-translational modification, production of fusion proteins, and glycosylation of proteins (see, e.g., Coligan, et al. (2000) Current Protocols in Protein Science, Vols. 1-2, John Wiley and Sons, Inc., NY).

Software packages and databases for determining, e.g., antigenic fragments, leader sequences, protein folding, functional domains, glycosylation sites, and sequence alignments, are available (see, e.g., GCG Wisconsin Package (Accelrys, Inc., San Diego, CA); and DeCypher™ (TimeLogic Corp., Crystal Bay, NV).

The literature is replete with assays and other experimental techniques that can serve as a basis for evaluation of the compounds described herein.

Example A

Inhibition of Ecto-5'-nucleotidase (CD73) Activity

Compounds were evaluated to determine their ecto-5'-nucleotidase (CD73) inhibitory activity. Briefly, CHO-K1 cells stably transfected with human CD73 were generated by LakePharma (Belmont, CA) using molecular cloning of human CD73 (http://www.uniprot.org/uniprot/P21589) and mammalian transient expression vector (P21589.1). After antibiotic selection in CD OptiCHO cell media (Invitrogen, Catalog #12681-011) containing 5 µg/mL Puromycin and 200 µg/mL Hygromycin B, a suspension pool of CHO-CD73 cells was collected and frozen in 7.5% DMSO in cell media without antibiotics.

On the day of the experiment, one vial of CHO-CD73 cells was thawed and suspended in assay media which consisted of 20 mM HEPES, pH 7.4, 137 mM NaCl, 5.4 mM KCl, 1.3 mM CaCl$_2$), 4.2 mM NaHCO$_3$ and 0.1% glucose. To test the ability of compounds to inhibit CD73 enzymatic activity, 2 µL of 500 µM of compounds dissolved in DMSO (50×) were added to a 96-well polystyrene plate containing 58 µL of assay buffer. Next, 20 µL of CHO-CD73 cells in assay buffer were added to assay plate followed by 20 µL of 125 µM AMP (Adenosine 5'-monophosphate monohydrate) in assay buffer. Final assay conditions consisted of 2500 cells per well in 2% DMSO and 25 µM of AMP substrate. After 50 minutes of incubation (37° C. and 5% CO$_2$) and centrifugation at 225×g for 5 mins, 80 µL of supernatant were transferred to a 96-well Spectra Plate (PerkinElmer, cat #6005640) which was pre-dispensed with 20 µL of PiColorLock Gold colorimetric assay reagents (Thermo, cat #30 300 30). The amount of inorganic phosphate was determined by reading the absorbance at 620 nm on an EnVision Multilabel Plate Reader (PerkinElmer). Enzymatic activity of CD73 was based on the amount of phosphate generated. Percentage of activity was calculated based on DMSO and no cells control wells. IC$_{50}$ values of compounds were determined by four parameter non-linear regression fitting of percentage of activity in GraphPad Prism software. Data for particular compounds is set forth in Table 3.

Example B

Pharmacodynamic Evaluation

A pharmacodynamic assay can be based on measuring CD73-mediated serum levels of adenosine. Adenosine levels can be determined by HPLC analysis, and serum compound levels can optionally also be determined in the same HPLC run.

Example C

Determination of Pharmacokinetics in Preclinical Species

Compound 1 and Compound 2 were administered intravenously to female CD-1 mice (Charles River Laboratories, Hollister, CA), male Sprague-Dawley rats (Charles River), male beagle dogs (Beijing Marshall Biotechnology, Co., Ltd; Beijing, China) or male cynomolgus monkeys (Hainan Jingang Biotechnology, Co., Ltd; Haikou, China). At the designated time points, blood was collected into tubes containing potassium EDTA and stored on ice until processed by centrifugation. The resultant plasma was stored in a freezer maintained at approximately −80° C.

Sample Analysis.

Plasma samples were prepared by protein precipitation. An aliquot of 30 to 50 µL sample was mixed with acetonitrile containing an internal standard. The mixture was vortexed and then centrifuged. The resultant supernatant was directly analyzed by a sensitive and specific analytical procedure. Analytes were separated by liquid chromatography (LC), and detected by tandem mass spectrometry (MS/MS). The lower limit of quantitation (LLOQ) was 1.0 to 5.0 ng/mL.

Results.

Pharmacokinetics results from mice, rats, and dogs following single-dose administration of Compound 1 and Compound 2 are summarized with mean non-compartmental pharmacokinetic values in Table 1.

As set forth in Table 1, following a single IV dose, Compound 1 and Compound 2 exhibited low clearance (CL) in all preclinical species. Compound 1 and Compound 2 volume of distribution at steady (Vu) was low in mice, rats and monkeys, but moderate-to-high in dogs. The terminal half-lives (Ti2) of Compound 1 and Compound 2 ranged from 3.5 to 41 hours, and 6.5 to 34 hours, respectively.

TABLE 1

Mean Noncompartmental PK Parameters in Nonclinical Species After Single Dose Systemic (IV Bolus) Administration

|  | Species | CL (L/hr/kg) | $V_{ss}$ (L/kg) | $T_{1/2}$ (hr) |
|---|---|---|---|---|
| Compound 1 | Mouse | 0.025 | 0.12 | 3.5 |
|  | Rat | 0.020 | 0.12 | 5.3 |
|  | Dog | 0.050 | 1.3 | 21 |
|  | Monkey | 0.0025 | 0.097 | 41 |
| Compound 2 | Mouse | 0.015 | 0.11 | 6.5 |
|  | Rat | 0.0093 | 0.12 | 9.6 |
|  | Dog | 0.034 | 0.63 | 15 |
|  | Monkey | 0.0017 | 0.078 | 34 |

Example D

Prediction of Human Pharmacokinetic Profiles

Methods.

Prediction of human clearance was obtained by an allometric model incorporating unbound fraction in plasma ($f_u$). Human $V_{ss}$ was calculated from volume of distribution in nonclinical species using the Øie-Tozer equation. Human terminal half-life (t½) was estimated from predicted human CL and $V_{ss}$ using the following relationship:

$$t_{1/2} = \frac{V_{ss}}{CL} \cdot 0.693$$

Human concentration-time profiles after intravenous administration were simulated using a 1-compartment open model with first-order elimination from the central compartment. Results.

Predicted human pharmacokinetic parameters of Compound 1 and Compound 2 are summarized in Table 2. Simulated plasma concentration-time profiles of Compound 1 and Compound 2 are set forth in FIG. 1.

Both Compound 1 and Compound 2 are predicted to exhibit low CL, low $V_{ss}$ and long T/2 in humans. Intravenous administration of 12 and 2.8 mg of Compound 1 and Compound 2, respectively, via constant infusion for 1 hour is projected to achieve a trough concentration (Cnin) of 100 ng/mL when administered every two weeks.

TABLE 2

Predicted Human PK Parameters

| Parameters | Compound 1 | Compound 2 |
|---|---|---|
| CL (L/hr/kg) | 0.0012 | 0.00054 |
| Vss (L/kg) | 0.17 | 0.13 |
| $T_{1/2}$ (hr) | 98 | 167 |

Compound Examples

Example 1

Synthesis of [({[(2R,3S,4R,5R)-5-[6-(cyclopentylamino)-2-chloro-9H-purin-9-yl]-3,4-dihydroxyoxolan-2-yl]methoxy}hydroxy)phosphoryl)methyl]phosphonic Acid

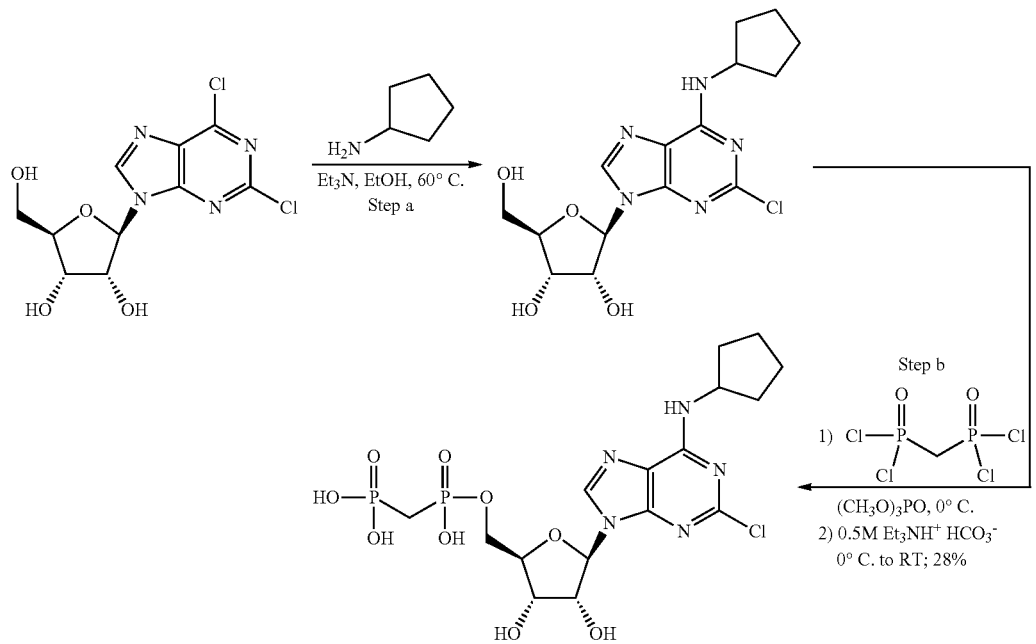 [SMILES: OC[C@H]1O[C@@H](n2cnc3c(Cl)nc(Cl)nc32)[C@H](O)[C@@H]1O ; NC1CCCC1 ; OC[C@H]1O[C@@H](n2cnc3c(NC4CCCC4)nc(Cl)nc32)[C@H](O)[C@@H]1O ; O=P(O)(O)CP(=O)(O)OC[C@H]1O[C@@H](n2cnc3c(NC4CCCC4)nc(Cl)nc32)[C@H](O)[C@@H]1O ; O=P(Cl)(Cl)CP(=O)(Cl)Cl]

Step a:

A mixture of 2,6-dichloropurine riboside (321 mg, 1 mmol), cyclopentylamine (103 µL, 1.05 mmol, 1.05 equiv.), and triethylamine (146 µL, 1.05 mmol, 1.05 equiv.) in anhydrous EtOH (3 mL) was stirred at 60° C. for overnight. Reaction mixture was evaporated and the crude product was used in the next step without purification. ESI MS [M+H]+ for $C_{15}H_{21}ClN_5O_4$, calcd 370.8, found 370.2.

Step b:

The product from Step a (370 mg, 1 mmol) was dissolved in trimethyl phosphate (5 mL) and cooled to 0° C. (ice bath), then a cold solution of methylenebis(phosphonic dichloride) (1.25 g, 5 mmol, 5 equiv.) in trimethyl phosphate (2 mL) was added dropwise. The reaction mixture was stirred at 0° C. for 3 h, and was then carefully quenched with 0.5 M triethylammonium bicarbonate solution (7 mL) and stirred at 0° C. for 15 min, and then 2 h at room temperature. The reaction mixture was purified by reverse phase HPLC (C18 column, 0 to 30% gradient of acetonitrile and water with 0.1% TFA) to give the product as a white solid in 28% yield (181 mg): $^1$H NMR (400 MHz, DMSO) δ 8.45-8.32 (m, 2H), 5.85 (d, J=5.5 Hz, 1H), 4.55-4.36 (m, 2H), 4.23-4.07 (m, 4H), 2.26 (t, J=20.5 Hz, 2H), 2.04-1.85 (m, 2H), 1.77-1.46 (m, 6H). ESI MS [M+H]+ for $C_6H_{25}ClN_5O_9P_2$, calcd 528.8, found 528.1.

Example 2

Synthesis of [({[(2R,3S,4R,5R)-5-[6-chloro-4-(cyclopentylamino)-1H-pyrazolo[3,4-d]pyrimidin-1-yl]-3,4-dihydroxyoxolan-2-yl]methoxy}(hydroxy)phosphoryl)methyl]phosphonic Acid

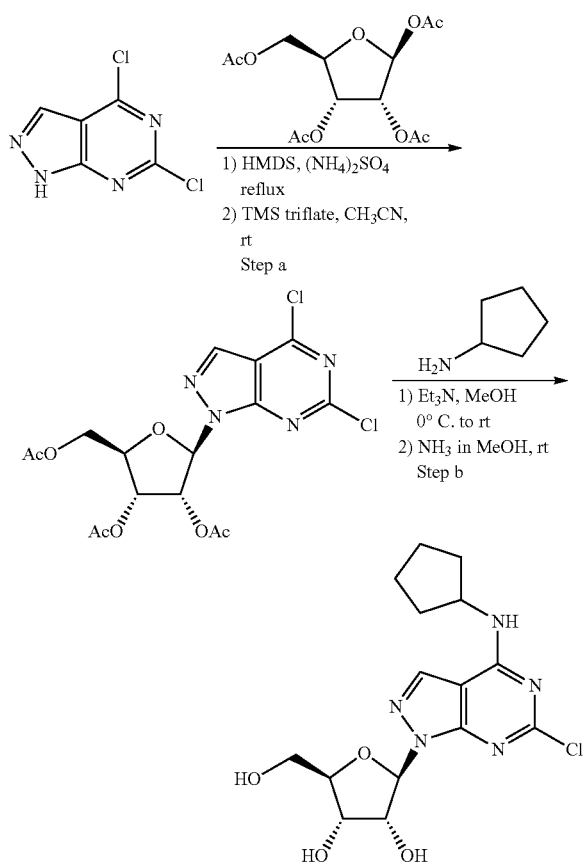

-continued

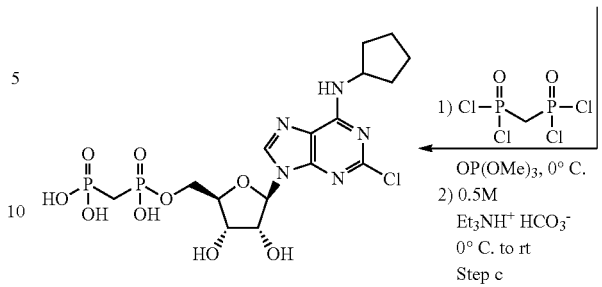

Step a:

4,6-Dichloro-1H-pyrazolo[3,4-d]pyrimidine (25 g, 132 mmol) and Ammonium Sulfate (0.20 g, 1.5 mmol) were dissolved in 150 mL of hexamethyldisilziane. The mixture was then warmed to reflux and stirred for 3 hrs. The mixture was then concentrated to dryness. The solid residue was then taken up in 300 mL of acetonitrile, and the protected ribose (50.6 g, 159 mmol) was added. This mixture was cooled 0° C. and TMSOTf (27 mL, 145 mmol) was added dropwise. The mixture was then warmed to room temperature and allowed to stir overnight. The mixture was then concentrated and taken up in ethyl acetate. The organics were washed with saturated $NaHCO_3$ and brine. The organics were dried with $MgSO_4$, filtered and concentrated. The crude residue was purified using column chromatography (Hexanes/Ethyl Acetate) to provide the desired compound (48 g, 108 mmol) in 82% overall yield. $^1$H NMR (400 MHz, DMSO-d$_6$) δ 8.75 (s, 1H), 6.47 (d, J=3.2 Hz, 1H), 5.82 (dd, J=5.3, 3.2 Hz, 1H), 5.63 (t, J=5.8 Hz, 1H), 4.47-4.40 (m, 1H), 4.37-4.30 (m, 1H), 4.12-4.02 (m, 1H), 2.09 (s, 3H), 2.06 (s, 3H), 1.97 (s, 3H). ESI MS [M+Na]+ for $C_{16}H_{16}Cl_2N_4NaO_7$, calcd 469.0, found 469.0.

Step b:

Product from Step a (22 g, 49.3 mmol) was dissolved in MeOH (100 mL) and cooled to 0° C. Cyclopentylamine (5.1 g, 51.8 mmol, 1.05 equiv.), and triethylamine (7.2 mL, 51.8 mmol, 1.05 equiv.) were added and reaction mixture was stirred at 0° C. for 15 min then at rt for 4 h. 7M $NH_3$ in MeOH (60 mL) was added and reaction was stirred at rt for 1 day. Reaction mixture was evaporated and the crude product was used in the next step without purification. ESI MS [M+H]+ for $C_5H_{21}ClN_5O_4$, calcd 370.1, found 370.2.

Step c:

The phosphonylation step was carried out in similar fashion to Example 1. $^1$H NMR (400 MHz, DMSO-d$_6$) δ 8.68 (d, J=7.2 Hz, 1H), 8.24 (s, 1H), 6.00 (d, J=4.2 Hz, 1H), 4.49 (t, J=4.7 Hz, 1H), 4.41 (q, J=6.7 Hz, 1H), 4.26 (t, J=4.7 Hz, 1H), 4.15-4.00 (m, 2H), 3.94-3.84 (m, 1H), 2.16 (t, J=20.5 Hz, 2H), 2.04-1.91 (m, 2H), 1.79-1.45 (m, 6H). ESI MS [M+H]+ for $C_6H_{25}ClN_5O_9P_2$, calcd 528.1, found 528.2.

Example 3

Synthesis of [({[(2R,3S,4R,5R)-5-[6-chloro-4-(cyclopentylamino)-1H-pyrazolo[3,4-b]pyridin-1-yl]-3,4-dihydroxyoxolan-2-yl]methoxy}(hydroxy)phosphoryl)methyl]-phosphonic Acid

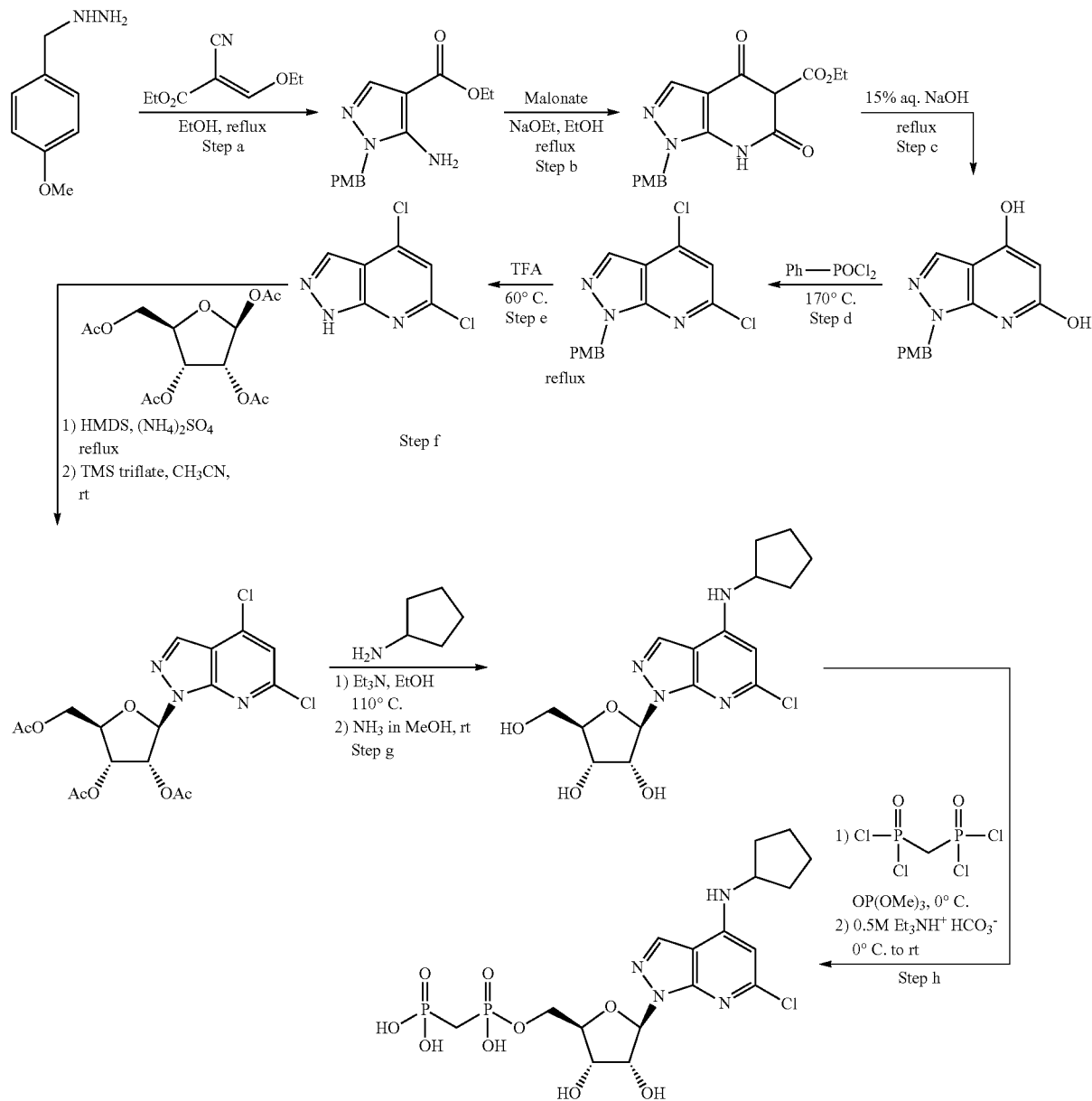

Step a:
Ethyl (ethoxymethylene)cyanoacetate (50.5 g, 299.0 mmol) was dissolved in anhydrous EtOH (350 mL) then product hydrazine (50 g, 328.9 mmol, 1.1 equiv.) was added. Reaction mixture was stirred under reflux for overnight, then evaporated. Solid residue was washed with MTBE to give white solid (55.5 g, 63%). ESI MS [M+H]$^+$ for $C_{14}H_5N_3O_3$, calcd 276.1, found 276.2.

Step b:
Diethyl malonate (90 mL, 0.59 mole, 4 equiv.) was dissolved in anhydrous EtOH (300 mL) and cooled to 0° C. (ice bath). 21% solution of NaOEt in EtOH (220 mL, 0.59 mole, 4 equiv.) was added dropwise (within 10 min.) then the cooling bath was removed and reaction was stirred at room temperature for 15 min. Solid product from Step a (40.4 g, 147 mmol) was added in portions (within 2 min.) and the reaction mixture was stirred under reflux for 5 days, then evaporated. The residue was diluted with H$_2$O (1.2 L) and neutralized to pH-5 using AcOH. The product was filtered off, washed with H$_2$O (200 mL) and dried under vacuum (48.4 g, 96%). ESI MS [M+H]$^+$ for $C_{17}H_{18}N_3O_5$, calcd 344.1, found 344.2.

Step c:
Product from Step b (48.4 g 141.1 mmol) was dissolved in 15% aqueous NaOH (500 mL) and stirred under reflux for 5 h. Cooled to 0° C. and carefully neutralized with AcOH until pH-5. White solid was filtered off, washed with H$_2$O (100 mL) and dried under vacuum (38 g, quant.). ESI MS [M+H]$^+$ for $C_{14}H_{14}N_3O_3$, calcd 272.1, found 272.2.

Step d:

The mixture of product from Step c (38 g, 140.2 mmol) and phenylphosphonic dichloride (79.5 mL, 560.8 mmol, 4 equiv.) was stirred at 170° C. for 7 h then cooled to 80° C. and poured into vigorously stirred ice. Brown, sticky material precipitated that upon extensive stirring turned into solid. Iced cold mixture was neutralized with concentrated aqueous $NH_3$ until pH-7 and the product was extracted using $CH_2Cl_2$ (2×400 mL). Combined organics were dried over $MgSO_4$, filtered and evaporated to give product that was used without further purification (24 g 55%). ESI MS $[M+H]^+$ for $C_{14}H_{12}Cl_2N_3O$, calcd 308.0, found 308.1.

Step e:

Product from Step d (22 g, 71.4 mmol) was dissolved in TFA (75 mL) and stirred at 60° C. for 12 h, then cooled down and poured into $H_2O$ (600 mL). Gray solid was filtered off, washed with saturated $NaHCO_3$, then with $H_2O$ and dried under vacuum. ESI MS $[M+H]^+$ for $C_6H_4Cl_2N_3$, calcd 188.0, found 188.1.

Step f:

Step f product was synthesized in similar fashion to Example 2. $^1$H NMR (400 MHz, DMSO-$d_6$) δ 8.55 (s, 1H), 7.72 (s, 1H), 6.48 (d, J=3.0 Hz, 1H), 5.90-5.83 (m, 1H), 5.67-5.61 (m, 1H), 4.46-4.38 (m, 1H), 4.33 (ddd, J=12.1, 3.5, 1.2 Hz, 1H), 4.05 (ddd, J=12.2, 5.1, 1.2 Hz, 1H), 2.09 (s, 3H), 2.06 (s, 3H), 1.96 (s, 3H). ESI MS $[M+H]^+$ for $C_{17}H_{18}Cl_2N_3O_7$, calcd 446.0, found 446.1.

Step g:

Step g product was synthesized in similar fashion to Example 2. ESI MS $[M+H]^+$ for $C_{16}H_{22}ClN_4O_4$, calcd 369.1, found 369.2.

Step h:

The title compound was synthesized in similar fashion to Example 2. $^1$H NMR (400 MHz, DMSO-$d_6$) δ 8.27 (s, 1H), 7.66 (d, J=6.7 Hz, 1H), 6.22 (s, 1H), 6.08 (d, J=4.2 Hz, 1H), 4.51 (t, J=4.7 Hz, 1H), 4.26 (t, J=5.1 Hz, 1H), 4.17-3.83 (m, 4H), 2.17 (t, J=20.5 Hz, 2H), 2.06-1.92 (m, 2H), 1.77-1.45 (m, 6H). ESI MS $[M+H]^+$ for $C_{17}H_{26}CN_4O_9P_2$, calcd 527.1, found 527.2.

Example 4

Synthesis of [({[(2R,3S,4R,5R)-5-(6-chloro-4-{[(1S)-1-phenylethyl]amino}-1H-pyrazolo[3,4-b]pyridin-1-yl)-3,4-dihydroxyoxolan-2-yl]methoxy}(hydroxy)phosphoryl)methyl]-phosphonic Acid

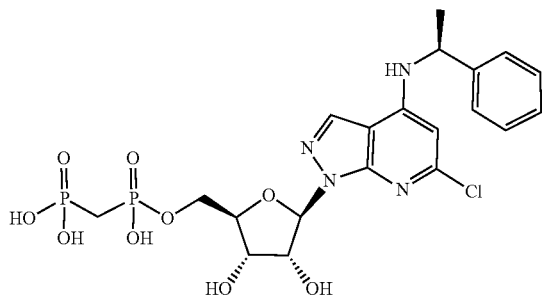 [SMILES: C[C@H](Nc1cc(Cl)nc2c1cnn2[C@@H]1O[C@H](COP(=O)(O)CP(=O)(O)O)[C@@H](O)[C@H]1O)c1ccccc1]

The title compound was synthesized in similar fashion to Example 3. H NMR (400 MHz, DMSO-$d_6$) δ 8.38 (s, 1H), 8.20 (d, J=7.2 Hz, 1H), 7.42-7.36 (m, 2H), 7.35-7.27 (m, 2H), 7.24-7.18 (m, 1H), 6.08-5.97 (m, 2H), 4.85 (s, 1H), 4.50 (t, J=4.5 Hz, 1H), 4.25 (t, J=4.8 Hz, 1H), 4.14-3.97 (m, 2H), 3.93-3.81 (m, 1H), 2.17 (t, J=20.5 Hz, 2H), 1.52 (d, J=6.2 Hz, 3H). ESI MS $[M+H]^+$ for $C_{20}H_{26}ClN_4O_9P_2$, calcd 563.1, found 563.2.

Example 5

Synthesis of [({[(2R,3S,4R,5R)-5-(6-chloro-4-{[(1R)-1-phenylethyl]amino}-1H-pyrazolo[3,4-b]pyridin-1-yl)-3,4-dihydroxyoxolan-2-yl]methoxy}(hydroxy)phosphoryl)methyl]-phosphonic Acid

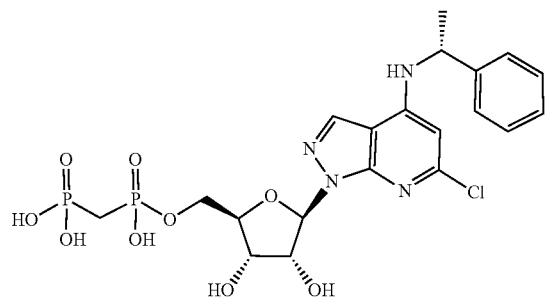 [SMILES: C[C@@H](Nc1cc(Cl)nc2c1cnn2[C@@H]1O[C@H](COP(=O)(O)CP(=O)(O)O)[C@@H](O)[C@H]1O)c1ccccc1]

The title compound was synthesized in similar fashion to Example 3. $^1$H NMR (400 MHz, DMSO-$d_6$) δ 8.38 (s, 1H), 8.20 (d, J=7.2 Hz, 1H), 7.44-7.35 (m, 2H), 7.35-7.28 (m, 2H), 7.25-7.17 (m, 1H), 6.12-5.93 (m, 2H), 4.85 (s, 1H), 4.57-4.48 (m, 1H), 4.25 (t, J=4.9 Hz, 1H), 4.12-3.95 (m, 2H), 3.91-3.79 (m, 1H), 2.17 (t, J=20.5 Hz, 2H), 1.51 (d, J=6.6 Hz, 3H). ESI MS $[M+H]^+$ for $C_2H_{26}ClN_4O_9P_2$, calcd 563.1, found 563.2.

Example 6

Synthesis of [({[(2R,3S,4R,5R)-5-(6-chloro-4-{[(1S)-1-(2-fluorophenyl)ethyl]amino}-1H-pyrazolo[3,4-b]pyridin-1-yl)-3,4-dihydroxyoxolan-2-yl]methoxy}(hydroxy)phosphoryl)-methyl]phosphonic Acid

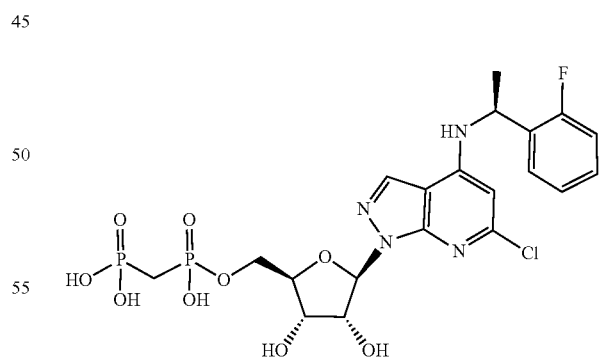

The title compound was synthesized in similar fashion to Example 3. $^1$H NMR (400 MHz, DMSO-$d_6$) δ 8.38 (s, 1H), 8.23 (d, J=6.9 Hz, 1H), 7.42-7.34 (m, 1H), 7.33-7.09 (m, 3H), 6.06 (d, J=4.3 Hz, 1H), 5.97 (s, 1H), 5.04 (s, 1H), 4.53-4.47 (m, 1H), 4.25 (t, J=4.7 Hz, 1H), 4.13-3.97 (m, 2H), 3.92-3.82 (m, 1H), 2.16 (d, J=20.5 Hz, 2H), 1.56 (d, J=6.4 Hz, 3H). ESI MS $[M+H]^+$ for $C_{20}H_{25}ClFN_4O_9P_2$, calcd 581.1, found 581.2.

Example 7

Synthesis of [({[(2R,3S,4R,5R)-5-(6-chloro-4-{[(1S)-1-(4-fluorophenyl)ethyl]amino}-1H-pyrazolo[3,4-b]pyridin-1-yl)-3,4-dihydroxyoxolan-2-yl]methoxy}(hydroxy)phosphoryl)-methyl]phosphonic Acid

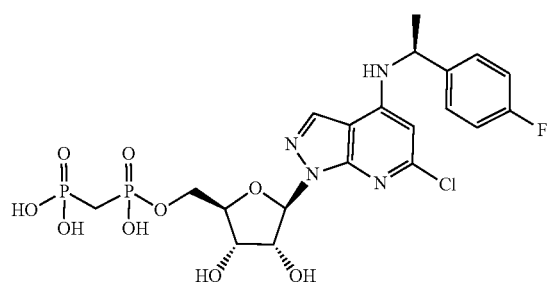 [SMILES: C[C@H](Nc1cc(Cl)nc2c1cnn2[C@@H]1O[C@H](COP(=O)(O)CP(=O)(O)O)[C@@H](O)[C@H]1O)c1ccc(F)cc1]

The title compound was synthesized in similar fashion to Example 3. $^1$H NMR (400 MHz, DMSO-$d_6$) δ 8.36 (s, 1H), 8.18 (d, J=7.2 Hz, 1H), 7.46-7.39 (m, 2H), 7.19-7.10 (m, 2H), 6.13-5.99 (m, 2H), 4.89 (s, 1H), 4.53-4.46 (m, 1H), 4.25 (t, J=4.8 Hz, 1H), 4.12-3.97 (m, 2H), 3.92-3.81 (m, 1H), 2.18 (t, J=20.5 Hz, 2H), 1.50 (d, J=7.3 Hz, 3H). ESI MS [M+H]$^+$ for $C_{20}H_{25}ClFN_4O_9P_2$, calcd 581.1, found 581.2.

Example 8

Synthesis of [({[(2R,3S,4R,5R)-5-[2-chloro-6-(cyclopentylamino)-9H-purin-9-yl]-3,4-dihydroxyoxolan-2-yl]methyl}carbamoyl)methyl]phosphonic Acid

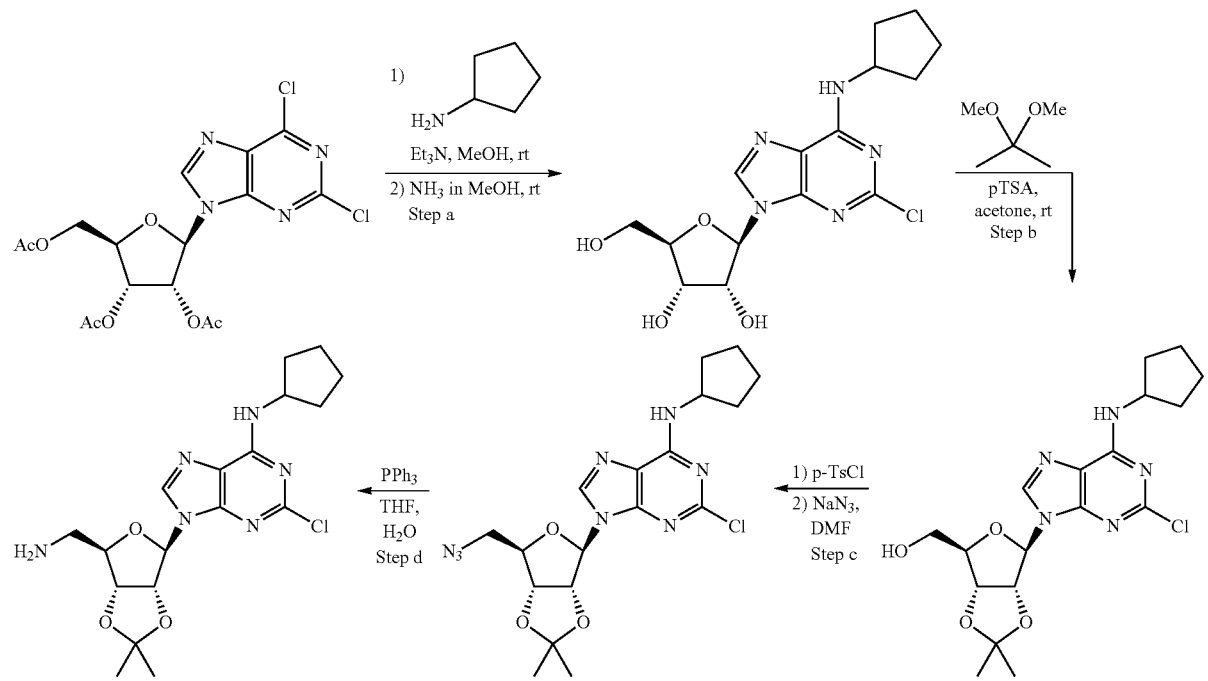

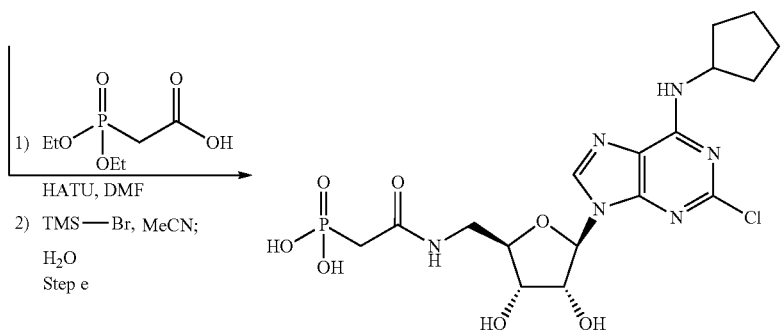

Step a:

A mixture of 2,6-dichloro-9-(2,3,5-tri-1-acetyl-beta-D-ribofuranosyl)purine (13.5 g, 30 mmol), cyclopentylamine (3.2 mL, 33 mmol, 1.1 equiv.), and triethylamine (4.6 mL, 33 mmol, 1.1 equiv.) in MeOH (60 mL) was stirred at rt for overnight. 7M $NH_3$ in MeOH (20 mL) was added and reaction was stirred at rt for 1 day. Reaction mixture was evaporated and the crude product was used in the next step without purification. ESI MS $[M+H]^+$ for $C_{15}H_{21}ClN_5O_4$, calcd 370.1, found 370.2.

Step b:

The product from Step a was dissolved in acetone (100 mL) and 2,2-dimethoxypropane (40 mL) and p-TsOH×$H_2O$ (7.1 g, 37.5 mmol, 1.25 equiv.) was added. The reaction mixture was stirred at rt for overnight, then diluted with brine (100 mL) and carefully quenched with saturated $NaHCO_3$ (200 mL). After extraction with EtOAc (2×200 mL), combined organics were dried over $MgSO_4$, filtered and evaporated to give crude product that was used in the next step without purification (12.2 g, 98%). ESI MS $[M+H]^+$ for $C_1H_{25}ClN_5O_4$, calcd 410.2, found 410.1.

Step c:

1) Para-toluenesulfonyl chloride (1.68 g, 8.8 mmol) in pyridine (5 ml) was added dropwise to a solution of the product from Step b (3.0 g, 7.33 mmol) in pyridine (45 ml) at 0° C. The mixture was stirred at 0° C. for 30 minutes then allowed to warm to room temperature. After stirring overnight, the reaction was concentrated to dryness. The crude material obtained was reconstituted in ethyl acetate and washed with saturated $NaHCO_3$ and brine, dried over $MgSO_4$ and concentrated under reduced pressure. The desired tosylate (3.61 g. 87%) was obtained following column chromatography ($SiO_2$, 10 to 60% gradient of EtOAc and hexane). ESI MS $[M+H]^+$ $C_{25}H_{30}ClN_5O_6S$ for, calcd 564.2, found 564.2.

2) To a solution of the above tosylate (1.0 g, 1.77 mmol) in DMF (8.85 mL) was added sodium azide (345 mg, 5.31 mmol). The resulting suspension was sealed and heated to 80° C. overnight. After cooling to room temperature the reaction mixture was partitioned between ethyl acetate and water. The organic layer washed with water and brine, dried over $MgSO_4$, and concentrated under reduced pressure. The title compound (548 mg) was used without further purification. ESI MS $[M+H]^+$ $C_{18}H_{23}ClN_8O_3$ for, calcd 435.2, found 435.2.

Step d:

To a solution of the product from Step c (548 mg, 1.26 mmol) in THF (6.3 mL) and water (0.42 mL) at room temperature was added triphenylphosphine (992 mg, 3.78 mmol). After stirring overnight the reaction was diluted with ethyl acetate and washed with 1M NaOH, water, and brine. The organics were dried over $MgSO_4$ and concentrated under reduced pressure. The title compound was obtained following column chromatography ($SiO_2$, 0 to 10% gradient of methanol and $CH_2Cl_2$). ESI MS $[M+H]^+$ $C_{18}H_{25}ClN_6O_3$ for, calcd 409.2, found 409.2.

Step e:

1) To a solution of the product from Step d (1.26 mmol), diethylphosphonoacetic and (1.51 mmol), and diisopropylethylamine (1.10 mL, 6.3 mmol) in DMF (6 mL) at room temperature was added HATU (574 mg, 1.51 mmol). The mixture was stirred for 1 hour then diluted with ethyl acetate and washed sequentially with 10% citric acid, sat. $NaHCO_3$, water and brine. The organics were dried over $MgSO_4$ and concentrated under reduced pressure. The title compound (553 mg, 75%, two-steps) was obtained following column chromatography ($SiO_2$, 0 to 10% gradient of methanol and $CH_2Cl_2$). ESI MS $[M+H]^+$ $C_{24}H_{36}ClN_6O_7P$ for, calcd 587.2, found 587.3.

2) To a solution of the product above (540 mg, 0.921 mmol) in acetonitrile (5 mL) was added trimethylsilylbromide (1 ml). The reaction was stirred at room temperature for 3 hours the water (1 mL) was added and the reaction allowed to stir overnight. The reaction was concentrated with a stream of nitrogen the diluted with water (3 ml) and purified directly by preparative HPLC (C18, gradient of acetonitrile and water with 0.1% TFA). $^1$H NMR (400 MHz, DMSO-$d_6$) δ 8.48 (d, J=15.3 Hz, 1H), 8.35 (d, J=7.5 Hz, 1H), 7.99 (t, J=5.9 Hz, 1H), 5.79 (d, J=6.2 Hz, 1H), 4.68-4.51 (m, 1H), 4.43 (q, J=7.2 Hz, 1H), 4.07 (dd, J=5.3, 3.4 Hz, 1H), 3.93 (td, J=5.5, 3.3 Hz, 1H), 3.39 (dt, J=14.4, 5.4 Hz, 2H), 2.75-2.55 (m, 2H), 2.15-1.83 (m, 2H), 1.78-1.44 (m, 6H). ESI MS $[M+H]^+$ $C_{17}H_{24}ClN_6O_7P$ for, calcd 491.1, found 491.2.

Example 9

Synthesis of [({[(2R,3S,4R,5R)-5-[2-chloro-6-(cyclopentylamino)-9H-purin-9-yl]-3,4-dihydroxyoxolan-2-yl]methyl}(methyl)carbamoyl)methyl]phosphonic Acid Step b:
1) To a solution of the product from Step a (146 mg, 0.345 mmol), diethylphosphonoacetic acid (81 mg, 0.414 mmol) and diisopropylethylamine (0.30 mL, 1.73 mmol) in DMF (3.5 mL) at room temperature was added HATU (157 mg, 0.414 mmol). The mixture was stirred for 1 hour then diluted with ethyl acetate and washed sequentially with 10% citric

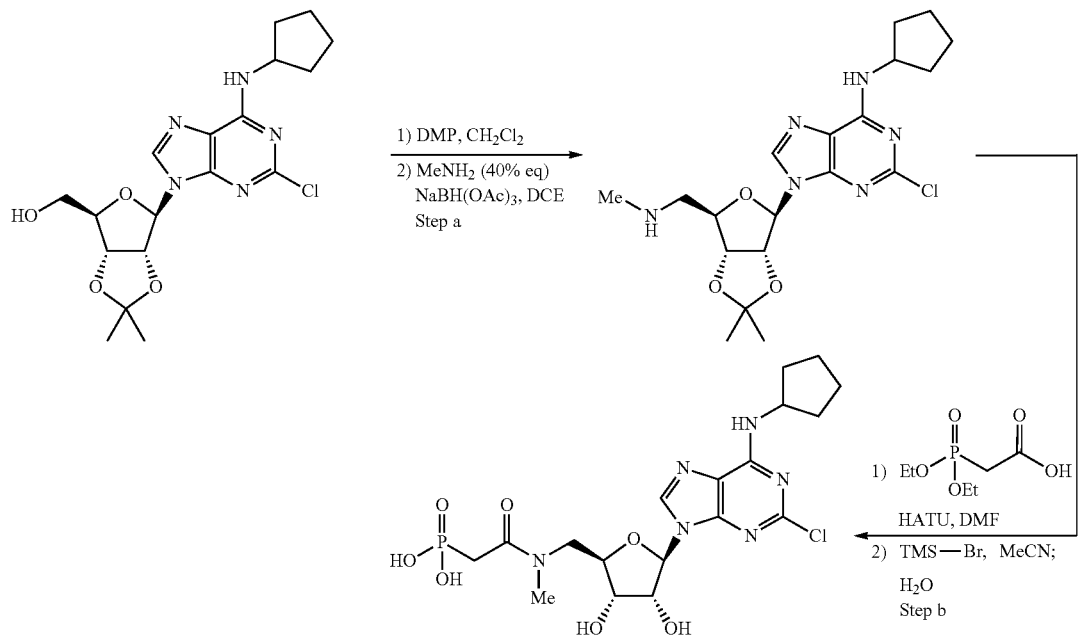

Step a:
1) To a solution of the product from step b from Example 8 (6.29 g) in dichloroethane (125 mL) at 0° C. was added Dess-Martin periodinane (7.17 g 16.9 mmol). The resulting suspension was allowed to warm to room temperature and stir overnight. The reaction was diluted with ethyl acetate and washed with 1M NaOH, water, and brine. The organic layer was dried over $MgSO_4$ and concentrated under reduced pressure. The crude material was used without further purification. ESI MS $[M+H_2O+H]^+$ for $C_{18}H_{24}ClN_5O_5$, calcd 426.2, found 426.3.

2) To a flask charged with crude aldehyde from the previous step was added dichloroethane (150 mL). To the resulting solution was added methylamine (40 wt % in water, 2.4 g, 30.6 mmol) followed by sodium triacetoxyborohydride (3.89 g, 18.4 mmol). The reaction was complete after two hours and partioned between ethyl acetate and 1M NaOH. The organic layer was washed with water and brine, dried over $MgSO_4$ and concentrated under reduced pressure. Purification by column chromatography ($SiO_2$, 0 to 15% gradient of methanol and $CH_2Cl_2$) provide the title compound (2.7 g 43%) as an off-white solid. ESI MS $[M+H]^+$ for $C_{19}H_{27}ClN_6O_3$, calcd 423.2, found 423.3.

acid, sat. $NaHCO_3$, water and brine. The organics were dried over $MgSO_4$ and concentrated under reduced pressure. The acetonide protected phosphono-acetamide (125 mg, 60%) was obtained following column chromatography ($SiO_2$, 0 to 10% gradient of methanol and $CH_2Cl_2$). ESI MS $[M+H]^+$ $C_{25}H_{38}ClN_6O_7P$ for, calcd 601.2, found 601.4.

2) To a solution of the product above (125 mg) in acetonitrile (5 mL) was added trimethylsilylbromide (0.5 ml). The reaction was stirred at room temperature for 3 hours the water (0.5 mL) was added and the reaction allowed to stir overnight. The reaction was concentrated with a stream of nitrogen the diluted with water (5 ml) and purified directly by preparative HPLC (C18, gradient of acetonitrile and water with 0.1% TFA). $^1$H NMR (400 MHz, DMSO-$d_6$) δ 8.49-8.40 (m, 0.6H), 8.39-8.32 (m, 0.4H), 5.83 (d, 0.4H), 5.80 (d, J=6.2 Hz, 0.6H), 5.28-4.93 (m, 0.4H), 4.67-4.57 (m, 1H), 4.56-4.34 (m, 1H), 4.18-4.00 (m, 2H), 3.90-3.70 (m, 1H), 3.51-3.38 (m, 1H), 3.05 (s, 2H), 3.02-2.82 (m, 1H), 2.80 (s, 1H), 1.94 (d, J=8.8 Hz, 2H), 1.73 (d, J=16.3 Hz, 3H), 1.66-1.44 (m, 4H). ESI MS $[M-H]^-$ $CH_{26}ClN_6O_7P$ for, calcd 503.1, found 503.1.

Example 10

Synthesis of [({[(2R,3S,4R,5R)-5-{2-chloro-6-[cyclopentyl(methyl)amino]-9H-purin-9-yl}-3,4-dihydroxyoxolan-2-yl]methyl}(ethyl)carbamoyl)methyl] phosphonic Acid

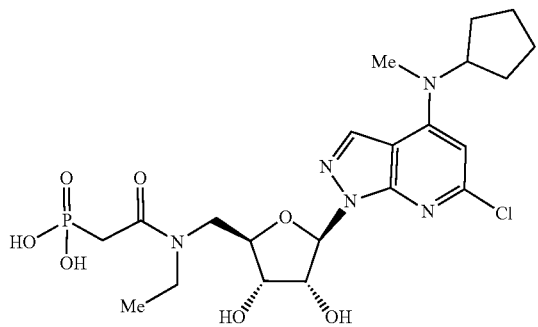 [SMILES: CCN(C[C@H]1O[C@@H](n2ncc3c(N(C)C4CCCC4)cc(Cl)nc32)[C@H](O)[C@@H]1O)C(=O)CP(=O)(O)O]

The title compound was obtained using identical procedures as for Example 8 and Example 8, starting from ethylamine hydrochloride to give white solid: $^1$H NMR (mixture of rotamers, 400 MHz, DMSO-$d_6$) δ 8.50 (s, 1H), 8.37 (s, 1H), 5.86 (d, J=4.4 Hz, 0.5H), 5.82 (d, J=6.2 Hz, 1H), 4.65 (dd, J=6.3, 4.6 Hz, 1H), 4.50 (t, J=4.8 Hz, 0.5H), 4.11 (tt, J=5.7, 2.8 Hz, 3H), 3.85-3.66 (m, 2H), 3.44 (dq, J=14.6, 7.4 Hz, 3H), 3.34-3.20 (m, 1H), 2.94-2.66 (m, 3H), 1.92-1.57 (m, 2H), 1.80-1.54 (m, 9H), 1.06 (t, J=7.1 Hz, 3H), 0.97 (t, J=7.0 Hz, 2H). ESI MS [M−H]$^−$ for $C_{20}H_{30}ClN_6O_7P$, calcd 531.2, found 531.2.

Example 11

Synthesis of ({[(2R,3S,4R,5R)-5-[2-chloro-6-(cyclopentylamino)-9H-purin-9-yl]-3,4-dihydroxyoxolan-2-yl]methoxy}methyl)phosphonic Acid

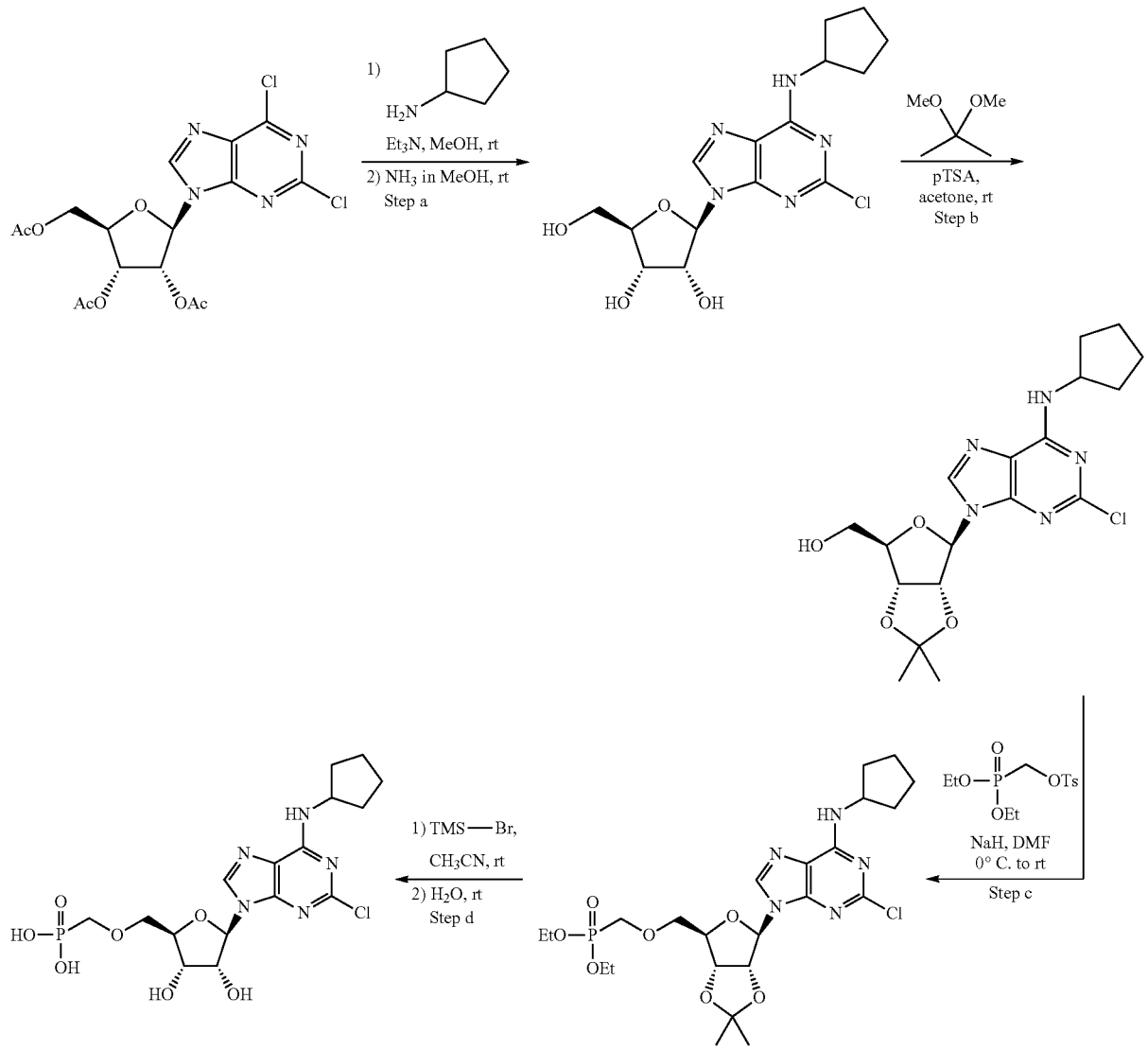

Step a:

A mixture of 2,6-dichloro-9-(2,3,5-tri-1-acetyl-beta-D-ribofuranosyl)purine (13.5 g, 30 mmol), cyclopentylamine (3.2 mL, 33 mmol, 1.1 equiv.), and triethylamine (4.6 mL, 33 mmol, 1.1 equiv.) in MeOH (60 mL) was stirred at rt for overnight. 7M $NH_3$ in MeOH (20 mL) was added and reaction was stirred at rt for 1 day. Reaction mixture was evaporated and the crude product was used in the next step without purification. ESI MS [M+H]$^+$ for $C_{15}H_{21}ClN_5O_4$, calcd 370.1, found 370.2.

Step b:

The product from Step a was dissolved in acetone (100 mL) and 2,2-dimethoxypropane (40 mL) and p-TsOH×$H_2O$ (7.1 g, 37.5 mmol, 1.25 equiv.) was added. The reaction mixture was stirred at rt for overnight, then diluted with brine (100 mL) and carefully quenched with saturated $NaHCO_3$ (200 mL). After extraction with EtOAc (2×200 mL), combined organics were dried over $MgSO_4$, filtered and evaporated to give crude product that was used in the next step without purification (12.2 g, 98%). ESI MS [M+H]$^+$ for $C_{18}H_{25}CN_5O_4$, calcd 410.2, found 410.1.

Step c:

The product from Step b (410 mg, 1 mmol) was dissolved in anhydrous DMF (5 mL) and cooled to 0° C., then 60% NaH (60 mg, 1.5 mmol, 1.5 equiv.) was added and reaction mixture was stirred at 0° C. for 1 h. Diethyl p-toluenesulfonyloxy methylphosphonate (386 mg, 1.2 mmol, 1.2 equiv.) was added and reaction was slowly warmed up to rt and stirred for overnight. Diluted with $H_2O$ (20 mL) and extracted with MTBE (2×10 mL), combined organics were dried over $MgSO_4$, filtered and evaporated to give crude product that was used in the next step without purification. ESI MS [M+H]$^+$ for $C_{23}H_{36}ClN_5O_7P$, calcd 560.2, found 560.1.

Step d:

The product from Step c was dissolved in anhydrous $CH_3CN$ (5 mL), TMS-Br (0.5 mL) was added and reaction was stirred at rt for overnight. Quenched with $H_2O$ (1 mL) and stirred at rt for 4 h, or until LCMS analysis shows complete cleavage of the acetonide protecting group. The reaction mixture was evaporated and purified by reverse phase HPLC (C18 column, 0 to 30% gradient of acetonitrile and water with 0.1% TFA) to give the product as a white solid in 18.5% yield (107 mg): $^1H$ NMR (400 MHz, DMSO-$d_6$) δ 8.41 (s, 1H), 8.39-8.26 (m, 1H), 5.84 (d, J=5.9 Hz, 1H), 4.53 (t, J=5.5 Hz, 1H), 4.48-4.35 (m, 1H), 4.12 (dd, J=4.9, 3.3 Hz, 1H), 4.05 (q, J=3.8 Hz, 1H), 3.79-3.65 (m, 2H), 3.62 (d, J=8.9 Hz, 2H), 2.05-1.85 (m, 2H), 1.78-1.44 (m, 6H). ESI MS [M+H]$^+$ for $C_6H_{24}ClN_5O_7P$, calcd 464.1, found 464.2.

Example 12

Synthesis of ({[(2R,3S,4R,5R)-5-{2-chloro-6-[(cyclopent-3-en-1-yl)amino]-9H-purin-9-yl}-3,4-dihydroxyoxolan-2-yl]methoxy}methyl)phosphonic Acid

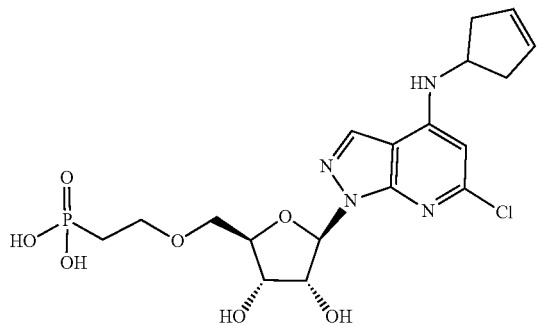 [SMILES: O=P(O)(O)CCOC[C@H]1O[C@@H](n2ncc3c(NC4CC=CC4)cc(Cl)nc32)[C@H](O)[C@@H]1O]

The title compound was synthesized in similar fashion to Example 11: $^1H$ NMR (400 MHz, DMSO-$d_6$) δ 8.53 (d, J=7.2 Hz, 1H), 8.43 (s, 1H), 5.85 (d, J=5.8 Hz, 1H), 5.73 (s, 2H), 4.78-4.66 (m, 1H), 4.54 (t, J=5.5 Hz, 1H), 4.14-4.09 (m, 1H), 4.05 (q, J=3.7 Hz, 1H), 3.80-3.65 (m, 2H), 3.61 (d, J=8.9 Hz, 2H), 2.85-2.61 (m, 2H), 2.46-2.27 (m, 2H). ESI MS [M+H]$^+$ for $C_{16}H_{22}ClN_5O_7P$, calcd 462.1, found 462.1.

Biological Examples

CD73 Inhibition Assay

Materials and Methods

The following general materials and methods were used, where indicated, or may be used in the Examples below:

Standard methods in molecular biology are described in the scientific literature (see, e.g., Sambrook and Russell (2001) Molecular Cloning, 3$^{rd}$ ed., Cold Spring Harbor Laboratory Press, Cold Spring Harbor, N.Y.; and Ausubel, et al. (2001) Current Protocols in Molecular Biology, Vols. 1-4, John Wiley and Sons, Inc. New York, N.Y., which describes cloning in bacterial cells and DNA mutagenesis (Vol. 1), cloning in mammalian cells and yeast (Vol. 2), glycoconjugates and protein expression (Vol. 3), and bioinformatics (Vol. 4)).

The scientific literature describes methods for protein purification, including immunoprecipitation, chromatography, electrophoresis, centrifugation, and crystallization, as well as chemical analysis, chemical modification, post-translational modification, production of fusion proteins, and glycosylation of proteins (see, e.g., Coligan, et al. (2000) Current Protocols in Protein Science, Vols. 1-2, John Wiley and Sons, Inc., NY).

Software packages and databases for determining, e.g., antigenic fragments, leader sequences, protein folding, functional domains, glycosylation sites, and sequence alignments, are available (see, e.g., GCG Wisconsin Package (Accelrys, Inc., San Diego, CA); and DeCypher™ (TimeLogic Corp., Crystal Bay, NV).

The literature is replete with assays and other experimental techniques that can serve as a basis for evaluation of the compounds described herein.

Inhibition of Ecto-5'-nucleotidase Activity.

Compounds were evaluated to determine their ecto-5'-nucleotidase (CD73) inhibitory activity. Briefly, CHO-K1 cells stably transfected with human CD73 were generated by LakePharma (Belmont, CA) using molecular cloning of human CD73 (http://www.uniprot.org/uniprot/P21589) and mammalian transient expression vector (P21589.1). After antibiotic selection in CD OptiCHO cell media (Invitrogen, Catalog #12681-011) containing 5 µg/mL Puromycin and 200 µg/mL Hygromycin B, a suspension pool of CHO-CD73 cells was collected and frozen in 7.5% DMSO in cell media without antibiotics.

On the day of the experiment, one vial of CHO-CD73 cells was thawed and suspended in assay media which consisted of 20 mM HEPES, pH 7.4, 137 mM NaCl, 5.4 mM KCl, 1.3 mM $CaCl_2$), 4.2 mM $NaHCO_3$ and 0.1% glucose. To test the ability of compounds to inhibit CD73 enzymatic activity, 2 µL of 500 µM of compounds dissolved in DMSO (50×) were added to a 96-well polystyrene plate containing 58 µL of assay buffer. Next, 20 µL of CHO-CD73 cells in assay buffer were added to assay plate followed by 20 µL of 125 M AMP (Adenosine 5'-monophosphate monohydrate) in assay buffer. Final assay conditions consisted of 2500 cells per well in 2% DMSO and 25 M of AMP substrate. After 50 minutes of incubation (37° C. and 5% $CO_2$) and centrifugation at 225×g for 5 mins, 80 µL of supernatant were transferred to a 96-well Spectra Plate (PerkinElmer, cat #6005640) which was pre-dispensed with 20 µL of PiColorLock Gold colorimetric assay reagents (Thermo, cat #30 300 30). The amount of inorganic phosphate was determined by reading the absorbance at 620 nm on an EnVision Multilabel Plate Reader (PerkinElmer). Enzymatic activity of CD73 was based on the amount of phosphate generated. Percentage of activity was calculated based on DMSO and no cells control wells. $IC_{50}$ values of compounds were determined by four parameter non-linear regression fitting of percentage of activity in GraphPad Prism software.

Pharmacodynamic and Pharmacokinetic Evaluation.

A pharmacodynamic assay can be based on measuring CD73 mediated serum levels of adenosine. Adenosine levels can be determined by HPLC analysis, and serum compound levels can optionally also be determined in the same HPLC run.

Human Hepatocyte Stability Assay

Human hepatocyte stability defined herein refers to "$CL_{INT}$<10 uL/min/million cells". Evaluation can be carried out as described in Riley R J, McGinnity D F, and Austin R P (2005) A unified model for predicting human hepatic, metabolic clearance from in vitro intrinsic clearance data in hepatocytes and microsomes. *Drug Metab Dispos* 33: 1304-11.

Caco-2 Cell Permeability Assay

A cell permeability assay useful for the characterizations described herein was published in van Breemen R B, Li Y. Caco-2 cell permeability assays to measure drug absorption. *Expert Opin Drug Metab Toxicol.* 1(2):175-85 (2005).

Human Plasma Protein Binding Assay

Several methods are available for evaluation of human plasma protein binding using ultrafiltration, ultracentrifugation or equilibrium dialysis. These are described in:
1. Bowers W F, Fulton S, Thompson J. Ultrafiltration vs. equilibrium dialysis for determination of free fraction. *Clin. Pharmacokinet.* 9(1), 49-60 (1984). 19
2. Lee K J, Mower R, Hollenberck T et al. Modulation of nonspecific binding in ultrafiltration protein binding studies. *Pharm. Res.* 20(7), 1015-1021 (2003). 20
3. Zhang F, Xue J, Shao J et al. Compilation of 222 drugs' plasma protein binding data and guidance for study designs. *Drug Discov. Today* 17(9-10), 475-485 (2012).

Solubility Assay

Similarly, solubility assays for the candidate compounds are provided in:
1. D. J. W. Grant and T. Higuchi. SOLUBILITY BEHAVIOR OF ORGANIC COMPOUNDS, John Wiley and Sons: New York, 1990.
2. S. H. Yalkowsky and S. Banejee. AQUEOUS SOLUBILITY METHODS OF ESTIMATION FOR ORGANIC COMPOUNDS, Marcel Dekker: New York, 1992.
3. P. Augustins and M. E. Brewster. SOLVENT SYSTEMS AND THEIR SELECTION IN PHARMACEUTICS AND BIOPHARMACEUTICS. Springer-AAPS Press: Arlington, VA, 2007.

Calculated Physical Properties

For calculating the other properties, methodology from ChemAxon can be used.

Detailed descriptions of those can be found on the ChemAxon website.

c Log P

The logarithm of the partition coefficient. The partition coefficient is the ratio of the concentration of the molecule in octanol to the concentration of the molecule in water. ChemAxon uses a fragment based approach which some researchers refer to as a c Log P calculation. CDD Vault uses the ionic log P algorithm; some might consider this not a "true" log P, but could be also be useful. For ionizable compounds, this log P might coincide with the log D at pI.

c Log D

The logarithm of the distribution coefficient. This distribution coefficient log D, takes the concentration ratio of all ionized and unionized forms of the compound into account. Log D values in the CDD Vault are calculated for pH 7.4.

Topological Polar Surface Area

The topological polar surface area (tPSA) is formed by polar atoms of a molecule. This is a descriptor that shows good correlation with passive molecular transport through membranes. As a result, tPSA can be used to estimate drug transport properties. Estimation of the tPSA is based on the method given in Ertl et al., *J. Med. Chem.* 2000, 43 (20), 3714-3717, excluding sulfur and phosphorus atoms (see also the Chemaxon documentation).

The compounds of Table 1 were evaluated using, for example, Chemaxon programs and resulted in the parameters as provided.

Particular embodiments of this invention are described herein, including the best mode known to the inventors for carrying out the invention. Upon reading the foregoing, description, variations of the disclosed embodiments may become apparent to individuals working in the art, and it is expected that those skilled artisans may employ such variations as appropriate. Accordingly, it is intended that the invention be practiced otherwise than as specifically described herein, and that the invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All publications, patent applications, accession numbers, and other references cited in this specification are herein incorporated by reference as if each individual publication or patent application were specifically and individually indicated to be incorporated by reference.

What is claimed is:

1. A method of treating cancer in a subject in need thereof, said method comprising administering a therapeutically effective amount of a compound having the formula:

or a pharmaceutically acceptable salt thereof, wherein the compound, or a pharmaceutically acceptable salt thereof, is administered intravenously to the subject as a single dose every two weeks, three weeks, or four weeks, and wherein the therapeutically effective amount maintains a plasma concentration (Css) of at least 90 ng/mL for a period of 7 days or more.

2. The method of claim 1, wherein said cancer is pancreatic cancer, lung cancer, colorectal cancer, prostate cancer, or is glioblastoma.

3. The method of claim 1, further comprising administering an additional therapeutic agent.

4. The method of claim 3, wherein the additional therapeutic agent comprises an immune checkpoint inhibitor.

5. The method of claim 4, wherein said immune checkpoint inhibitor modulates the activity of programmed cell death protein 1 (PD1).

6. The method of claim 4, wherein the immune checkpoint inhibitor modulates the activity of T-cell immunoreceptor with Ig and ITIM domains (TIGIT).

7. The method of claim 3, wherein the compound, or a pharmaceutically acceptable salt thereof, and the additional therapeutic agent are administered at the same dosing frequency.

8. The method of claim 5, further comprising administering a chemotherapeutic agent.

9. The method of claim 3, wherein the additional therapeutic agent comprises a chemotherapeutic agent.

10. The method of claim 9, wherein the chemotherapeutic agent is selected from gemcitabine, paclitaxel, and combinations thereof.

11. The method of claim 1, wherein the compound, or a pharmaceutically acceptable salt thereof, is administered as a single dose every two weeks.

12. The method of claim 1, wherein the compound, or a pharmaceutically acceptable salt thereof, is administered as a single dose every three weeks.

13. The method of claim 1, wherein the compound, or a pharmaceutically acceptable salt thereof, is administered as a single dose every four weeks.

14. The method of claim 1, wherein said therapeutically effective amount is between about 10 mg to about 100 mg.

15. The method of claim 1, wherein said therapeutically effective amount is at least 25 mg.

16. The method of claim 1, wherein the cancer is pancreatic cancer.

17. The method of claim 1, wherein the single dose is administered intravenously over a period of 10 minutes to 1 hour.

18. The method of claim 1, wherein the single dose is administered intravenously over a period of 30 minutes.

19. A method of treating cancer in a subject in need thereof, said method comprising administering a therapeutically effective amount of a compound having the formula:

or a pharmaceutically acceptable salt thereof, wherein the compound, or a pharmaceutically acceptable salt thereof, is administered intravenously to the subject as a single dose every two weeks, three weeks, or four weeks, and wherein said therapeutically effective amount is between about 10 mg to about 100 mg and the single dose is administered intravenously over a period of 10 minutes to 1 hour.

20. The method of claim 19, wherein said cancer is pancreatic cancer, lung cancer, colorectal cancer, prostate cancer, or is glioblastoma.

21. The method of claim 19, wherein the cancer is pancreatic cancer.

22. The method of claim 19, wherein the single dose is administered intravenously over a period of 30 minutes.

23. The method of claim 19, further comprising administering an additional therapeutic agent.

24. The method of claim 23, wherein the additional therapeutic agent comprises a chemotherapeutic agent.

25. The method of claim 23, wherein the additional therapeutic agent comprises an immune checkpoint inhibitor.

26. The method of claim 25, further comprising administering a chemotherapeutic agent.

27. The method of claim 23, wherein the additional therapeutic agent is selected from gemcitabine, paclitaxel, and combinations thereof.

* * * * *